United States Patent [19]

Shibayama

[11] Patent Number: 5,032,013
[45] Date of Patent: Jul. 16, 1991

[54] ZOOM LENS

[75] Inventor: Atsushi Shibayama, Kawasaki, Japan

[73] Assignee: Nikon Corporation, Tokyo, Japan

[21] Appl. No.: 542,515

[22] Filed: Jun. 22, 1990

[30] Foreign Application Priority Data

Jun. 27, 1989 [JP] Japan ................................ 1-164640

[51] Int. Cl.$^5$ .............................................. G02B 15/00
[52] U.S. Cl. ..................................... 350/429; 350/423; 350/469
[58] Field of Search ................ 350/429, 430, 423, 469

[56] References Cited

U.S. PATENT DOCUMENTS

| | | | |
|---|---|---|---|
| 4,240,704 | 12/1980 | Goto | 350/469 |
| 4,441,792 | 4/1984 | Takeoka | 350/469 |
| 4,907,867 | 3/1990 | Perrin et al. | 350/429 |

Primary Examiner—Rodney B. Bovernick
Assistant Examiner—Loha Ben
Attorney, Agent, or Firm—Shapiro and Shapiro

[57] ABSTRACT

A zoom lens comprises, in succession from the object side, a first lens group having a positive refractive power, a second lens group having a negative refractive power, a third lens group having a positive refractive power, and a fourth lens group having a positive refractive power. The zoom lens is designed such that during the zooming from the wide angle end to the telephoto end, the third lens group and the fourth lens group are moved along the optic axis thereof and during the focusing on an infinity object to a short distance object, they are moved toward the image side while having the spacing therebetween relatively varied. The zoom lens is further designed to satisfy the following condition:

$$\beta_{3T} \cdot \beta_{4T} < \beta_{3W} \cdot \beta_{4W} < -1.3$$

where $\beta_{3W}$ and $\beta_{4W}$ are the lateral magnifications of the third lens group and the fourth lens group, respectively, in the infinity in-focus state of the wide angle end, and $\beta_{3T}$ and $\beta_{4T}$ are the lateral magnifications of the third lens group and the fourth lens group, respectively, in the infinity in-focus state of the telephoto end.

13 Claims, 8 Drawing Sheets

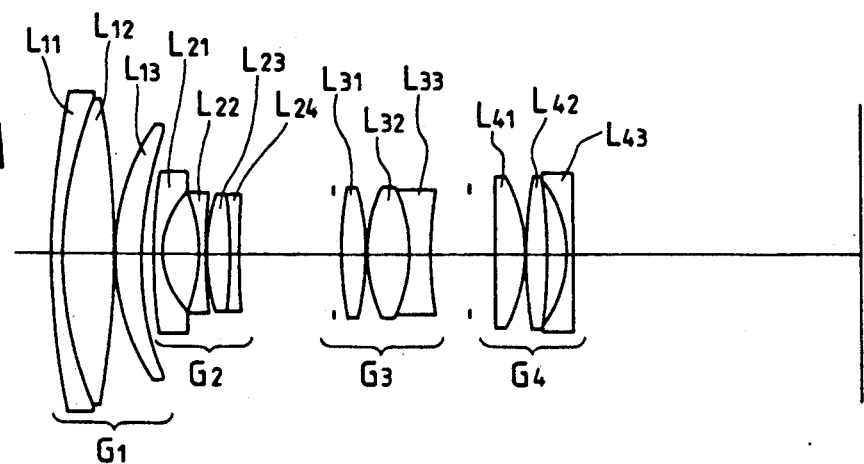
FIG. 1A
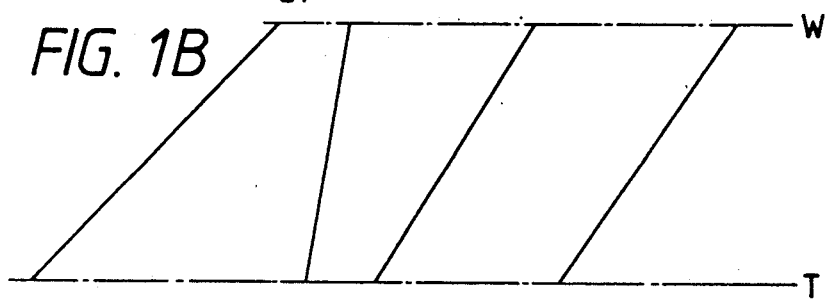
FIG. 1B
FIG. 2
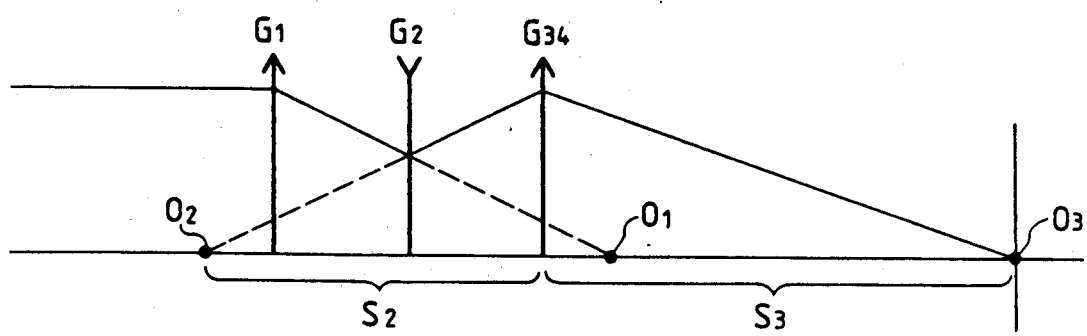

$|\Delta F| > |\Delta X|$ $|\Delta F| < |\Delta X|$

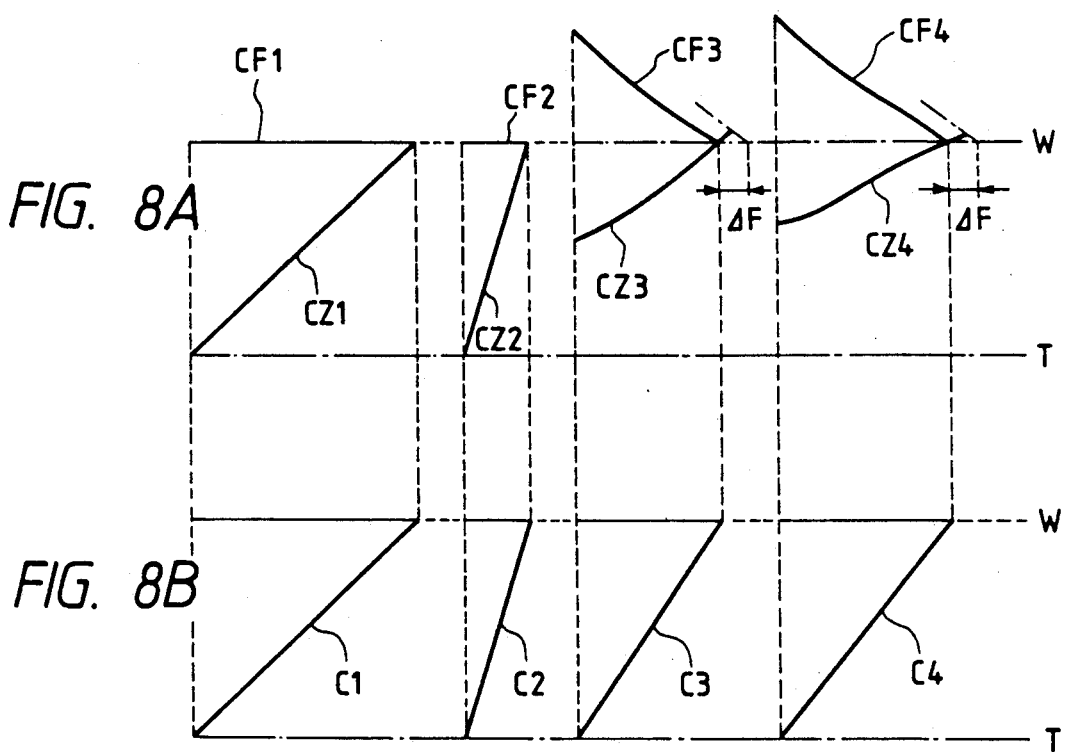
FIG. 8A
FIG. 8B
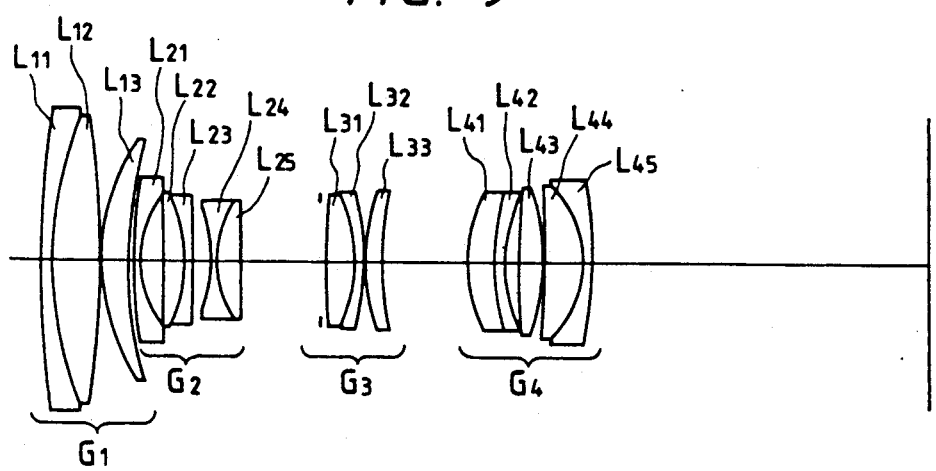
FIG. 9

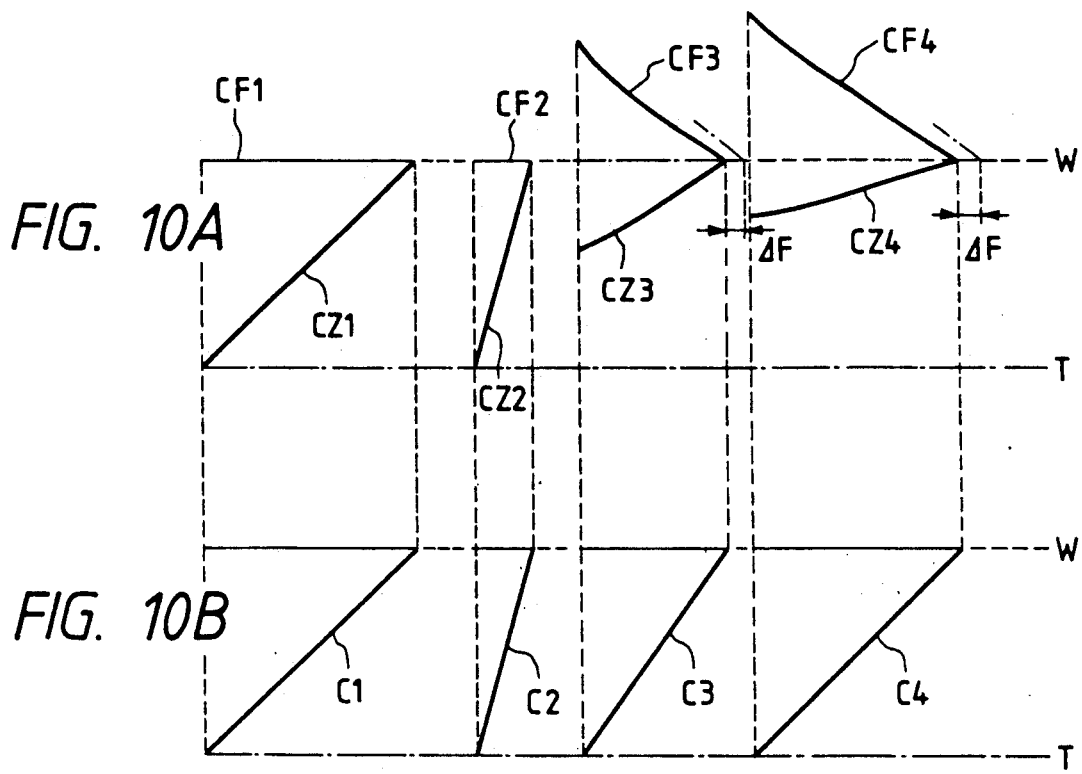
FIG. 10A
FIG. 10B
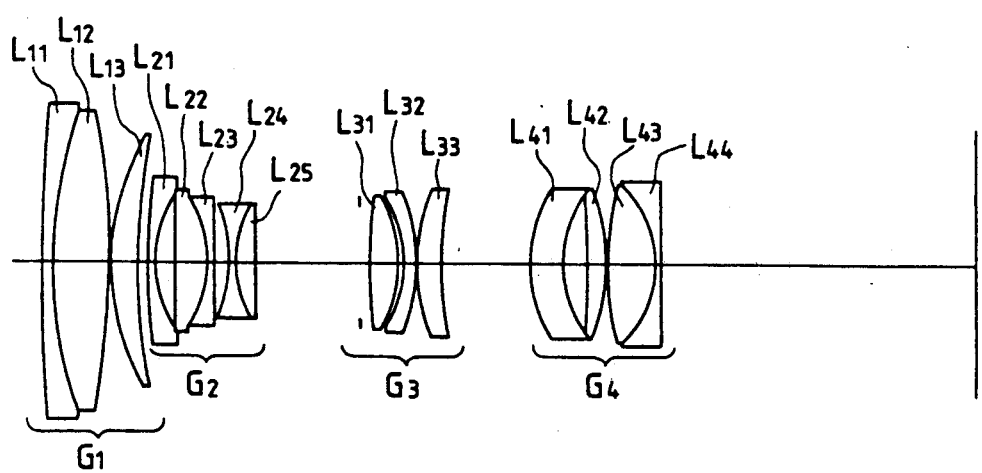
FIG. 11

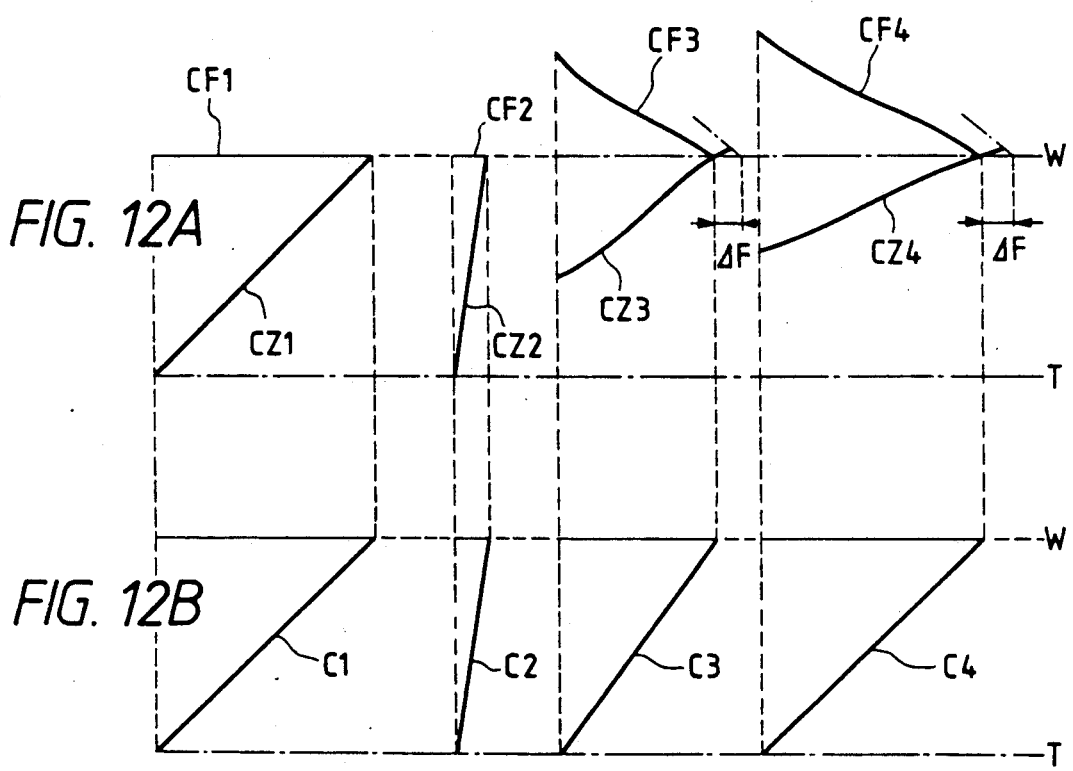

ZOOM LENS

BACKGROUND OF THE INVENTION

1. Field of the Invention

This invention relates to a zoom lens, and in particular to a zoom lens adopting the so-called inner focus system or rear focus system by the movement of some of lens groups in the zoom lens system.

2. Related Background Art

As focusing systems for conventional zoom lenses, there are known the so-called forward lens axial movement system in which a first lens group positioned most adjacent to the object side is axially forwardly moved, the inner focus system or the rear focus system by the movement of some of lens groups in the zoom lens system except a first lens group most adjacent to the object side, the total axial movement system in which the total system is axially forwardly moved as a unit, etc.

Generally, the inner focus system, the rear focus system and the total axial movement system suffer from the problem that the amount of axial movement necessary for one and the same photographing distance (the distance from an object to the image plane) differs with a variation in the focal length of the total system. Therefore, even if with any focal length, the lens is in focus to a certain photographing distance, when a magnification change is effected to change the focal length of the total system, the imaging position fluctuates greatly and each time, it has been necessary to manually operate a focusing ring to thereby effect focusing over again. Accordingly, the above-mentioned three systems are all unsuitable for manual focusing.

Thus, the forward lens axial movement system in which the amount of lens movement is always constant for one and the same photographing distance in any photographing magnification condition and which is convenient for manual operation (manual focusing) is the main current as the focusing system for zoom lenses.

Generally, however, the first lens group has the tendency of becoming heavy due to its large lens diameter. For example, in a zoom lens of multi-group construction and high magnification change ratio comprising three positive, negative and positive lens groups or more, aperture eclipse is liable to occur on the wide angle side during short distance focusing, and an attempt to mitigate this phenomenon would result in the bulkiness of the first lens group, and would further lead to the problem that during short distance focusing, curvature of image field occurs very greatly in the positive direction to cause the deterioration of the imaging performance.

Also, in recent years, the main current of camera has become single-lens reflex cameras of the auto focus type, and if auto focusing is effected by the forward lens axial movement system, a great load will be applied to a drive motor for focusing because the first lens group is bulky and heavy. This in turn leads to the problem that the focusing speed becomes slow and quick focusing becomes impossible.

SUMMARY OF THE INVENTION

It is therefore an object of the present invention to solve all the above-noted problems and to provide a zoom lens which enables manual focusing and auto focusing to be accomplished quickly and easily and thereby achieves a marked improvement in operability and which has an excellent imaging performance over the entire magnification change range including a short distance as well as infinity.

In order to achieve the above object, in a zoom lens according to the present invention which comprises a first lens group having a positive refractive power, a second lens group having a negative refractive power, a third lens group having a positive refractive power, and a fourth lens group having a positive refractive power, at least the third lens group and the fourth lens group being moved along the optic axis thereof during the zooming from the wide angle end to the telephoto end, design is made such that during the focusing on an infinity object to a short distance object, the third lens group and the fourth lens group are both moved to the image side while having the spacing therebetween relatively varied.

Thus, the present invention adopts the so-called floating system in which the spacing between the third and fourth lens groups having the magnification changing function is relatively varied during focusing, thereby extracting a very good short distance imaging performance over the wide angle end to the telephoto end.

The zoom lens according to the present invention is characterized by being designed to satisfy the following conditions:

$$\beta_{3T} \cdot \beta_{4T} < \beta_{3W} \cdot \beta_{4W} \tag{1}$$

$$\beta_{3W} \cdot \beta_{4W} < -1.3 \tag{2}$$

where $\beta_{3W}$ and $\beta_{4W}$ are the lateral magnifications of the third lens group and the fourth lens group, respectively, in the infinity in-focus state of the wide angle end, and $\beta_{3T}$ and $\beta_{4T}$ are the lateral magnifications of the third lens group and the fourth lens group, respectively, in the infinity in-focus state of the telephoto end.

Also, it is more preferable that the zoom lens according to the present invention be designed to satisfy the following condition:

$$1.4 < f_4/f_3 < 4 \tag{3}$$

where $f_3$ is the focal length of the third lens group and $f_4$ is the focal length of the fourth lens group.

According to the present invention, the third and fourth lens groups having the magnification changing and focusing function effect floating during focusing and therefore, aberration fluctuation correction at short distances becomes possible and it becomes possible to extract a very excellent imaging performance over the total magnification change area during short distance photographing as well as during infinity photographing.

Also, in spite of any variation in the focal length (photographing magnification, the amount of movement of a lens barrel for focusing on an object at a predetermined photographing distance can be made substantially constant and therefore, a simple manual focusing operation becomes possible. Moreover, focusing is effected by the use of compact and light-weight lens groups and therefore, the load of a focusing driver when auto focusing is effected can be mitigated, and this leads not only to the possibility of achieving the compactness, reduced cost, etc. of the driver, but also to the possibility of markedly enhancing the responsiveness to auto focusing.

Further, as compared with the focusing by the forward lens axial movement system, the lens diameter of the first lens group can be made relatively small, and this is very effective to make the zoom lens compact.

Further object, features and effects of the present invention will become fully apparent from the following detailed description taken in conjunction with the accompanying drawings.

BRIEF DESCRIPTION OF THE DRAWINGS

FIGS. 1A and 1B show the schematic construction of a lens according to a first embodiment of the present invention and the movement locus for magnification change of each lens group, respectively.

FIG. 2 schematically illustrates the principle of imaging when in the zoom lens according to the present invention, it is assumed that a third lens group and a fourth lens group are moved as a unit during focusing.

FIGS. 8A and 8B are developed views of cam loci schematically showing a zoom cam and a focus cam before and after in the zoom lens shown in FIG. 7, the movement locus is converted with respect to the focusing system by the third lens group and the fourth lens group.

FIG. 9 shows the construction of a lens according to a third embodiment of the present invention.

FIGS. 10A and 10B are developed views of cam loci schematically showing a zoom cam and a focus cam before and after in the zoom lens shown in FIG. 9, the movement locus is converted with respect to the focusing system by the third lens group and the fourth lens group.

FIG. 11 shows the construction of a lens according to a fourth embodiment of the present invention.

FIGS. 12A and 12B are developed views of cam loci schematically showing a zoom cam and a focus cam before and after in the zoom lens shown in FIG. 11, the movement locus is converted with respect to the focusing system by the third lens group and the fourth lens group.

DESCRIPTION OF THE PREFERRED EMBODIMENTS

Some embodiments of the present invention will hereinafter be described in detail with reference to the accompanying drawings.

FIG. 1 schematically shows the construction of a zoom lens according to a first embodiment of the present invention. This zoom lens, as shown, comprises, in succession from the object side, a first lens group G1 having a positive refractive power, a second lens group G2 having a negative refractive power, a third lens group G3 having a positive refractive power, and a fourth lens group G4 having a positive refractive power, and is designed such that during the magnification change from the wide angle side to the telephoto side, all the lens groups are moved toward the object side along the optic axis thereof and during the focusing on an infinity object to a short distance object, the third lens group G3 and the fourth lens group G4 are moved toward the image side along the optic axis.

Now, the zoom lens according to the present invention is designed such that by a converting operation similar to the converting method for a zoom cam and a focus cam proposed in the applicant's U.S. application Ser. No. 444,576 filed on Dec. 7, 1989, the lens groups constituting the zoom lens are moved during zooming and the third lens group G3 and the fourth lens group G4 which are endowed with both the magnification changing function and the focusing function are moved during focusing so that if focusing is once effected on an object at a certain distance, the in-focus state can always be secured even if the magnification is changed arbitrarily.

Figure 5A:
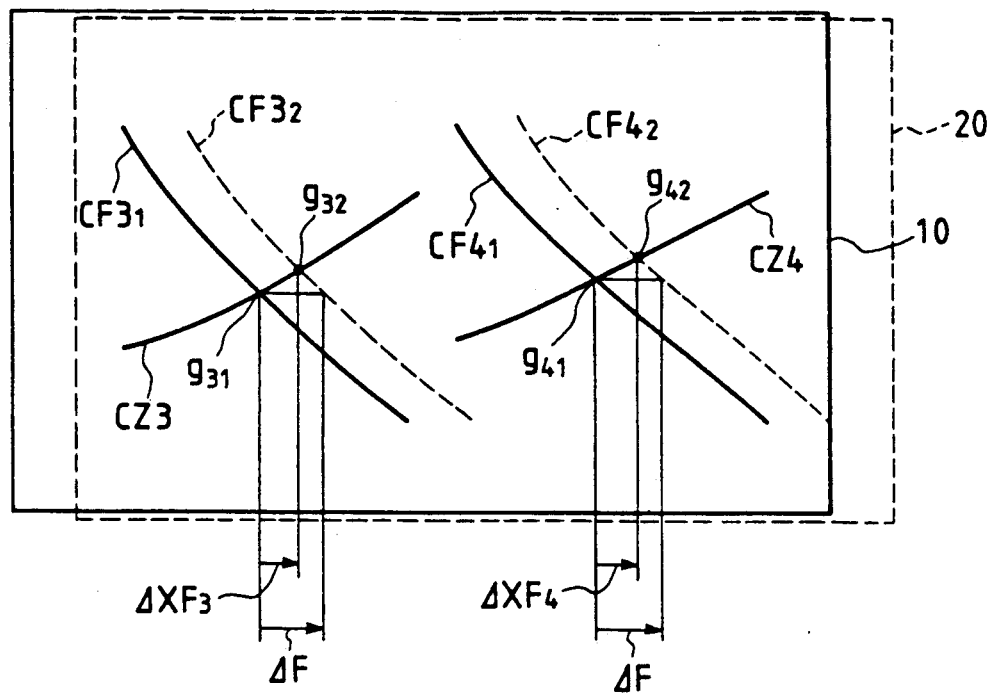
FIGS. 5A and 5B illustrate that in-focus and magnification change are achieved by the movements of the zoom cam and the focus cam, respectively, corresponding to the changed movement loci.
Figure 5B:
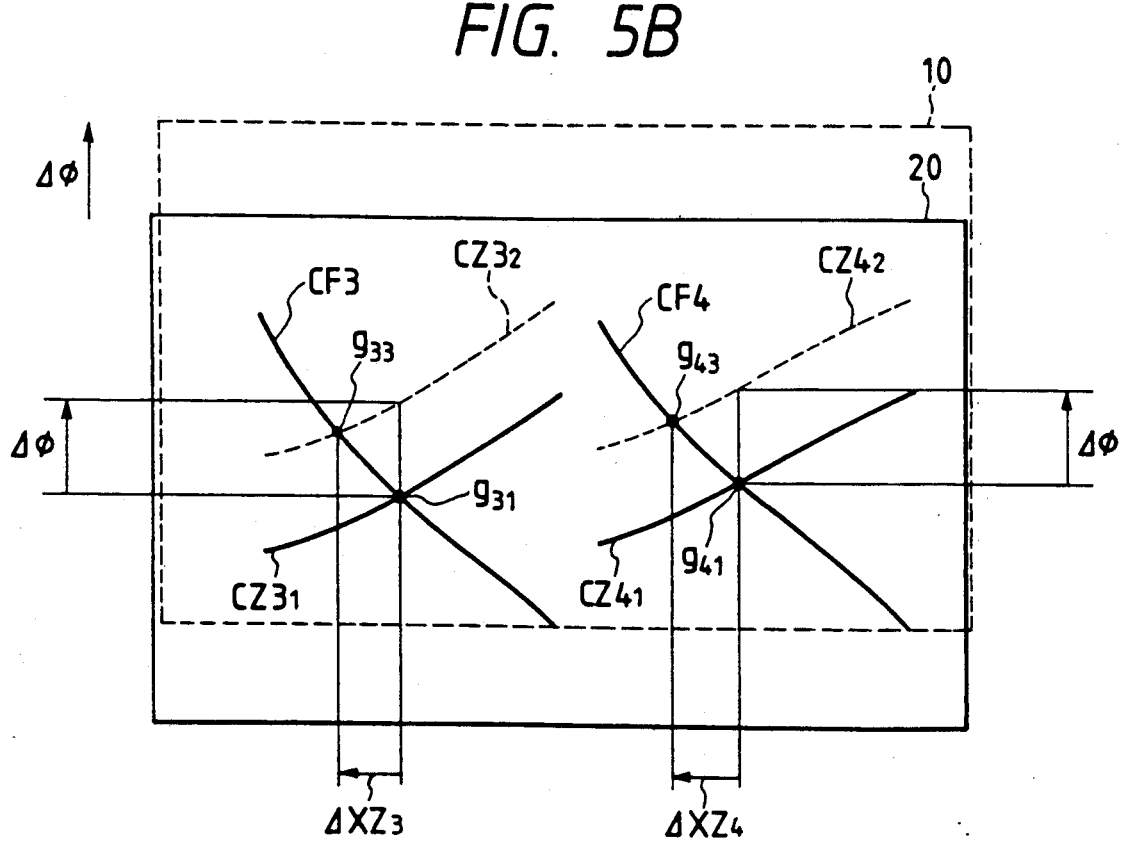

Specifically, as shown in FIGS. 5A and 5B which will later be described in detail, the lens barrel of this zoom lens is constructed so as to have a first lens barrel member 10 having two guide grooves $CZ_3$ and $CZ_4$ for magnification change corresponding to the movement loci for magnification change of the third lens group G3 and the fourth lens group G4 for the purpose of magnification change, and a second lens barrel member 20 having two guide grooves $CF_3$ and $CF_4$ for focusing for moving the third lens group G3 and the fourth lens group G4 along the direction of the optic axis for the purpose of focusing.

During magnification change, as shown in FIG. 5B, the first lens barrel member 10 and the second lens barrel member 20 are rotated relative to each other by $\Delta\phi$ about the optic axis of the zoom lens system, and the third lens group G3 and the fourth lens group G4 are moved on the optic axis by amounts $\Delta XZ_3$ and $\Delta XZ_4$, respectively, determined by the points of intersection between the guide grooves $CZ_3$, $CZ_4$ for magnification change and the guide grooves $CF_3$, $CF_4$ for focusing, whereby a desired magnification change is accomplished. Also, during focusing, as shown in FIG. 5A, the first lens barrel member 10 and the second lens barrel member 20 are moved relative to each other by $\Delta F$ in the direction of the optic axis, and the third lens group G3 and the fourth lens group G4 are moved on the optic axis by amounts $\Delta XF_3$ and $\Delta XF_4$, respectively, determined by the amounts of displacement of the points of intersection between the guide grooves $CZ_3$, $CZ_4$ for magnification change and the guide grooves $CF_3$, $CF_4$ for focusing, whereby focusing on a desired object is accomplished. The guide grooves $CF_3$ and $CF_4$ for focusing are formed into a non-linear shape having an area inclined with respect to the optic axis so that the amounts of movement $\Delta XF_3$ and $\Delta XF_4$ of the third lens group G3 and the fourth lens group G4 on the optic axis during focusing may be variable in conformity with the magnification change state while the amount of relative movement $\Delta F$ of the first lens barrel member 10 and the second lens barrel member 20 in the direction of the optic axis necessary for the focusing on a predetermined object is maintained substantially constant irrespective of the magnification change state.

Here, description will be made of the procedure for obtaining the non-linear curved shapes of the guide grooves for magnification change (zoom lens cam) and the guide grooves for focusing.

First, when the magnification change movement locus moving for magnification change is to be expressed with the amount of movement in the direction of the optic axis and the angle of rotation $\theta$ of the so-called rotatable lens barrel orthogonal thereto as variables, the guide grooves which have heretofore been straight lines parallel to the optic axis are variable-converted into non-linear curved guide grooves for focusing (focus cam) so as to form an angle with respect to the optic axis so that when the amount of movement $\Delta X$ of the focusing lens group moved in the direction of the optic axis for focusing in any magnification change state is converted into the amount of rotation $\phi$ of the rotatable lens barrel on the magnification change movement locus, $\Delta X$ and $\phi$ may be variables.

At the same time, in order to cope with the relation between the movement locus of the focusing lens group and the rectilinear tracks of the guide grooves before being converted, the movement locus of the focusing lens group for the purpose of magnification change, i.e., the guide grooves for magnification change (zoom cam), are variable-converted into the direction of the angle of rotation $\theta$ of the rotatable lens barrel on the basis of the guide grooves for focusing (focus cam) after being converted.

By such a converting operation, the shapes of the guide grooves for magnification change (zoom cam) and the guide grooves for focusing (focus cam) are determined.

As a result of these conversions, during focusing, the focusing lens group is moved along the movement locus (zoom cam) along which it is moved during magnification change. During magnification change, the focus cam and zoom cam after being converted are rotated relative to each other about the optic axis, that is, one of the focus cam and zoom cam after being converted is moved in a direction $\theta$ orthogonal to the optic axis, whereby the position of the lens group having the magnification changing function on the optic axis is varied to accomplish magnification change. Also, during focusing, even if the amounts of movement of the lens groups in the direction of the optic axis differ for an object at the same photographing distance, the focus cam after being converted is moved by substantially the same amount of movement $\Delta F$ in the direction of the optic axis, whereby focusing is accomplished.

The zoom lens of the present invention having the third lens group G3 and the fourth lens group G4 which are endowed with both the magnification changing function and the focusing function will now be described in detail.

In a zoom lens comprising four positive, negative, positive and positive lens groups like that of the present invention, the focal lengths at the wide angle end W and the telephoto end T can generally be expressed as follows:

$$f_W = f_{12W} \cdot \beta_{3W} \cdot \beta_{4W} \quad (a_1)$$

$$f_T = f_{12T} \cdot \beta_{3T} \cdot \beta_{4T} \quad (a_2)$$

where $f_W$: the focal length of the zoom lens at the wide angle end;

$f_T$: the focal length of the zoom lens at the telephoto end;

$f_{12W}$: the combined focal length of the first lens group and the second lens group at the wide angle end;

$f_{12T}$: the combined focal length of the first lens group and the second lens group at the telephoto end;

$\beta_{3W}$: the imaging magnification (lateral magnification) of the third lens group at the wide angle end;

$\beta_{3T}$: the imaging magnification (lateral magnification) of the third lens group at the telephoto end;

$\beta_{4W}$: the imaging magnification (lateral magnification) of the fourth lens group at the wide angle end; and $\beta_{4T}$: the imaging magnification (lateral magnification) of the fourth lens group at the telephoto end.

The lateral magnification will hereinafter be referred to as the imaging magnification.

Also, in each focal length state of the zoom lens, the imaging position relative to the position of the zoom lens differs between the focusing on an infinity object and the focusing on a short distance object.

Specifically, assuming that a thin lens having a certain focal length f is focused on an infinity object, the image plane is formed at a position spaced apart from this lens by a distance f. Next, let it be assumed that when this lens is to be focused on an object at a finite object distance D (the distance from the lens position to the object), the lens is moved by $\delta_F$ toward the object side. Then, from the imaging relation that $$\frac{1}{D} + \frac{1}{f + \delta_F} = \frac{1}{f}$$

there can be derived:

$$\delta_F = \frac{f^2}{D - f} \quad (b)$$

If here, the object distance D is sufficiently great as compared with the focal length f of the lens, approximately D-f can be dealt with as a constant and therefore, from the above equation (b), it generally follows that the amount of movement $\delta_F$ during focusing is proportional to the square of the focal length.

Considering this with respect to the wide angle end and the telephoto end, respectively, of the zoom lens, when the focal length of the zoom lens at the wide angle end is $f_w$ and the amount of movement of the zoom lens at the wide angle end during the focusing on from infinity to a certain object distance D is $\delta_{wF}$ and the focal length at the telephoto end is $f_{TF}$ and the amount of movement of the zoom lens at the telephoto end during the zooming from infinity to a certain finite object distance D is $\delta_{TF}$, there are given:

$$\delta_{wf} = \frac{f_w^2}{D - f_w} \quad (c_1)$$

$$\delta_{TF} = \frac{f_T^2}{D - f_T} \quad (c_2)$$

Assuming here that $(f_T - f_w) < < D$, the approximation that $f_w \approx D - f_T$ can be done and further, assuming that the zoom ratio is $Z(=f_T/f_w)$, the following is obtained from the equations ($c_1$) and ($c_2$):

$$\frac{\delta_{TF}}{\delta_{wF}} \approx \frac{f_T^2}{f_w^2} = Z^2 \quad (d)$$

This formula (d), when the lens system is fixed during the focusing from infinity to the finite object distance D, shows the ratio between the fluctuations of the image plane position at the telephoto end and the wide angle end by the focusing.

By substituting the equations (a₁) and (a₂) for the formula (d), the following equation is obtained:

$$\frac{(f_W)^2}{(f_T)^2} = \frac{(f_{12W} \cdot \beta_{3W} \cdot \beta_{4W})^2}{(f_{12T} \cdot \beta_{3T} \cdot \beta_{4T})^2}$$

When the zoom ratio is Z ($=f_T/F_W$), the above equation becomes:

$$\frac{(f_{12T})^2}{(f_{12W})^2} = \frac{(\beta_{3W} \cdot \beta_{4W})^2 \cdot Z^2}{(\beta_{3T} \cdot \beta_{4T})^2} \tag{e_1}$$

When the amount of displacement of the image point position at the wide angle end formed by the first lens group G1 and the second lens group G2 due to the focusing from infinity to the finite object distance D is $\delta_{12W}$ and the amount of displacement of the image point position at the telephoto end formed by the first lens group G1 and the second lens group G2 due to the focusing from infinity to the finite object distance D is $\delta_{12T}$, the above equation ($e_1$) becomes:

$$\frac{\delta_{12T}}{\delta_{12W}} = \frac{(\beta_{3W} \cdot \beta_{4W})^2 \cdot Z^2}{(\beta_{3T} \cdot \beta_{4T})^2} \tag{e_2}$$

Assuming here that the relation that $(\beta_{3W}\cdot\beta_{4W})^2/(\beta_{3T}\cdot\beta_{4T})^2 > 1$ is established, the above equation ($e_2$) becomes:

$$\delta_{12T}/\delta_{12W} > Z^2 \tag{f}$$

From this expression (f), the ratio between the amounts of displacement of the image point position formed by the first and second lens groups due to the focusing from infinity to the finite object distance D at the wide angle end and the telephoto end becomes greater than the square of the zoom ratio. Also, thereby, the ratio between the amounts of movement necessary for the focusing of the third lens group and the fourth lens group which are the focusing groups at the telephoto end and the wide angle end becomes greater than the square of the zoom ratio.

Accordingly, if an attempt is made to secure the amount of movement for focusing mechanically controllable at the wide angle end, the amount of movement for focusing at the telephoto end will become excessively great to cause the bulkiness of the focusing mechanism, and this is not preferable. In addition, the burden for magnification change in the first lens group and the second lens group will become excessively great and therefore, the focal lengths of these groups will have to be made small, and aberration correction will become very difficult.

On the other hand, assuming that the relation that $(\beta_{3W}\cdot\beta_{4W})^2/(\beta_{3T}\cdot\beta_{4T})^2 < 1$ is established, from the equation ($e_2$), the following is given:

$$\delta_{12T}/\delta_{12W} < Z^2 \tag{g}$$

From this formula, the ratio between the amounts of displacement of the image point position formed by the first lens group G1 and the second lens group G2 due to the focusing from infinity to the finite object distance D at the wide angle end and the telephoto end becomes smaller than the square of the zoom ratio Z. Therefore, the ratio between the amounts of movement required for the focusing of the third lens group G3 and the fourth lens group G4 as the focusing groups at the telephoto end and the wide angle end is also held down to smaller than the square of the zoom ratio Z and thus, it becomes possible to minimize the amounts of movement of the focusing groups G3 and G4 by focusing, and the compactness of the focusing mechanism can be achieved.

From what has been described above, it is necessary to design the zoom lens such that the ratio between the wide angle end and the telephoto end at the combined imaging magnification (the combined lateral magnification) of the third lens group G3 and the fourth lens group G4 satisfies the relation that $$(\beta 3W.\beta 4W)^2/(\beta 3T.\beta 4T)^2 < 1$$

Here, $\beta 3W.\beta 4W < 0$ and $\beta 3T.\beta 4T < 0$ and therefore, it is necessary to satisfy the relation that $$\beta 3W.\beta 4w > \beta 3T.\beta 4T \tag{1}$$

Now, assuming that the third lens group G3 and the fourth lens group G4 which are endowed with both the magnification changing function and the focusing function are movable as a unit during focusing, and when these two groups are regarded as a single focusing group G34, a schematic diagram of the framework of the zoom lens of the present invention when focused on an infinity object in a certain focal length state is shown in FIG. 2.

As shown in FIG. 2, parallel light rays from infinity, when passed through the positive first lens group G1, are subjected to converging action and an image point 01 is made. This image point 01 provides the object point for the negative second lens group G2, and when it is subjected to the diverging action by this second lens group G2, an image point 02 is made. Further, this image point 02 provides the object point for the positive focusing group G34 comprising the third lens group G3 and the fourth lens group G4, and the light rays passed through the second lens group G2 are subjected to converging action by the focusing group G34 and are imaged at an image point 03.

When under the above-described imaging relation, the focal length of the focusing group G34 (the combined focal length of the third lens group G3 and the fourth lens group G4) is $f_{34}$ and the distance from the focusing group G34 to the object point 02 is S2 and the distance from the focusing group G34 to the image point 03 is S3, from the imaging relation that $$\frac{1}{S_2} + \frac{1}{S_3} = \frac{1}{f_{34}}$$

the following equation is given:

$$S_2 + S_3 = \frac{S_2{}^2}{S_2 - f_{34}} \tag{h}$$

Here, seeking the minimum value of S2+S3 to achieve the compactness of the focusing group G34, the minimum value of S2+S3 is $4f_{34}$ when $S2=S3=2f_{34}$.

At this time, the imaging magnification $\beta_{34}$ of the focusing group G34 in a certain focal length state (the combined imaging magnification of the imaging magnification $\beta_3$ of the third lens group G3 and the imaging magnification $\beta_4$ of the fourth lens group G4 in a certain focal length state) is $$\beta_{34} = -\frac{S_3}{S_2} = -\frac{2f_{34}}{2f_{34}} = -1$$

If under such an imaging relation, an attempt is made to effect focusing on an object at a short distance, the object point 02 of the focusing group G34 will move to the image side and therefore, the object point distance will become shorter and correspondingly thereto, the image point 03 will also move more rearwardly. However, the position of the image point 03 must be immovable because it corresponds to the image plane of the entire lens system.

It can be understood that for the reason set forth above, when the imaging magnification $\beta_{34}$ of the focusing group G34 in the infinity photographing state is $-1$ time, the image point 03 is displaced and therefore short distance focusing becomes impossible. Accordingly, design must be made such that over all the magnification change area, the imaging magnification $\beta_{34}$ of the focusing group G34 in the infinity photographing state may not be $-1$ time as shown in the following condition (i):

$$\beta_{34} \neq -1 \tag{i}$$

Also, to secure the back focal length of the lens system sufficiently, as shown in FIG. 2, the relation that $S_2 < S_3$ must be satisfied over all the magnification change area, in other words, the imaging magnification of the focusing group G34 must satisfy at least the following condition:

$$\beta_{34} < -1 \tag{j}$$

To satisfy the above-mentioned conditions (i) and (j) and moreover make the focusing on an infinity object to a short distance object possible, design must be made to satisfy the following condition:

$$\beta_{34} < \beta_{34}' \leq -1 \tag{k}$$

where $\beta_{34}$ is the imaging magnification of the focusing group G34 in a state focused to infinity at a certain magnification, and $\beta_{34}'$ is the magnification of the focusing group G34 in a state focused to the closest distance from the infinity focused state.

That is, when the focusing on the infinity object to the short distance object is effected, the imaging magnification $\beta_{34}$ of the focusing group G34 focused on the infinity object becomes greater and the time when the short distance in-focus magnification $\beta_{34}'$ becomes $-1$ time is the focus limit.

So, in the present invention, as shown in the condition (1), the combined imaging magnifications of the third lens group G3 and the fourth lens group G4 at the wide angle end become greater than those at the telephoto end and therefore, the range in which the combined imaging magnification of the third lens group G3 and the fourth lens group G4 at the wide angle end is optimum is found out in the following condition (2):

$$\beta_{3W}.\beta_{4W} < -1.3 \tag{2}$$

If the range of this condition (2) is exceeded, sufficient focusing on a short distance object will become impossible. Also, it will become difficult to secure the back focal length at the wide angle end sufficiently and further, during focusing, the third lens group G3 and the fourth lens group G4 as the focusing group will move toward the image plane. Accordingly, if this zoom lens is applied to a single-lens reflex camera, it will become difficult to secure the space in which a quick return mirror is to be disposed, and this is not preferable.

To secure a back focal length of 37 mm or more at the wide angle end when as in the first embodiment of the present invention, focusing is effected on a short distance object at a photographing distance of the order of $R = 850$ mm, it is desirable that the combined imaging magnification of the third lens group G3 and the fourth lens group G4 in the infinity in-focus state satisfy the following range:

$$\beta_3.\beta_4 < -1.35$$

Also, to achieve the compactness of the zoom lens system, it is preferable that the combined imaging magnification of the third lens group G3 and the fourth lens group G4 further satisfy the following condition:

$$\beta_3.\beta_4 > -2$$

If the range of this condition is exceeded, the back focal length at the wide angle end will become too great and it will become difficult to achieve the compactness of the lens system.

Now, in a zoom lens like that of the present invention, to realize the compactness thereof reliably and yet achieve sufficient aberration correction, it is desirable that the following condition be satisfied:

$$1.4 < f_4/f_3 < 4 \tag{3}$$

where
$f_3$: the focal length of the third lens group G3
$f_4$: the focal length of the fourth lens group G4.

If the upper limit of the condition (3) is exceeded, the power (refractive power) of the third lens group G3 will become excessively great and to achieve good aberration correction, it is necessary to increase the number of lens components of the third lens group G3. Therefore, the bulkiness of the lens system will of course result and with the increase in the weight of the third lens group having the focusing and magnification changing functions, the operability regarding focusing and zooming will be deteriorated. Also, the power (refractive power) of the fourth lens group G4 will become smaller and therefore it will become difficult to obtain the effect of floating sufficiently.

Conversely, if the lower limit of the condition (3) is exceeded, the power (refractive power) of the fourth lens group G4 will become excessively great and it will become difficult to obtain the effect of floating sufficiently.

Further, to sufficiently correct various aberrations including the curvature of image field in each magnification change state over the wide angle end to the telephoto end, it is preferable that design be made so as to satisfy the following range:

$$1.55 < f4/f3 < 2.5$$

In the foregoing, description has been made that the third lens group G3 and the fourth lens group G4 which together constitute the focusing group G34 are moved as a unit to thereby effect focusing, but if in focusing, the focusing group G34 is thus moved as a unit toward the image side, curvature of image field will occur very greatly.

It is often the case that the magnitude at which this curvature of image field occurs and the direction in which it occurs differ between the wide angle end and the telephoto end, and in every magnification change state from the wide angle end to the telephoto end, it becomes very difficult to correct the curvature of image field well from infinity to the closest distance.

So, the present invention makes it possible to apply a short distance correcting mechanism, so-called floating, generally applied in a wide angle lens, a macro lens or the like to the inner focus system or the rear focus system of a zoom lens to thereby extract an excellent imaging performance over infinity to a short distance even in every magnification change state.

In a zoom lens of positive-negative-positive-positive four-group construction like the embodiment of the present invention, if during the focusing on an infinity object to a short distance object, the spacing between the third lens group G3 and the fourth lens group G4 which are endowed with both the magnification changing function and the focusing function is enlarged, spherical aberration will hardly vary, but curvature of image field will occur in the positive direction and correspondingly thereto, coma will vary greatly. In contrast, if during focusing on an infinity object to a short distance object, the spacing between the third lens group G3 and the fourth lens group G4 is reduced, spherical aberration will hardly fluctuate, but curvature of image field will vary greatly in the negative direction. Accordingly, it is possible to improve the imaging performance by making the third lens group G3 and the fourth lens group G4 suitably float during focusing.

Thus, the present invention makes it possible to positively utilize the effect of floating during focusing to thereby extract an excellent imaging performance over an infinity object to a short distance object in every magnification change state.

Specifically, in a zoom lens of positive-negative-positive-positive four-group construction like the embodiment of the present invention, if the third lens group G3 and the fourth lens group G4 are moved as a unit toward the image side to effect focusing on an infinity object to a short distance object, both of the two lens groups have the tendency that at the wide angle end, curvature of image field occurs very greatly in the negative direction. Therefore, in the present invention, during focusing on an infinity object to a short distance object, at least the wide angle end, the amount of movement of the fourth lens group G4 toward the image side is made great relative to that of the third lens group G3, and the spacing between the third lens group G3 and the fourth lens group G4 is enlarged to thereby correct curvature of image field well-balancedly. Also, at the intermediate focal length and the telephoto end, the spacing between the third lens group G3 and the fourth lens group G4 is varied well-balancedly while these lens groups G3 and G4 are moved toward the image side in conformity with the direction of occurrence and magnitude of the curvature of image field during the focusing on an infinity object to a short distance object, thereby correcting the curvature of image field very well.

To positively extract the effect of floating as described above, it is desirable that the following conditions be satisfied:

$$1.05 < \frac{DX_{4W}(R)}{DX_{3W}(R)} < 1.7 \tag{4}$$

$$0.7 < \frac{DX_{4T}(R)}{DX_{3T}(R)} < 1.4 \tag{5}$$

where $DX_{3W}(R)$: the amount of movement of the third lens group G3 required for focusing to infinity to any photographing distance R at the wide angle end;

$DX_{4W}(R)$: the amount of movement of the fourth lens group G4 required for focusing to infinity to any photographing distance R at the wide angle end;

$DX_{3T}(R)$: the amount of movement of the third lens group G3 required for focusing to infinity to any photographing distance R at the telephoto end; and $DX_{4T}(R)$: the amount of movement of the fourth lens group G4 required for focusing to infinity to any photographing distance R at the telephoto end.

If the lower limit of the condition (4) is exceeded, curvature of image field will occur very greatly in the negative direction during short distance focusing, and conversely, if the upper limit of the condition (4) is exceeded, curvature of image field will occur very greatly in the positive direction during short distance focusing, and this is not preferable. Moreover, the amount of movement of the fourth lens group G4 during focusing will become great and therefore, during short distance focusing, the back focal length will become too short and it will become difficult to secure the space for a quick return mirror necessary for a single-lens reflex camera.

Also, if the lower limit of the condition (5) is exceeded, curvature of image field will occur very greatly in the negative direction during short distance focusing, and conversely, if the upper limit of the condition (5) is exceeded, curvature of image field will occur very greatly in the positive direction during short distance focusing, and this is not preferable.

Some embodiments of the present invention will hereinafter be described in greater detail with reference to the accompanying drawings.

EMBODIMENT 1

The zoom lens of a first embodiment, as shown in FIG. 1, comprises, in succession from the object side, a first lens group G1 of positive refractive power, a second lens group G2 of negative refractive power, a third lens group G3 of positive refractive power and a fourth lens group of positive refractive power, and is designed such that during the magnification change from the wide angle side to the telephoto side, all lens groups are moved toward the object side along the optic axis and during focusing on an infinity object to a short distance object, the third lens group G3 and the fourth lens group G4 are moved toward the image side on the optic axis.

Describing the construction of each lens group, the first lens group G1 of positive refractive power comprises, in succession from the object side, a negative meniscus lens L11 having its convex surface facing the object side, a biconvex positive lens L12 cemented thereto, and a positive meniscus lens L13 having its convex surface facing the object side, and the second lens group G2 of negative refractive power comprises a negative meniscus lens L21 having its convex surface facing the object side, a biconcave negative lens L22 having its surface of sharper curvature facing the object side, a biconvex positive lens L23 and a biconcave negative lens L24 cemented thereto. The third lens group G3 of positive refractive power comprises a biconvex positive lens L31, a biconvex positive lens L32 and a biconcave negative lens L33 cemented thereto, and further the fourth lens group G4 of positive refractive power comprises a positive lens L41 having its surface of sharper curvature facing the image side, a biconvex positive lens L42 and a negative lens L43 having its concave surface of sharper curvature facing the object side.

The numerical values of this zoom lens are shown in Table 1. In the table, F represents focal length, and the character FN represents F-number. In the upper stage of Table 1, the character r represents the radius of curvature of each lens surface, the character d represents the spacing between the lens surfaces, the character n represents the refractive index of each lens, the character Abbe represents Abbe number, and the suffix numbers represent the order from the object side. The middle stage of Table 1 shows the spacings between the lens groups at six positions (F=36.0, 50.0, 60.0, 70.0, 85.0, 103.0) corresponding to six magnification change states from the wide angle end to the telephoto end.

The lower stage of Table 1 shows the value of each coefficient representing the shape of the aspherical surface formed on the object side lens surface (r6) of the negative meniscus lens L21 in the second lens group G2.

When the height from the optic axis is h and the distance from the tangential plane at the vertex of the aspherical surface at the height h is x and the cone constant is k and the 2nd-order, fourth-order, 6th-order, 8th-order and 10th-order aspherical surface coefficients are $C_2$, $C_4$, $C_6$, $C_8$ and $C_{10}$, respectively, and the paraxial radius of curvature is r, the aspherical surface is expressed by the following aspherical surface equation:

$$x = \frac{h^2/r}{1 + \sqrt{1 - kh^2/r^2}} + \sum_{i=1}^{5} c_{2i} \cdot h^{2i}$$

In the lower stage of Table 1 showing the numerical values of the lens system, the values of the cone constant k and the 2nd-order, 4th-order, 6th-order, 8th-order and 10th-order aspherical surface coefficients $C_2$, $C_4$, $C_6$, $C_8$ and $C_{10}$ are given in succession from above. E-n in the values of the aspherical surface coefficients represents $10^{-n}$. In FIG. 2, the movement locus of each lens group during magnification change is also shown. In this figure, the horizontal axis (the direction of the optic axis) and the vertical axis (the direction $\theta$) are chosen such that the movement locus of the first lens group G1 during magnification change is a straight line forming an angle of 45° with respect to the optic axis.

In the zoom lens according to the first embodiment of the present invention, the values of the amount of movement $\Delta X$ in the direction of the optic axis for effecting focusing while effecting so-called floating by the third lens group G3 and the fourth lens group G4 in order to minimize the short distance aberration fluctuation at a photographing distance R=1000 mm (1 m) and keep a high imaging performance, and values $\phi$ resulting from this value $\Delta X$ being converted into the direction of rotation $\theta$ about the optic axis in the movement locus shown in FIG. 1 are shown in Table 2. In Table 2, the character F indicates the focal length of the entire system, (1)-(4) represent the first lens group G1 to the fourth lens group G4, and the character R represents the object distance.

As shown in Table 2, during focusing, only the third lens group G3 and the fourth lens group G4 are moved on the optic axis and the first lens group G1 and the second lens group G2 are fixed.

Description will now be made of a method of variable-converting the movement locus including a guide groove parallel to the optic axis into the direction $\theta$ with $\Delta X$ and $\phi$ as variables. The converted focus cam and zoom cam are actually determined from three variables, i.e., the converted value $\phi$, $\Delta X$ before being converted and a new value $\Delta F$.

The value of the amount of relative movement $\Delta F$ for the focusing of the herein introduced focus cam and zoom cam in the direction of the optic axis is a constant value for one and the same photographing distance irrespective of the state of magnification change and thus, prescribes the amounts of movement of the focusing lens groups which are moved for focusing. In other words, even if the amounts of movement of the focusing lens groups during focusing differ from each other, and even if the state of magnification change differs, the focus cam and zoom cam are moved by the same value $\Delta F$ relative to each other in the direction of the optic axis, whereby focusing becomes possible.

Figure 3A:
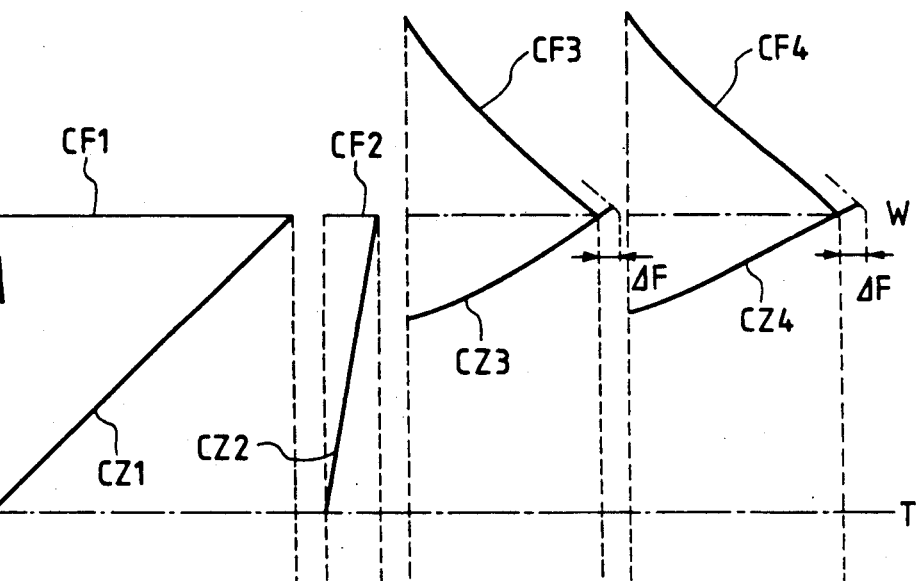
FIGS. 3A and 3B are developed views of cam loci schematically showing a zoom cam and a focus cam before and after in the zoom lens shown in FIG. 2, the movement locus is changed with respect to the focusing system by the third lens group and the fourth lens group.
Figure 3B:
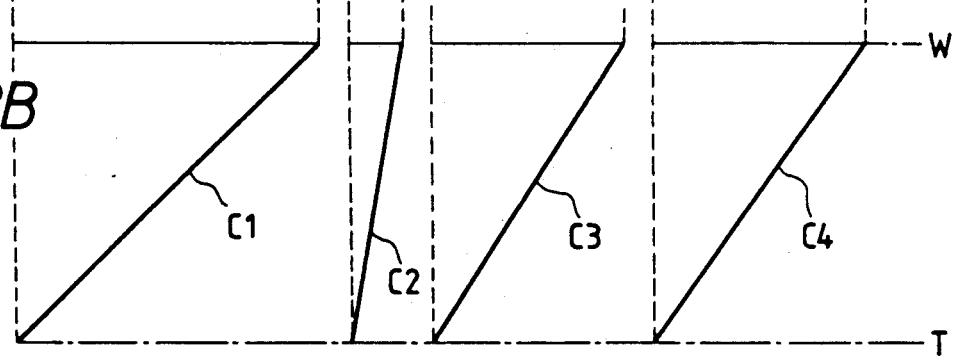

FIG. 3 schematically shows the shapes of focus cams CF1, CF2, CF3, CF4 and zoom cams CZ1, CZ2, CZ3, CZ4 obtained by the conversion of the movement loci based on the present invention, with respect to the zoom lens of the first embodiment shown in FIG. 1 and Table 1, and to show the comparison with the movement loci before being converted, the movement loci C1, C2, C3 and C4 of the respective lens groups in the prior-art system before being converted are shown in FIG. 3B.

Figure 4A:
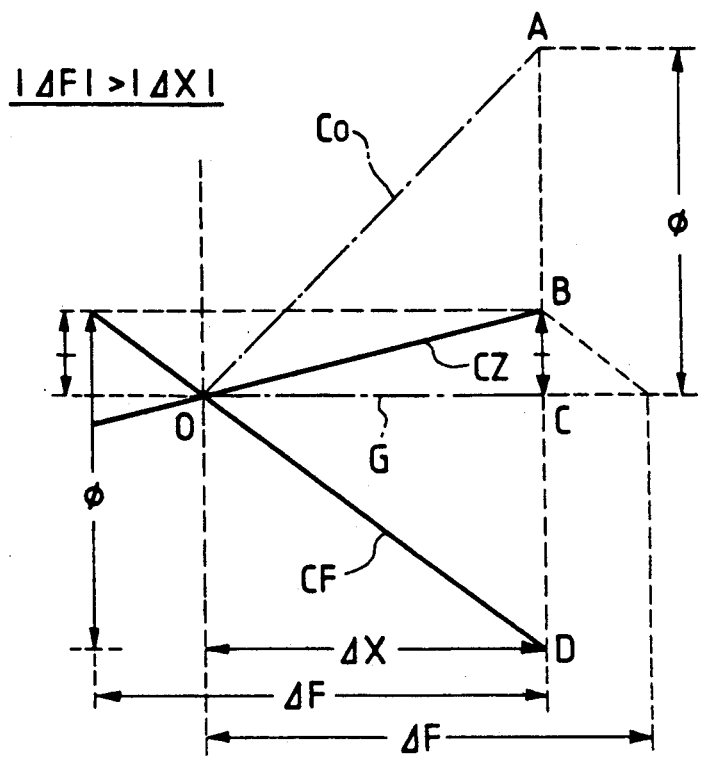
FIGS. 4A and 4B illustrate the change relation of the changing operation used for the change of the movement loci of FIG. 3.
Figure 4B:
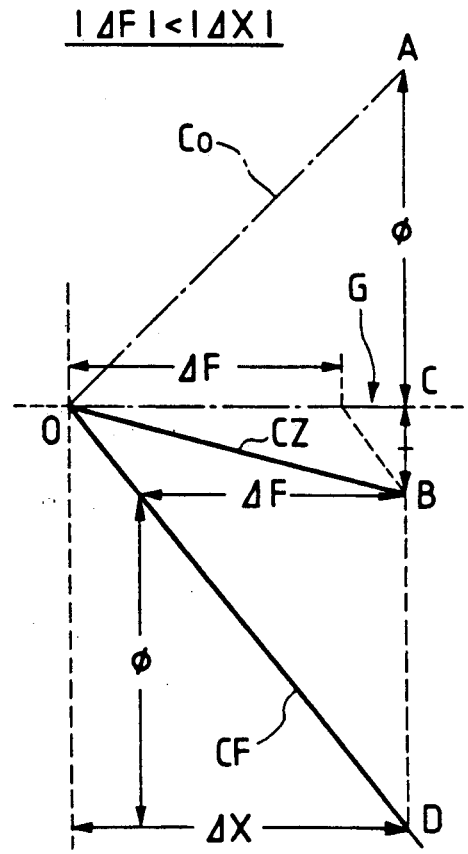

FIGS. 4A and 4B show that the movement loci before being converted are variable-converted with the angle of rotation $\phi$ of the rotatable lens barrel, the amount of movement $\Delta X$ on the optic axis of the lens group moved for focusing and the amount of relative movement $\Delta F$ of the focus cams CF and zoom cams CZ in the direction of the optic axis as variables.

The operation for finding the focus cams CF3, CF4 and zoom cams CZ3, CZ4 after being converted as shown in FIG. 3 will now be described with reference to FIG. 4A and 4B. The movement locus C before being converted, as shown, comprises a locus before being converted corresponding to the guide groove for magnification change formed in the rotatable lens barrel to prescribe the movement locus for magnification change of the magnification changing lens group, and a guide groove parallel to the optic axis for controlling the movement of the lens groups to the direction of the optic axis.

The relation between the respective variables before and after the conversion is generally varied by various factors such as the direction of movement of the focusing lens group during magnification change, the direction of movement thereof during focusing, the way of choosing the sign of $\Delta F$ and the magnitude relation between ΔF and ΔX, but the conversion relations based on the movement loci shown as a specific example in FIG. 1 and the amounts of movement shown in Table 2 are shown in FIGS. 4A and 4B. That is, these figures show the conversion relation when the magnification changing lens group having the focusing function is moved toward the object side in accordance with the magnification change from the wide angle end to the telephoto end and during focusing, is moved from the telephoto side to the wide angle side on the movement locus for magnification change so as to be moved toward the image side and further the signs of ΔF and ΔX are chosen as the same sign. Due to the magnitude relation between ΔF and ΔX, the conversion relation is divided into the case of FIG. 4A and the case of FIG. 4B. In these figures, the dot-and-dash line shown as the locus Co before being converted is the movement locus of the magnification changing and focusing lens group during magnification change before the conversion which corresponds to the value $\phi$ obtained by converting the amount of movement in the direction of the optic axis necessary for the focusing of the magnification changing and focusing lens group in any magnification change state into the direction $\theta$. Also, the dot-and-dash line shown as a guide groove G is a straight locus parallel to the optic axis, in the structure of the lens barrel. If these two loci are converted under the relation among $\phi$, ΔX and ΔF shown, there will be obtained the tracks of the focus cam CF and zoom cam CZ as indicated by thick lines in the figures.

The correspondence relation between magnification change and focusing before and after the conversion will be described here.

Let it be assumed that in a certain magnification change state, the position of the magnification changing and focusing lens group when the photographing distance is infinity lies at a position indicated by a point 0. When from this state, the guide groove G is parallel-moved by $\phi$ in the direction of the vertical axis (the direction of the angle of rotation $\theta$ of the rotatable lens barrel) for the purpose of magnification change, the locus Co before converted and the guide groove G intersect each other at a point A and the magnification changing and focusing lens group moves in the direction of the optic axis by an amount ΔX corresponding to the distance from the point 0 to a point C. Likewise, when the focus cam CF after being converted is moved by $\phi$ in the direction of the vertical axis for the purpose of magnification change, the focus cam CF intersects the zoom cam CZ at a point B and as before the conversion, the magnification changing and focusing lens group moves in the direction of the optic axis by an amount ΔX also corresponding to the distance from the point 0 to the point C. Thus, during magnification change, the positional relation in the direction of the optic axis is kept before and after the conversion.

On the other hand, during focusing, when the focus cam CF after being converted is moved by ΔF in the direction of the optic axis, it intersects the zoom cam CZ at the point B and the magnification changing and focusing lens group moves in the direction of the optic axis by the amount ΔX corresponding to the distance from the point 0 to the point C, and this amount becomes equal to the amount of movement necessary for the focusing before the conversion.

Accordingly, by the conversion being effected under the relations shown in FIGS. 4A and 4B, the correspondence relation is satisfied before and after the conversion with regard to both of magnification change and focusing.

Although in the description of FIGS. 4A and 4B, the amount of movement during magnification change has been described as the same value ΔX as the amount of movement during focusing, this is merely for the convenience of description, and the two amounts of movement generally assume different values.

The converting operation as described above is that in the case where desired short distance focusing is effected in a certain magnification change state with the position of the magnification changing and focusing lens group when the photographing distance is infinity as a reference, and even in a different magnification change state, the movement locus before being converted in that state can be likewise converted to determine the locus of the focus cam and the locus of the zoom cam. By the conversion of the movement locus being executed over the entire magnification change area in this manner, the final focus cam CF and zoom cam C8 are determined as shown in FIG. 3. Here, by the value of ΔF to a predetermined photographing distance object being made constant and the converting operations as shown in FIGS. 4A and 4B being successively effected along the movement locus, the focus cam is formed into a non-linear shape having an area inclined with respect to the optic axis.

It is FIG. 3 that shows the state of the final movement locus determined from ΔX and $\phi$ shown in Table 2 when in the above-described first embodiment, with regard to the third lens group G3 and the fourth lens group G4 as the magnification changing and focusing lens group, the value of the amount of relative movement ΔF of the focus cam CF and zoom cam CZ in the direction of the optic axis necessary for the focusing on an object at an object distance R = 1000 mm (1 m) is set to ΔF = −3.5 mm. In FIG. 3, the relation between the conversions of the focus cams CF1, CF2, CF3, CF4 and the zoom cams CZ1, CZ2, CZ3, CZ4 for providing the movement loci of the respective lens groups is shown with the magnification change state of the wide angle end W as the reference, and by the focus cams CF1, CF2, CF3, CF4 and the zoom cams CZ1, CZ2, CZ3, CZ4 moving relative to each other in a direction perpendicular to the optic axis (the vertical direction in FIG. 3), each lens group is moved on the optic axis in conformity with the movement of the point of intersection between the cams, whereby magnification change is effected. As shown in FIG. 3, the movement loci of the first lens group G1 and the second lens group G2 exclusively for magnification change which do not have the focusing function, again in the construction of the present invention, are the same as those before being converted, and the focus cams CF1 and CF2 are guide grooves parallel to the optic axis.

Here, the movements of the third lens groups G3 and the fourth lens group G4 as the magnification changing and focusing lens group will be described with reference to FIGS. 5A and 5B.

FIGS. 5A and 5B are developed views of a first lens barrel 10 having zoom cams CZ3 and CZ4 and a second lens barrel 20 having focus cams CF3 and CF4, respectively, FIG. 5A showing variations in the in-focus state caused by the relative movement of the two lens barrels in the direction of the optic axis, and FIG. 5B showing variations in the magnification change state caused by the relative rotation of the two lens barrels.

During focusing, as shown in FIG. 5A, the second lens barrel 20 having focus cams CF3 and CF4 is moved by $\Delta F$ toward the image side (rightwardly as viewed in the figure) along the optic axis relative to the first lens barrel 10 having zoom cams CZ3 and CZ4. Therefore, the point of intersection $g_{31}$ between the zoom cam CZ3 and the focus cam $CF3_1$ in the infinity in-focus state moves along the zoom cam CZ3 to the point of intersection $g_{32}$ between the zoom cam CZ3 and the focus cam $CF3_2$ after the relative displacement, whereby the third lens group G3 is moved by $\Delta XF_3$ toward the image side in the direction of the optic axis. Also, the point of intersection $g_{41}$ between the zoom cam CZ4 and the focus cam $CF4_1$ in the infinity in-focus state moves to the point of intersection $g_{42}$ between the zoom cam CZ4 and the focus cam $CF4_2$ after the relative displacement, whereby the fourth lens group G4 is moved by $\Delta XF_4$ toward the image side in the direction of the optic axis. By the second lens barrel 20 being thus moved by $\Delta F$ in the direction of the optic axis relative to the first lens barrel 10, the third lens group G3 and the fourth lens group G4 as the magnification changing and focusing group can be moved by $\Delta XF_3$ and $\Delta XF_4$, respectively, on the optic axis, whereby focusing to a desired object distance is accomplished.

On the other hand, during magnification change, as shown in FIG. 5B, the first lens barrel 10 having zoom cams CZ3 and CZ4 is rotatively moved by $\Delta\phi$ upwardly about the optic axis as viewed in the figure relative to the second lens barrel 20 having focus cams CZ3 and CZ4. Therefore, the position of the third lens group G3 determined by the point of intersection $g_{31}$ between the focus cam CF3 and the zoom cam $CZ3_1$ in a certain magnification change state moves to the position determined by the point of intersection $g_{33}$ between the focus cam CF3 and the zoom cam $CZ3_2$ which is indicated by a broken line, after the relative rotative displacement of the first and second lens barrels 10 and 20, and the amount of movement on the optic axis is $\Delta XZ_3$. Also, in the fourth lens group G4, the position determined by the point of intersection $g_{41}$ between the focus cam CF4 and the zoom cam $CZ4_1$ moves to the position determined by the point of intersection $g_{43}$ between the focus cam CF4 and the zoom cam $CZ4_2$ which is indicated by a broken line, after the relative rotative displacement of the lens barrels 10 and 20, and the amount of movement on the optic axis is $\Delta XZ_4$. By the first lens barrel 10 being thus rotatively moved by $\Delta\phi$ about the optic axis relative to the second lens barrel 20, the third lens group G3 and the fourth lens group G4 as the magnification changing and focusing group can be moved by $\Delta XZ_3$ and $\Delta XZ_4$, respectively, on the optic axis, whereby the shift to a desired magnification change state is accomplished.

As described above, by utilizing the movement loci after being converted, during focusing, the magnification changing and focusing lens group is moved along the movement loci (zoom cams) moved during magnification change, thereby enabling focusing to be accomplished. That is, during magnification change, one of the focus cam (with regard to the first and second lens groups, the straight groove for guide) and the zoom cam is rotatively moved in the direction $\theta$ about the optic axis, whereby the position of each lens group on the optic axis is varied to effect magnification change, and during focusing, even if the amounts of movement of the individual focusing lens groups in the direction of the optic axis differ for the same photographing distance, the focus cam is moved by $\Delta F$ (in the first embodiment, $R=1000$ mm and $\Delta F=-3.5$ mm), whereby focusing in accomplished.

Table 3 shows the amount of axial movement $\Delta F(DF)$ of the second lens barrel having focus cams for focusing when the photographing distances R in the respective magnification change states at the focal length $F=36, 50, 60, 70, 85, 103$ mm calculated from the movement loci after being converted are $R=850, 1000, 1500, 2000, 3000, 5000$ mm, the actual amount of axial movement $\Delta X(DX)$ of each lens group corresponding to $\Delta F$, and the amount of displacement (BF) of the imaging point when the amount of displacement $\Delta X$ on the optic axis is given to each lens group.

The upper stage of this Table 3 shows the amount of displacement (BF) of the imaging point with respect to various photographing distances R in various magnification change states, and the middle stage thereof shows the amount of movement $\Delta F(DF)$ of the focus cam necessary for optimum focusing to be effected for each photographing distance R. Such a value that the displacement of the imaging point becomes null at the telephoto end is chosen as the amount of movement $\Delta F(DF)$ of the focus cam. The lower stage of Table 3 shows the value of the actual amount of axial movement $\Delta X(DX)$ of each lens group corresponding to each $\Delta F$ with respect to cases where the photographing distances R in the respective magnification change states at the focal length $F=36, 50, 60, 70, 85, 103$ mm are $R=850, 1000, 1500, 2000, 3000, 5000$ mm. Also, in this lower stage, the numbers at the left end side indicate the focal lengths F of the entire system, and the numbers at the right end side indicate the photographing distances R. The intermediate numbers are the values of the actual amounts of axial movement $\Delta X(DX)$ of the first lens group G1, the second lens group G2, the third lens group G3 and the fourth lens group G4 in the named order. As regards any of these values, the case where the lens groups are moved toward the object side is shown as a positive value.

As shown in Table 3, the amounts of displacement (BF) of the imaging point for the respective focal lengths F and photographing distances R are small, and of the order of 0.138 mm at greatest, and are sufficiently within the depth of focus in any magnification change state and for every object distance. Accordingly, it is seen that good focusing can always be accomplished over the full magnification change area by a very simple mechanism comprising the relative movement, in the direction of the optic axis, of the second lens barrel 20 having focus cams and the first lens barrel 10 having zoom cams.

From what has been described above, it is apparent that even if the amount of axial movement during focusing differs depending on each magnification change state, each photographing distance and further the focusing group, a new variable $\Delta F$ as the relative amount of movement of the focus cams CF1, CF2, CF3, CF4 and the zoom cams CZ1, CZ2, CZ3, CZ4 in the direction of the optic axis is set for the purpose of focusing, whereby the amount of movement of the movable members in the direction of the optic axis necessary for focusing is accomplished at a predetermined amount $\Delta F$ without being varied by the magnification change state and thus, so-called manual focusing can be coped with. It is as shown in the middle stage of Table 3 that the amount of relative movement $\Delta F(DF)$ of the cams in the direction of the optic axis varies in conformity with the photographing distance R.

Table 4 is a table in which the values of ΔF necessary for optimizing the amount of displacement of the imaging point resulting from focusing so as to become completely zero are found from the movement loci after being converted, with respect to respective magnification change states and photographing distances R. The upper stage of Table 4 shows the optimum amount of axial movement ΔF(DF) of the second lens barrel 20 having focus cams for focusing when the photographing distances R in the respective magnification change states of the focal lengths F=36, 50, 60, 70, 85, 103 mm are R=850, 1000, 1500, 2000, 3000, 5000 mm. The middle stage of Table 4 shows the amount of movement of the focus cams necessary for optimum focusing to be effected at the telephoto end for each photographing distance R. Also, the lower stage of Table 4 shows the actual amount of axial movement ΔX(DX) of each lens group corresponding to each ΔF, with respect to cases where the photographing distances R in the respective magnification change states at the focal lengths F=36, 50, 60, 70, 85, 103 mm are R=850, 1000, 1500, 2000, 3000, 5000 mm.

From the values in the upper stage of Table 4, it is seen that the values of ΔF(DF) are very close to one another with respect to the same photographing distance R and the amount of variation resulting from magnification change is very small. Accordingly, it is clear that even when the first lens barrel 10 having zoom cams and the second lens barrel 20 having focus cams are displaced in the direction of the optic axis relative to each other by the use of auto focusing, quick responsiveness of focusing becomes better because the amount of correction thereof is very slight.

Now, cam data indicative of the coordinates in the X (optic axis) direction and the direction θ orthogonal to the X (optic axis) direction on the focus cams and zoom cams of the respective lens groups corresponding to Table 3 are given in Tables 5-(1), (2), (3).

From the left end of Tables 5-(1), (2), (3), $\phi f(n)$ represents the coordinates in the direction θ orthogonal to the X (optic axis) direction on the focus cam of the nth lens group, $Xf(n)$ represents the coordinates in the X (optic axis) direction on the focus cam of the nth lens group, $\phi z(n)$ represents the coordinates in the direction θ orthogonal to the X (optic axis) direction on the zoom cam of the nth lens group, $Xz(n)$ represents the coordinates in the X (optic axis) direction on the zoom cam of the nth lens group, F represents the focal length, and R represents the photographing distance In Table 5-(1), there are shown the cam data of the first lens group G1 and the second lens group G2, and the column of the photographing distance R is omitted because the focus cams of the first and second lens groups G1 and G2 are straight guide grooves parallel to the optic axis and the coordinates on the zoom cam are invariable irrespective of the photographing distance R.

In Table 5-(2), there are shown the cam data of the focus cam and zoom cam of the third lens group G3 at each focal length F and each photographing distance R, and in Table 5-(3), there are shown the cam data of the focus cam and zoom cam of the fourth lens group G4 at each focal length F and each photographing distance R.

In Tables 5-(1), (2), (3), for any of the lens groups G1-G4, the coordinates when F=36.023 and r=∞ are the origin, and with respect to $\phi f(3)$ and $\phi f(4)$ corresponding to the amounts of movement, respectively, of the third and fourth lens groups G3 and G4 in the direction θ on the focus cams $CF_3$ and $CF_4$ after being converted which are shown in FIG. 3, the movement on the lower side in the figure is represented as the positive, and with respect to $\phi z(3)$ and $\phi z(4)$ corresponding to the amounts of movement, respectively, of the third and fourth lens groups G3 and G4 in the direction θ on the zoom cams (Z3 and CZ4, the movement on the lower side in the figure is represented as the positive. Also, with respect to $XCf(3)$ and $Xf(4)$ corresponding to the amounts of movement, respectively, of the third and fourth lens groups G3 and G4 in the X (optic axis) direction on the focus cams CF3 and CF4, the movement on the left side (the object side) in the figure is represented as the positive, and with respect to $Xz(3)$ and $Xz(4)$ corresponding to the amounts of movement, respectively, of the third and fourth lens groups G3 and G4 in the X (optic axis) direction on the zoom cams CZ3 and CZ4, the movement on the left side (the object side) in the figure is represented as the positive.

Tables 5-(1), (2), (3) will now be described in detail with reference to FIG. 6, with the movement of the third lens group G3 when focusing is effected from the photographing distance R=∞ to R=3000 in the state of the focal length F=36.023 in the cam data of Tables 5-(1), (2), (3) taken as an example.

Figure 6:
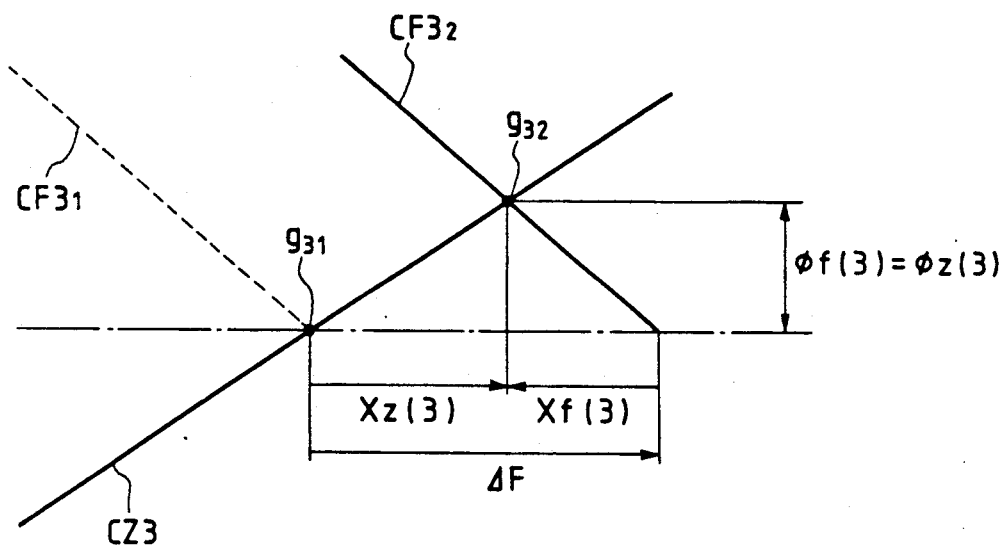
FIG. 6 illustrates the movement of the position of the third lens group by the movement of the focus cam in the direction of the optic axis.

As shown in FIG. 6, the character CZ3 designates the zoom cam of the third lens group G3, the character $CF3_1$ indicates the position of the focus cam in the state of R=∞, and the character $CF3_2$ indicates the position of the focus cam in the state of R=3000. During the focusing from the photographing distance R=∞ to R=3000, as shown, the focus cam moves by ΔF (according to Table 3, ΔF=−1.0285) in the X (optic axis) direction from $CF3_1$ to $CF3_2$, and the position of the third lens group G3 determined by the point of intersection between the focus cam and the zoom cam moves from $g_{31}$ to $g_{32}$.

At this time, as shown in Table 5-(2), the amount of movement, in the direction of the optic axis, of the third lens group G3 moved along the zoom cam CZ3 is $Xz(3) = -0.6321$, and it can be understood that this agrees with Table 3 shown previously. At the same time, the amount of movement, in the direction of the optic axis, of the third lens group G3 moved along the focus cam is $Xf(3) = 0.3964$. Thus, the actual amount of movement ΔF of the focus cam in the direction of the optic axis by the focusing from the photographing distance R=∞ to R=3000 (the amount of movement in the direction of the optic axis from the focus cam $CF3_1$ indicated by a broken line to the focus cam $CF3_2$ indicated by a solid line) is the sum of the absolute values of $Xz(3) = -0.6321$ and $Xf(3) = 0.3964$, i.e., 1.0285, and it can be understood that this value is a value corresponding to ΔF(DF)=−1.0285 shown in the middle stage of Table 3.

On the other hand, as shown in Table 5-(2), the amount of movement, in the direction θ, of the third lens group G3 moved along the zoom cam CZ3 when the focus cam moves from the position $CF3_1$ to the position $CF3_2$ is $\phi z(3) = -0.3729$, and at the same time, the amount of movement, in the direction θ, of the third lens group G3 moved along the focus cam is $\phi f(3) = -0.3729$. That is, from FIG. 6 and the numerical values shown in Table 5-(2), it can be understood that the amounts of movement in the direction θ with respect to the two cams agree with each other.

Thus, it is seen that during focusing, the optical amounts of movement of the third and fourth lens groups G3 and G4 in the direction of the optic axis shown in Table 3 are provided by the zoom cam and focus cam shown in Tables 5-(1), (2), (3).

With regard to the relation between the focus cam and the zoom cam after conversion shown in FIG. 3, it is also possible to change only the angle of intersection between the two cams without affecting the operation for magnification change and focusing, by proportionally enlarging or proportionally reducing all the loci after being converted in the direction $\theta$. It is also possible to set $\Delta F$ with the angle of intersection taken into account in advance.

EMBODIMENT 2

A second embodiment of the present invention shown in FIG. 7 will now be described.

Figure 7:
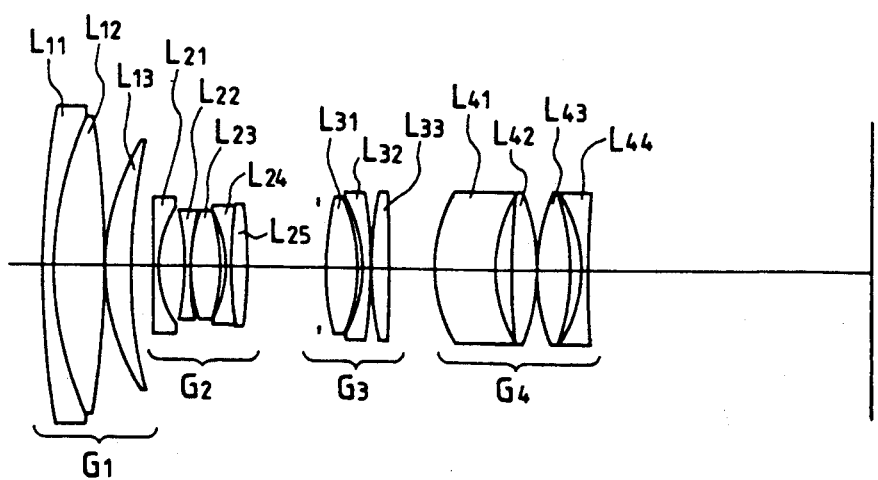
FIG. 7 shows the construction of a lens according to a second embodiment of the present invention.

The second embodiment shown in FIG. 7, like the first embodiment, comprises, in succession from the object side, a first lens group G1 of positive refractive power, a second lens group G2 of negative refractive power, a third lens group G3 of positive refractive power and a fourth lens group G4 of positive refractive power, and is designed such that as shown in the movement loci before being converted in FIG. 8B, during the magnification change from the wide angle side W to the telephoto side T, each lens group is moved toward the object side along the optic axis and during the focusing on an infinity object to a short distance object, the third lens group G3 and the fourth lens group G4 are moved toward the image side on the optic axis while effecting floating with the spacing therebetween being relatively varied.

Further describing the constructions of the respective lens groups, in succession from the object side, the first lens group G1 of positive refractive power comprises a negative meniscus lens L11 having its convex surface facing the object side, a biconvex positive lens L12 cemented thereto and a positive meniscus lens L13 having its convex surface facing the object side, and the second lens group G2 of negative refractive power comprises a negative lens L21 having its concave surface facing the image side, a biconcave negative lens L22, a biconvex positive lens L23, a biconcave negative lens L24 and a biconvex positive lens L25 cemented thereto. Further, the third lens group G3 of positive refractive power comprises a biconvex positive lens L31, a negative meniscus lens L32 having its convex surface facing the image side, and a positive lens L33 having its surface of sharper curvature facing the object side, and the fourth lens group G4 of positive refractive power comprises a meniscus lens L41 having its convex surface facing the object side, a positive lens L42 having its surface of sharper curvature facing the image side, a biconvex positive lens L43 and a negative lens L44 having its concave surface of sharper curvature facing the object side.

The numerical values in the zoom lens of the second embodiment are shown in Table 6, and the actual amount of axial movement $\Delta X$ of each lens group in the direction of the optic axis and the value $\phi$ thereof as converted into the direction $\theta$ when focusing is effected by the third lens group G3 and the fourth lens group G4 being moved while effecting floating in order to hold down the short distance aberration fluctuation at a photographing distance 1400 mm in this zoom lens and keep a high performance are shown in Table 7, as in Table 2.

In FIG. 8, there are shown movement loci after being converted in the converting operation like the conversion relation shown in FIG. 4A with $\Delta F = -2.0$ for the photographing distance R=1400 mm at $\Delta X$ and $\phi$ shown in Table 7.

Table 8, like Table 3, shows the amount of movement $\Delta F(DF)$ of the focus cam when the photographing distances R in the respective magnification change states at the focal length F=36, 50, 70, 85, 103 mm calculated from the movement loci shown in FIG. 8 are R=1400, 1600, 2000, 3000, 5000, 10000 mm, the actual amount of movement $\Delta X(DX)$ of each lens group corresponding to $\Delta F$, and the amount of displacement (BF) of the imaging point when the amount of displacement $\Delta X$ on the optic axis is given to each lens group. From this Table 8, it is seen that the amount of displacement of the imaging point is small and is sufficiently within the depth of focus.

Table 9, like Table 4, is a table in which the values of $\Delta F$ necessary for making the amount of displacement of the imaging point resulting from focusing completely zero are found from the movement loci after being converted, with respect to respective magnification change states and photographing distances R.

Also, in Tables 10-(1), (2), (3), as in Tables 5-(1), (2), (3) previously described, there are shown cam data indicative of the coordinates at the respective photographing distances R and focal lengths on the focus cams and zoom cams of the respective lens groups corresponding to Table 7. In Table 10-(1), there are shown the cam data of the focus cams and zoom cams of the first lens group G1 and the second lens group G2, and in Table 10-(2), there are shown the cam data of the focus cam and zoom cam of the third lens group G3, and in Table 10-(3), there are shown the cam data of the focus cam and zoom cam of the fourth lens group G4.

EMBODIMENT 3

A third embodiment of the present invention will now be described.

As shown in FIG. 9, the third embodiment, like the aforedescribed embodiments, comprises, in succession from the object side, a first lens group G1 of positive refractive power, a second lens group G2 of negative refractive power, a third lens group G3 of positive refractive power and a fourth lens group G4 of positive refractive power, and is designed such that as shown in the movement loci before being converted shown in FIG. 10B, during the magnification change from the wide angle side to the telephoto side, each lens group is moved toward the object side along the optic axis and during the focusing on an infinity object to a short distance object, the third lens group G3 and the fourth lens group G4 are moved toward the image side on the optic axis while effecting floating with the spacing therebetween being relatively varied.

Describing the constructions of the respective lens groups in detail, in succession from the object side, the first lens group G1 of positive refractive power comprises a negative meniscus lens L11 having its convex surface facing the object side, a biconvex positive lens L12 and a positive meniscus lens L13 having its convex surface facing the object side, and the second lens group G2 of negative refractive power comprises a negative meniscus lens L21 having its concave surface facing the image side, a positive lens L22 having its surface of sharper curvature facing the image side, a negative meniscus lens L23 cemented thereto and having its convex surface facing the image side, a biconcave negative lens L24 and a positive lens L25 cemented thereto and having its surface of sharper curvature facing the object side. Further, the third lens group G3 of positive refractive power comprises a positive lens L31 having its surface of sharper curvature facing the image side, a negative meniscus lens L32 having its convex surface facing the image side, and a positive meniscus lens L33 having its convex surface facing the object side, and the fourth lens group G4 of positive refractive power comprises a positive meniscus lens L41 having its convex surface facing the object side, a negative meniscus lens L42 cemented thereto and having its convex surface facing the object side, a biconvex positive lens L43, a positive meniscus lens L44 having its convex surface facing the image side, and a negative meniscus lens L45 cemented thereto and having its convex surface facing the image side.

The numerical values in the zoom lens of the third embodiment are shown in Table 11, and the actual amount of movement ΔX of each lens group in the direction of the optic axis and the value φ thereof as converted into the direction θ when focusing is effected by the third lens group G3 and the fourth lens group G4 being moved while effecting floating in order to hold down the short distance aberration fluctuation at a photographing distance 1400 mm in this zoom lens and keep a high performance are shown in Table 12, as in Table 2.

In FIG. 10, there are shown movement loci after being converted in the converting operation like the conversion relation shown in FIG. 4A with ΔF = −2.0 for the photographing distance R = 1400 mm at ΔX and φ shown in Table 12.

Table 13, like Table 3, shows the amount of movement ΔF(DF) of the focus cam when the photographing distances R in the respective magnification change states at the focal length F = 36, 50, 70, 85, 103 mm calculated from the movement loci shown in FIG. 10 are R = 1400, 1600, 2000, 3000, 5000, 10000 mm, the actual amount of movement ΔX(DX) of each lens group corresponding to ΔF, and the amount of displacement (BF) of the imaging point when the amount of displacement ΔX on the optic axis is given to each lens group. From this Table 13, it is seen that the amount of displacement of the imaging point is small and sufficiently within the depth of focus.

Table 14, like Table 4, is a table in which the value of ΔF necessary to make the amount of displacement of the imaging point resulting from focusing completely zero is found from the movement loci after being converted, with respect to the respective magnification change states and photographing distances R.

Also, in Tables 15-(1), (2), (3), as in Tables 5-(1), (2), (3) previously described, there are shown cam data indicative of the coordinates at the respective photographing distances R and respective focal lengths on the focus cam and zoom cam of each lens group corresponding to Table 13. In Table 15-(1), there are shown the cam data of the focus cams and zoom cams of the first lens group G1 and the second lens group G2, and in Table 15-(2), there are shown the cam data of the focus cam and zoom cam of the third lens group G3, and in Table 15-(3), there are shown the cam data of the focus cam and zoom cam of the fourth lens group G4.

EMBODIMENT 4

A fourth embodiment of the present invention shown in FIG. 11 will now be described.

As shown in FIG. 11, the fourth embodiment also, like the aforedescribed embodiments, comprises, in succession from the object side, a first lens group G1 of positive refractive power, a second lens group G2 of negative refractive power, a third lens group G3 of positive refractive power and a fourth lens group G4 of positive refractive power, and is designed such that as shown in the movement loci before being converted shown in FIG. 12B, during the magnification change from the wide angle side W to the telephoto side T, each lens group is moved toward the object side along the optic axis and during the focusing on an infinity object to a short distance object, the third lens group G3 and the fourth lens group G4 are moved toward the image side on the optic axis while effecting floating with the spacing therebetween being relatively varied.

Describing the constructions of the respective lens groups in detail, in succession from the object side, the first lens group G1 of positive refractive power comprises a negative meniscus lens L11 having its convex surface facing the object side, a biconvex positive lens L12 and a positive meniscus lens L13 having its convex surface facing the object side, and the second lens group G2 of negative refractive power comprises a negative meniscus lens L21 having its convex surface facing the object side, a positive lens L22 having its surface of sharper curvature facing the image side, a negative lens L23 cemented thereto and having its concave surface of sharper curvature facing the object side, a biconcave negative lens L24 and a positive lens L25 cemented thereto and having its surface of sharper curvature facing the object side. Further, the third lens group G3 of positive refractive power comprises a positive lens L31 having its surface of sharper curvature facing the image side, a negative meniscus lens L32 having its convex surface facing the image side, and a positive meniscus lens L33 having its convex surface facing the object side, and the fourth lens group G4 of positive refractive power comprises a meniscus lens L41 having its convex surface facing the object side, a positive meniscus lens L42 having its convex surface facing the image side, a positive lens L43 having its surface of sharper curvature facing the image side, and a negative lens L44 cemented thereto and having its surface of sharper curvature facing the object side.

The numerical values in the zoom lens of the fourth embodiment are shown in Table 16, and the actual amount of movement ΔX in the direction of the optic axis and the value φ thereof as converted into the direction θ when focusing is effected by the third lens group G3 and the fourth lens group G4 being moved while effecting floating in order to hold down the short distance aberration fluctuation at a photographing distance 1500 mm in this zoom lens and keep a high performance are shown in Table 17, as in Table 2.

In FIG. 12, there are shown movement loci after being converted in the converting operation like the conversion relation shown in FIG. 4A with ΔF = −3.5 for the photographing distance R = 1500 mm at ΔX and φ shown in Table 17.

Table 18, like Table 3, shows the amount of movement ΔF(DX) of the focus cam when the photographing distances R in the respective magnification change states at the focal length F = 36, 50, 70, 100, 131 mm calculated from the movement loci shown in FIG. 12 are R=1500, 1700, 2000, 3000, 5000, 10000 mm, the actual amount of movement ΔX(DX) of each lens group corresponding to ΔF, and the amount of displacement (BF) of the imaging point when the amount of displacement ΔX on the optic axis is given to each lens group. From this Table 18, it is seen that the amount of displacement of the imaging point is small and is sufficiently within the depth of focus.

Table 19, like Table 4, is a table in which the values of ΔF necessary for making the amount of displacement of the imaging point resulting from focusing completely zero are found from the movement loci after being converted, with respect to respective magnification change states and photographing distances R.

Also, in Table 20-(1), (2), (3), as in Tables 5-(1), (2), (3) previously described, there are shown cam data indicative of the coordinates at the respective photographing distances R and focal lengths on the focus cams and zoom cams of the respective lens groups corresponding to Table 13. In Table 20-(1), there are shown the cam data of the zoom cams and focus cams of the first lens group G1 and the second lens group G2, and in Table 20-(2), there are shown the cam data of the focus cam and zoom cam of the third lens group G3, and in Table 20-(3), there are shown the cam data of the focus cam and zoom cam of the fourth lens group G4.

As described above, each embodiment can set a predetermined ΔF even if the amount of axial movement differs for each magnification change state and focal length and further for each focusing lens group, and can sufficiently cope with so-called manual focusing.

In Table 21, numerical values corresponding to conditions are given with respect to each embodiment.

TABLE 1

F = 36.0~103.0   FN = 3.6~4.6   2ω = 64.7°~22.8°

| | r | d | Abbe | n |
|---|---|---|---|---|
| 1 | 118.343 | 1.50 | 23.0 | 1.86074 |
| 2 | 58.652 | 7.30 | 69.9 | 1.51860 |
| 3 | −122.366 | .10 | | |
| 4 | 33.396 | 3.80 | 55.6 | 1.69680 |
| 5 | 52.876 | 1.77 | | |
| 6 | 75.599 | 1.50 | 55.6 | 1.69680 |
| 7 | 12.950 | 5.10 | | |

TABLE 1-continued

F = 36.0~103.0   FN = 3.6~4.6   2ω = 64.7°~22.8°

| | r | d | Abbe | n |
|---|---|---|---|---|
| 8 | −23.991 | 1.20 | 55.6 | 1.69680 |
| 9 | 119.072 | .20 | | |
| 10 | 29.764 | 3.30 | 25.5 | 1.80458 |
| 11 | −72.192 | 1.20 | 43.3 | 1.84042 |
| 12 | 176.707 | 14.48 | | |
| 13 | 47.033 | 3.50 | 64.1 | 1.51680 |
| 14 | −38.870 | .10 | | |
| 15 | 20.876 | 6.20 | 56.4 | 1.50137 |
| 16 | −21.570 | 3.00 | 33.9 | 1.80384 |
| 17 | 59.932 | 9.11 | | |
| 18 | 356.270 | 4.50 | 54.0 | 1.61720 |
| 19 | −22.902 | .10 | | |
| 20 | 78.513 | 3.30 | 58.5 | 1.65160 |
| 21 | −56.099 | 2.40 | | |
| 22 | −19.489 | 1.20 | 40.9 | 1.79631 |
| 23 | −387.662 | 41.42 | | |

| F | 36.0230 | 50.0000 | 60.0215 | 70.0000 | 85.0000 | 103.0100 |
|---|---|---|---|---|---|---|
| D0 | .0000 | .0000 | .0000 | .0000 | .0000 | .0000 |
| d5 | 1.7742 | 8.8580 | 12.6201 | 15.7550 | 19.6173 | 23.3295 |
| d12 | 14.4840 | 10.4575 | 8.3965 | 6.7194 | 4.5965 | 2.3855 |
| d17 | 9.1067 | 8.2271 | 7.7378 | 7.5315 | 7.3166 | 7.3778 |
| d23 | 41.4165 | 47.7463 | 51.2680 | 54.0476 | 57.2155 | 59.7749 | r6
k = .1000E + 01
c2 = .0000
c4 = −.1914E − 05
c6 = −.9120E − 07
c8 = .7857E − 09
c10 = −.3257E − 11

TABLE 2

| F | (1) | (2) | (3) | (4) | R |
|---|---|---|---|---|---|
| ΔX | | | | | |
| 1 36.0230 | .0000 | .0000 | −2.1806 | −2.5077 | 1000.00 |
| 2 50.0000 | .0000 | .0000 | −1.8809 | −2.0690 | 1000.00 |
| 3 60.0215 | .0000 | .0000 | −1.9821 | −2.0813 | 1000.00 |
| 4 70.0000 | .0000 | .0000 | −2.2298 | −2.3412 | 1000.00 |
| 5 85.0000 | .0000 | .0000 | −2.6091 | −2.5308 | 1000.00 |
| 6 103.0100 | .0000 | .0000 | −3.2513 | −3.0237 | 1000.00 |
| φ | | | | | |
| 1 36.0230 | .0000 | .0000 | −3.4037 | −3.3907 | 1000.00 |
| 2 50.0000 | .0000 | .0000 | −2.9362 | −2.7586 | 1000.00 |
| 3 60.0215 | .0000 | .0000 | −3.0938 | −2.8255 | 1000.00 |
| 4 70.0000 | .0000 | .0000 | −3.4951 | −3.4120 | 1000.00 |
| 5 85.0000 | .0000 | .0000 | −4.1481 | −3.7610 | 1000.00 |
| 6 103.0100 | .0000 | .0000 | −5.1227 | −4.8308 | 1000.00 |

TABLE 3

| | R | 850.00 | 1000.00 | 1500.00 | 2000.00 | 3000.00 | 5000.00 |
|---|---|---|---|---|---|---|---|
| F | 36.0230 BF | .0201 | .0000 | −.0097 | −.0086 | −.0069 | −.0047 |
| F | 50.0000 BF | −.0457 | .0000 | .0592 | .0651 | .0546 | .0374 |
| F | 60.0215 BF | −.0475 | .0001 | .0781 | .0887 | .0753 | .0517 |
| F | 70.0000 BF | −.0904 | −.0002 | .1199 | .1339 | .1137 | .0789 |
| F | 85.0000 BF | −.1036 | −.0001 | .1288 | .1381 | .1086 | .0686 |
| F | 103.0100 BF | −.0001 | .0000 | .0000 | .0000 | .0000 | .0000 |
| Focus cam | DF | −4.2462 | −3.5000 | −2.1865 | −1.5879 | −1.0285 | −.6039 |
| F | 36.0230 DX | .0000 | .0000 | −2.6525 | −3.0552 | R | 850.00 |
| F | 50.0000 DX | .0000 | .0000 | −2.2929 | −2.5183 | R | 850.00 |
| F | 60.0215 DX | .0000 | .0000 | −2.4103 | −2.5542 | R | 850.00 |
| F | 70.0000 DX | .0000 | .0000 | −2.6926 | −2.8090 | R | 850.00 |
| F | 85.0000 DX | .0000 | .0000 | −3.1505 | −3.0927 | R | 850.00 |
| F | 103.0100 DX | .0000 | .0000 | −3.8481 | −3.6111 | R | 850.00 |
| F | 36.0230 DX | .0000 | .0000 | −2.1806 | −2.5077 | R | 1000.00 |
| F | 50.0000 DX | .0000 | .0000 | −1.8809 | −2.0690 | R | 1000.00 |
| F | 60.0215 DX | .0000 | .0000 | −1.9821 | −2.0813 | R | 1000.00 |
| F | 70.0000 DX | .0000 | .0000 | −2.2298 | −2.3412 | R | 1000.00 |
| F | 85.0000 DX | .0000 | .0000 | −2.6091 | −2.5308 | R | 1000.00 |
| F | 103.0100 DX | .0000 | .0000 | −3.2513 | −3.0237 | R | 1000.00 |
| F | 36.0230 DX | .0000 | .0000 | −1.3535 | −1.5498 | R | 1500.00 |
| F | 50.0000 DX | .0000 | .0000 | −1.1669 | −1.2861 | R | 1500.00 |
| F | 60.0215 DX | .0000 | .0000 | −1.2332 | −1.2781 | R | 1500.00 |
| F | 70.0000 DX | .0000 | .0000 | −1.4068 | −1.4969 | R | 1500.00 |
| F | 85.0000 DX | .0000 | .0000 | −1.6534 | −1.5681 | R | 1500.00 |
| F | 103.0100 DX | .0000 | .0000 | −2.1467 | −1.9682 | R | 1500.00 |
| F | 36.0230 DX | .0000 | .0000 | −.9795 | −1.1185 | R | 2000.00 |

TABLE 3-continued

| | | | | | | | | |
|---|---|---|---|---|---|---|---|---|
| F | 50.0000 | DX | .0000 | .0000 | −.8457 | −.9324 | R | 2000.00 |
| F | 60.0215 | DX | .0000 | .0000 | −.8945 | −.9224 | R | 2000.00 |
| F | 70.0000 | DX | .0000 | .0000 | −1.0267 | −1.0984 | R | 2000.00 |
| F | 85.0000 | DX | .0000 | .0000 | −1.2131 | −1.1392 | R | 2000.00 |
| F | 103.0100 | DX | .0000 | .0000 | −1.6052 | −1.4691 | R | 2000.00 |
| F | 36.0230 | DX | .0000 | .0000 | −.6321 | −.7198 | R | 3000.00 |
| F | 50.0000 | DX | .0000 | .0000 | −.5470 | −.6034 | R | 3000.00 |
| F | 60.0215 | DX | .0000 | .0000 | −.5792 | −.5943 | R | 3000.00 |
| F | 70.0000 | DX | .0000 | .0000 | −.6678 | −.7172 | R | 3000.00 |
| F | 85.0000 | DX | .0000 | .0000 | −.7955 | −.7395 | R | 3000.00 |
| F | 103.0100 | DX | .0000 | .0000 | −1.0688 | −.9822 | R | 3000.00 |
| F | 36.0230 | DX | .0000 | .0000 | −.3701 | −.4205 | R | 5000.00 |
| F | 50.0000 | DX | .0000 | .0000 | −.3210 | −.3543 | R | 5000.00 |
| F | 60.0215 | DX | .0000 | .0000 | −.3402 | −.3478 | R | 5000.00 |
| F | 70.0000 | DX | .0000 | .0000 | −.3932 | −.4233 | R | 5000.00 |
| F | 85.0000 | DX | .0000 | .0000 | −.4726 | −.4356 | R | 5000.00 |
| F | 103.0100 | DX | .0000 | .0000 | −.6409 | −.5914 | R | 5000.00 |

TABLE 4

| | | R | 850.00 | 1000.00 | 1500.00 | 2000.00 | 3000.00 | 5000.00 |
|---|---|---|---|---|---|---|---|---|
| F | 36.0230 | DF | −4.3218 | −3.5001 | −2.1592 | −1.5655 | −1.0115 | −.5929 |
| F | 50.0000 | DF | −4.1768 | −3.5000 | −2.2697 | −1.6774 | −1.1017 | −.6532 |
| F | 60.0215 | DF | −4.1938 | −3.5002 | −2.2630 | −1.6728 | −1.0987 | −.6512 |
| F | 70.0000 | DF | −4.1857 | −3.4998 | −2.2746 | −1.6837 | −1.1076 | −.6576 |
| F | 85.0000 | DF | −4.1857 | −3.4999 | −2.2530 | −1.6564 | −1.0799 | −.6352 |
| F | 103.0100 | DF | −4.2462 | −3.5000 | −2.1865 | −1.5879 | −1.0285 | −.6039 |
| Focus cam | | DF | −4.2462 | −3.5000 | −2.1865 | −1.5879 | −1.0285 | −.6039 |
| F | 36.0230 | DX | .0000 | .0000 | −2.7004 | −3.1107 | R | 850.00 |
| F | 50.0000 | DX | .0000 | .0000 | −2.2544 | −2.4763 | R | 850.00 |
| F | 60.0215 | DX | .0000 | .0000 | −2.3802 | −2.5207 | R | 850.00 |
| F | 70.0000 | DX | .0000 | .0000 | −2.6474 | −2.7634 | R | 850.00 |
| F | 85.0000 | DX | .0000 | .0000 | −3.1066 | −3.0470 | R | 850.00 |
| F | 103.0100 | DX | .0000 | .0000 | −3.8481 | −3.6111 | R | 850.00 |
| F | 36.0230 | DX | .0000 | .0000 | −2.1807 | −2.5078 | R | 1000.00 |
| F | 50.0000 | DX | .0000 | .0000 | −1.8809 | −2.0690 | R | 1000.00 |
| F | 60.0215 | DX | .0000 | .0000 | −1.9822 | −2.0814 | R | 1000.00 |
| F | 70.0000 | DX | .0000 | .0000 | −2.2297 | −2.3411 | R | 1000.00 |
| F | 85.0000 | DX | .0000 | .0000 | −2.6090 | −2.5307 | R | 1000.00 |
| F | 103.0100 | DX | .0000 | .0000 | −3.2513 | −3.0237 | R | 1000.00 |
| F | 36.0230 | DX | .0000 | .0000 | −1.3364 | −1.5300 | R | 1500.00 |
| F | 50.0000 | DX | .0000 | .0000 | −1.2117 | −1.3355 | R | 1500.00 |
| F | 60.0215 | DX | .0000 | .0000 | −1.2766 | −1.3240 | R | 1500.00 |
| F | 70.0000 | DX | .0000 | .0000 | −1.4624 | −1.5547 | R | 1500.00 |
| F | 85.0000 | DX | .0000 | .0000 | −1.7020 | −1.6160 | R | 1500.00 |
| F | 103.0100 | DX | .0000 | .0000 | −2.1467 | −1.9682 | R | 1500.00 |
| F | 36.0230 | DX | .0000 | .0000 | −.9655 | −1.1025 | R | 2000.00 |
| F | 50.0000 | DX | .0000 | .0000 | −.8936 | −.9852 | R | 2000.00 |
| F | 60.0215 | DX | .0000 | .0000 | −.9424 | −.9725 | R | 2000.00 |
| F | 70.0000 | DX | .0000 | .0000 | −1.0877 | −1.1628 | R | 2000.00 |
| F | 85.0000 | DX | .0000 | .0000 | −1.2638 | −1.1881 | R | 2000.00 |
| F | 103.0100 | DX | .0000 | .0000 | −1.6052 | −1.4691 | R | 2000.00 |
| F | 36.0230 | DX | .0000 | .0000 | −.6216 | −.7078 | R | 3000.00 |
| F | 50.0000 | DX | .0000 | .0000 | −.5860 | −.6464 | R | 3000.00 |
| F | 60.0215 | DX | .0000 | .0000 | −.6187 | −.6352 | R | 3000.00 |
| F | 70.0000 | DX | .0000 | .0000 | −.7187 | −.7715 | R | 3000.00 |
| F | 85.0000 | DX | .0000 | .0000 | −.8343 | −.7763 | R | 3000.00 |
| F | 103.0100 | DX | .0000 | .0000 | −1.0688 | −.9822 | R | 3000.00 |
| F | 36.0230 | DX | .0000 | .0000 | −.3633 | −.4127 | R | 5000.00 |
| F | 50.0000 | DX | .0000 | .0000 | −.3472 | −.3831 | R | 5000.00 |
| F | 60.0215 | DX | .0000 | .0000 | −.3668 | −.3752 | R | 5000.00 |
| F | 70.0000 | DX | .0000 | .0000 | −.4280 | −.4606 | R | 5000.00 |
| F | 85.0000 | DX | .0000 | .0000 | −.4966 | −.4580 | R | 5000.00 |
| F | 103.0100 | DX | .0000 | .0000 | −.6409 | −.5914 | R | 5000.00 |

TABLE 5 - (1)

(Cam data of the focus cams and zoom cams of the first lens group and the second lens group)

| | Focus cam | | Zoom cam | | |
|---|---|---|---|---|---|
| | $\phi f(1)$ | $Xf(1)$ | $\phi z(1)$ | $Xz(1)$ | F |
| First lens group | .0000 | .0000 | .0000 | .0000 | 36.0230 |
| | .0000 | 8.5075 | 8.5075 | 8.5075 | 50.0000 |
| | .0000 | 13.2410 | 13.2410 | 13.2410 | 60.0215 |
| | .0000 | 17.2722 | 17.2722 | 17.2722 | 70.0000 |
| | .0000 | 21.9646 | 21.9646 | 21.9646 | 85.0000 |
| | .0000 | 26.0868 | 26.0868 | 26.0868 | 103.0100 |

Focus cam    Zoom cam

TABLE 5 - (1)-continued (Cam data of the focus cams and zoom cams of the first lens group and the second lens group)

| | $\phi f(2)$ | $Xf(2)$ | $\phi z(2)$ | $Xz(2)$ | F |
|---|---|---|---|---|---|
| Second lens group | .0000 | .0000 | .0000 | .0000 | 36.0230 |
| | .0000 | 1.4237 | 8.5075 | 1.4237 | 50.0000 |
| | .0000 | 2.3951 | 13.2410 | 2.3951 | 60.0215 |
| | .0000 | 3.2913 | 17.2722 | 3.2913 | 70.0000 |
| | .0000 | 4.1216 | 21.9646 | 4.1216 | 85.0000 |
| | .0000 | 4.5316 | 26.0868 | 4.5316 | 103.0100 |

TABLE 5 - (2)

(Cam data of the focus cam and zoom cam of the third lens group)

| Focus cam | | Zoom cam | | | |
|---|---|---|---|---|---|
| φf(3) | Xf(3) | φz(3) | Xz(3) | F | R |
| .0000 | .0000 | .0000 | .0000 | 36.0230 | ∞ |
| −4.8062 | 5.4502 | 3.7014 | 5.4502 | 50.0000 | ∞ |
| −7.3777 | 8.4826 | 5.8632 | 8.4826 | 60.0215 | ∞ |
| −9.8306 | 11.0559 | 7.4416 | 11.0559 | 70.0000 | ∞ |
| −13.1414 | 14.0090 | 8.8232 | 14.0090 | 85.0000 | ∞ |
| −17.0642 | 16.6301 | 9.0226 | 16.6301 | 103.0100 | ∞ |
| −.2210 | .2339 | −.2210 | −.3701 | 36.0230 | 5000.00 |
| −5.0409 | 5.7331 | 3.4666 | 5.1292 | 50.0000 | 5000.00 |
| −7.6114 | 8.7463 | 5.6296 | 8.1423 | 60.0215 | 5000.00 |
| −10.0490 | 11.2666 | 7.2231 | 10.6627 | 70.0000 | 5000.00 |
| −13.3090 | 14.1403 | 8.6556 | 13.5364 | 85.0000 | 5000.00 |
| −17.0011 | 16.5931 | 9.0857 | 15.9892 | 103.0100 | 5000.00 |
| −.3729 | .3964 | −.3729 | −.6321 | 36.0230 | 3000.00 |
| −5.2058 | 5.9317 | 3.3018 | 4.9032 | 50.0000 | 3000.00 |
| −7.7777 | 8.9318 | 5.4632 | 7.9034 | 60.0215 | 3000.00 |
| −10.2057 | 11.4166 | 7.0665 | 10.3882 | 70.0000 | 3000.00 |
| −13.4406 | 14.2420 | 8.5240 | 13.2135 | 85.0000 | 3000.00 |
| −16.9952 | 16.5897 | 9.0916 | 15.5612 | 103.0100 | 3000.00 |
| −.5692 | .6084 | −.5692 | −.9795 | 36.0230 | 2000.00 |
| −5.4228 | 6.1924 | 3.0847 | 4.6045 | 50.0000 | 2000.00 |
| −7.9993 | 9.1759 | 5.2416 | 7.5880 | 60.0215 | 2000.00 |
| −10.4166 | 11.6172 | 6.8556 | 10.0293 | 70.0000 | 2000.00 |
| −13.6271 | 14.3838 | 8.3375 | 12.7959 | 85.0000 | 2000.00 |
| −17.0346 | 16.6127 | 9.0522 | 15.0248 | 103.0100 | 2000.00 |
| −.7752 | .8329 | −.7752 | −1.3535 | 36.0230 | 1500.00 |
| −5.6546 | 6.4697 | 2.8529 | 4.2833 | 50.0000 | 1500.00 |
| −8.2390 | 9.4358 | 5.0020 | 7.2494 | 60.0215 | 1500.00 |
| −10.6483 | 11.8356 | 6.6238 | 9.6492 | 70.0000 | 1500.00 |
| −13.8394 | 14.5421 | 8.1252 | 12.3557 | 85.0000 | 1500.00 |
| −17.1323 | 16.6698 | 8.9545 | 14.4834 | 103.0100 | 1500.00 |
| −1.2181 | 1.3194 | −1.2181 | −2.1806 | 36.0230 | 1000.00 |
| −6.1610 | 7.0693 | 2.3466 | 3.5693 | 50.0000 | 1000.00 |
| −8.7741 | 10.0004 | 4.4668 | 6.5004 | 60.0215 | 1000.00 |
| −11.1778 | 12.3262 | 6.0944 | 8.8262 | 70.0000 | 1000.00 |
| −14.3363 | 14.9000 | 7.6283 | 11.4000 | 85.0000 | 1000.00 |
| −17.4939 | 16.8788 | 8.5929 | 13.3788 | 103.0100 | 1000.00 |
| −1.4669 | 1.5936 | −1.4669 | −2.6525 | 36.0230 | 850.00 |
| −6.4457 | 7.4035 | 2.0619 | 3.1573 | 50.0000 | 850.00 |
| −9.0850 | 10.3184 | 4.1560 | 6.0723 | 60.0215 | 850.00 |
| −11.4902 | 12.6096 | 5.7819 | 8.3634 | 70.0000 | 850.00 |
| −14.6319 | 15.1047 | 7.3327 | 10.8586 | 85.0000 | 850.00 |
| −17.7558 | 17.0282 | 8.3311 | 12.7820 | 103.0100 | 850.00 |

TABLE 5 - (3)

(Cam data of the focus cam and zoom cam of the fourth lens group)

| Focus cam | | Zoom cam | | | |
|---|---|---|---|---|---|
| φf(4) | Xf(4) | φz(4) | Xz(4) | F | R |
| .0000 | .0000 | .0000 | .0000 | 36.0230 | ∞ |
| −5.4065 | 6.3298 | 3.1010 | 6.3298 | 50.0000 | ∞ |
| −8.1264 | 9.8515 | 5.1146 | 9.8515 | 60.0215 | ∞ |
| −10.7093 | 12.6311 | 6.5629 | 12.6311 | 70.0000 | ∞ |
| −13.9680 | 15.7991 | 7.9966 | 15.7991 | 85.0000 | ∞ |
| −17.4882 | 18.3588 | 8.5986 | 18.3588 | 103.0100 | ∞ |
| −.1705 | .1835 | −.1705 | −.4205 | 36.0230 | 5000.00 |
| −5.6007 | 6.5795 | 2.9069 | 5.9755 | 50.0000 | 5000.00 |
| −8.3345 | 10.1077 | 4.9065 | 9.5037 | 60.0215 | 5000.00 |
| −10.8960 | 12.8118 | 6.3761 | 12.2078 | 70.0000 | 5000.00 |
| −14.1585 | 15.9675 | 7.8061 | 15.3636 | 85.0000 | 5000.00 |
| −17.5090 | 18.3714 | 8.5778 | 17.7674 | 103.0100 | 5000.00 |
| −.2858 | .3087 | −.2858 | −.7198 | 36.0230 | 3000.00 |
| −5.7371 | 6.7548 | 2.7704 | 5.7264 | 50.0000 | 3000.00 |
| −8.4822 | 10.2857 | 4.7588 | 9.2573 | 60.0215 | 3000.00 |
| −11.0311 | 12.9424 | 6.2410 | 11.9139 | 70.0000 | 3000.00 |
| −14.2975 | 16.0881 | 7.6671 | 15.0596 | 85.0000 | 3000.00 |
| −17.5653 | 18.4051 | 8.5215 | 17.3767 | 103.0100 | 3000.00 |
| −.4327 | .4694 | −.4327 | −1.1185 | 36.0230 | 2000.00 |
| −5.9166 | 6.9852 | 2.5909 | 5.3973 | 50.0000 | 2000.00 |
| −8.6783 | 10.5171 | 4.5626 | 8.9292 | 60.0215 | 2000.00 |
| −11.2153 | 13.1206 | 6.0568 | 11.5327 | 70.0000 | 2000.00 |
| −14.4853 | 16.2479 | 7.4793 | 14.6600 | 85.0000 | 2000.00 |
| −17.6868 | 18.4777 | 8.4000 | 16.8898 | 103.0100 | 2000.00 |
| −.5846 | .6366 | −.5846 | −1.5498 | 36.0230 | 1500.00 |
| −6.1078 | 7.2301 | 2.3998 | 5.0436 | 50.0000 | 1500.00 |

TABLE 5 - (3)-continued (Cam data of the focus cam and zoom cam of the fourth lens group)

| Focus cam | | Zoom cam | | | |
|---|---|---|---|---|---|
| φf(4) | Xf(4) | φz(4) | Xz(4) | F | R |
| −8.8893 | 10.7599 | 4.3516 | 8.5735 | 60.0215 | 1500.00 |
| −11.4212 | 13.3206 | 5.8509 | 11.1342 | 70.0000 | 1500.00 |
| −14.6894 | 16.4175 | 7.2752 | 14.2311 | 85.0000 | 1500.00 |
| −17.8543 | 18.5571 | 8.2325 | 16.3907 | 103.0100 | 1500.00 |
| −.9055 | .9923 | −.9055 | −2.5077 | 36.0230 | 1000.00 |
| −6.5199 | 7.7607 | 1.9877 | 4.2607 | 50.0000 | 1000.00 |
| −9.3527 | 11.2703 | 3.8883 | 7.7703 | 60.0215 | 1000.00 |
| −11.8978 | 13.7899 | 5.3744 | 10.2899 | 70.0000 | 1000.00 |
| −15.1285 | 16.7684 | 6.8361 | 13.2684 | 85.0000 | 1000.00 |
| −18.2935 | 18.8352 | 7.7933 | 15.3352 | 103.0100 | 1000.00 |
| −1.0842 | 1.1909 | −1.0842 | −3.0552 | 36.0230 | 850.00 |
| −6.7469 | 8.0577 | 1.7607 | 3.8115 | 50.0000 | 850.00 |
| −9.6131 | 11.5435 | 3.6278 | 7.2974 | 60.0215 | 850.00 |
| −12.1752 | 14.0682 | 5.0970 | 9.8221 | 70.0000 | 850.00 |
| −15.3692 | 16.9527 | 6.5954 | 12.7065 | 85.0000 | 850.00 |
| −18.5659 | 18.9939 | 7.5209 | 14.7478 | 103.0100 | 850.00 |

TABLE 6

(Embodiment 2)
F = 36.0∼103.0  FN = 3.4∼4.6  2ω = 64.6°∼22.9°

| | r | d | Abbe | n |
|---|---|---|---|---|
| 1 | 137.408 | 1.40 | 25.5 | 1.80458 |
| 2 | 53.415 | 7.20 | 60.7 | 1.60311 |
| 3 | −139.017 | .10 | | |
| 4 | 34.337 | 3.80 | 64.1 | 1.51680 |
| 5 | 78.487 | 3.04 | | |
| 6 | 740.488 | 1.00 | 46.5 | 1.80411 |
| 7 | 16.353 | 3.50 | | |
| 8 | −46.916 | 1.00 | 46.5 | 1.80411 |
| 9 | 52.784 | .10 | | |
| 10 | 27.752 | 4.00 | 35.5 | 1.59507 |
| 11 | −35.267 | .70 | | |
| 12 | −21.856 | 1.00 | 46.5 | 1.80411 |
| 13 | 52.675 | 2.45 | 23.0 | 1.86074 |
| 14 | −67.847 | 11.33 | | |
| 15 | 40.454 | 4.70 | 58.5 | 1.65160 |
| 16 | −27.938 | .70 | | |
| 17 | −22.564 | 1.30 | 28.6 | 1.79504 |
| 18 | −71.186 | .10 | | |
| 19 | 60.948 | 2.50 | 64.1 | 1.51680 |
| 20 | −374.469 | 6.78 | | |
| 21 | 23.344 | 9.00 | 64.1 | 1.51680 |
| 22 | 21.651 | 2.00 | | |
| 23 | 76.755 | 4.20 | 69.9 | 1.51860 |
| 24 | −30.615 | .10 | | |
| 25 | 31.683 | 4.40 | 64.1 | 1.51680 |
| 26 | −47.253 | 1.60 | | |
| 27 | −22.423 | 1.40 | 39.8 | 1.86994 |
| 28 | 239.363 | 40.98 | | |

| F | 36.0000 | 50.0000 | 70.0000 | 85.0000 | 103.0100 |
|---|---|---|---|---|---|
| D0 | .0000 | .0000 | .0000 | .0000 | .0000 |
| d5 | 3.0370 | 9.2942 | 15.3765 | 18.7415 | 21.9615 |
| d14 | 11.3322 | 7.9442 | 4.8434 | 3.1116 | 1.3554 |
| d20 | 6.7821 | 5.7181 | 4.6125 | 4.0069 | 3.4641 |
| d28 | 40.9779 | 48.0750 | 55.4494 | 59.4886 | 63.1090 |

TABLE 7

| | F | (1) | (2) | (3) | (4) | R |
|---|---|---|---|---|---|---|
| | | | ΔX | | | |
| 1 | 36.0000 | .0000 | .0000 | −.9709 | −1.3107 | 1400.00 |
| 2 | 50.0000 | .0000 | .0000 | −.8754 | −1.0505 | 1400.00 |
| 3 | 70.0000 | .0000 | .0000 | −1.0532 | −1.1585 | 1400.00 |
| 4 | 85.0000 | .0000 | .0000 | −1.2488 | −1.3113 | 1400.00 |
| 5 | 103.0000 | .0000 | .0000 | −1.5312 | −1.5312 | 1400.00 |
| | | | φ | | | |
| 1 | 36.0000 | .0000 | .0000 | −1.4327 | −1.6441 | 1400.00 |
| 2 | 50.0000 | .0000 | .0000 | −1.2918 | −1.3177 | 1400.00 |
| 3 | 70.0000 | .0000 | .0000 | −1.5540 | −1.4532 | 1400.00 |
| 4 | 85.0000 | .0000 | .0000 | −1.8428 | −1.6448 | 1400.00 |

TABLE 7-continued

| F | (1) | (2) | (3) | (4) | R | | | | | |
|---|---|---|---|---|---|---|---|---|---|---|
| 5 | 103.0000 | .0000 | .0000 | −2.2595 | −1.9207 | 1400.00 | | | | |

TABLE 8

| | | R | 1400.00 | 1600.00 | 2000.00 | 3000.00 | 5000.00 | 10000.00 |
|---|---|---|---|---|---|---|---|---|
| F | 36.0000 | BF | −.0001 | −.0066 | −.0131 | −.0158 | −.0127 | −.0075 |
| F | 50.0000 | BF | .0000 | −.0008 | −.0019 | −.0025 | −.0017 | −.0008 |
| F | 70.0000 | BF | .0002 | .0036 | .0059 | .0066 | .0061 | .0041 |
| F | 85.0000 | BF | −.0001 | .0046 | .0072 | .0075 | .0067 | .0045 |
| F | 103.0000 | BF | .0000 | .0000 | .0000 | .0000 | .0000 | .0001 |
| Focus cam | | DF | −2.0000 | −1.7372 | −1.3760 | −.9053 | −.5371 | −.2661 |
| F | 36.0000 | DX | .0000 | .0000 | −.9709 | −.3107 | R | 1400.00 |
| F | 50.0000 | DX | .0000 | .0000 | −.8754 | −1.0505 | R | 1400.00 |
| F | 70.0000 | DX | .0000 | .0000 | −1.0531 | −1.1585 | R | 1400.00 |
| F | 85.0000 | DX | .0000 | .0000 | −1.2488 | −1.3112 | R | 1400.00 |
| F | 103.0000 | DX | .0000 | .0000 | −1.5312 | −1.5312 | R | 1400.00 |
| F | 36.0000 | DX | .0000 | .0000 | −.8433 | −1.1368 | R | 1600.00 |
| F | 50.0000 | DX | .0000 | .0000 | −.7599 | −.9119 | R | 1600.00 |
| F | 70.0000 | DX | .0000 | .0000 | −.9149 | −1.0068 | R | 1600.00 |
| F | 85.0000 | DX | .0000 | .0000 | −1.0864 | −1.1403 | R | 1600.00 |
| F | 103.0000 | DX | .0000 | .0000 | −1.3356 | −1.3340 | R | 1600.00 |
| F | 36.0000 | DX | .0000 | .0000 | −.6679 | −.8984 | R | 2000.00 |
| F | 50.0000 | DX | .0000 | .0000 | −.6016 | −.7219 | R | 2000.00 |
| F | 70.0000 | DX | .0000 | .0000 | −.7249 | −.7981 | R | 2000.00 |
| F | 85.0000 | DX | .0000 | .0000 | −.8625 | −.9048 | R | 2000.00 |
| F | 103.0000 | DX | .0000 | .0000 | −1.0639 | −1.0610 | R | 2000.00 |
| F | 36.0000 | DX | .0000 | .0000 | −.4395 | −.5889 | R | 3000.00 |
| F | 50.0000 | DX | .0000 | .0000 | −.3955 | −.4747 | R | 3000.00 |
| F | 70.0000 | DX | .0000 | .0000 | −.4772 | −.5256 | R | 3000.00 |
| F | 85.0000 | DX | .0000 | .0000 | −.5693 | −.5967 | R | 3000.00 |
| F | 103.0000 | DX | .0000 | .0000 | −.7052 | −.7017 | R | 3000.00 |
| F | 36.0000 | DX | .0000 | .0000 | −.2607 | −.3482 | R | 5000.00 |
| F | 50.0000 | DX | .0000 | .0000 | −.2346 | −.2815 | R | 5000.00 |
| F | 70.0000 | DX | .0000 | .0000 | −.2832 | −.3121 | R | 5000.00 |
| F | 85.0000 | DX | .0000 | .0000 | −.3387 | −.3547 | R | 5000.00 |
| F | 103.0000 | DX | .0000 | .0000 | −.4211 | −.4179 | R | 5000.00 |
| F | 36.0000 | DX | .0000 | .0000 | −.1292 | −.1721 | R | 10000.00 |
| F | 50.0000 | DX | .0000 | .0000 | −.1162 | −.1394 | R | 10000.00 |
| F | 70.0000 | DX | .0000 | .0000 | −.1404 | −.1547 | R | 10000.00 |
| F | 85.0000 | DX | .0000 | .0000 | −.1682 | −.1760 | R | 10000.00 |
| F | 103.0000 | DX | .0000 | .0000 | −.2098 | −.2077 | R | 10000.00 |

TABLE 9

| | | R | 1400.00 | 1600.00 | 2000.00 | 3000.00 | 5000.00 | 10000.00 |
|---|---|---|---|---|---|---|---|---|
| F | 36.0000 | DF | −1.9998 | −1.7222 | −1.3474 | −.8723 | −.5114 | −.2514 |
| F | 50.0000 | DF | −1.9999 | −1.7363 | −1.3739 | −.9026 | −.5353 | −.2653 |
| F | 70.0000 | DF | −2.0001 | −1.7392 | −1.3793 | −.9090 | −.5404 | −.2684 |
| F | 85.0000 | DF | −1.9999 | −1.7390 | −1.3789 | −.9082 | −.5396 | −.2678 |
| F | 103.0000 | DF | −2.0000 | −1.7372 | −1.3760 | −.9053 | −.5371 | −.2661 |
| Focus cam | | DF | −2.0000 | −1.7372 | −1.3760 | −.9053 | −.5371 | −.2661 |
| F | 36.0000 | DX | .0000 | .0000 | −.9708 | −1.3106 | R | 1400.00 |
| F | 50.0000 | DX | .0000 | .0000 | −.8754 | −1.0504 | R | 1400.00 |
| F | 70.0000 | DX | .0000 | .0000 | −1.0532 | −1.1585 | R | 1400.00 |
| F | 85.0000 | DX | .0000 | .0000 | −1.2488 | −1.3112 | R | 1400.00 |
| F | 103.0000 | DX | .0000 | .0000 | −1.5312 | −1.5312 | R | 1400.00 |
| F | 36.0000 | DX | .0000 | .0000 | −.8360 | −1.1269 | R | 1600.00 |
| F | 50.0000 | DX | .0000 | .0000 | −.7596 | −.9115 | R | 1600.00 |
| F | 70.0000 | DX | .0000 | .0000 | −.9160 | −1.0080 | R | 1600.00 |
| F | 85.0000 | DX | .0000 | .0000 | −1.0875 | −1.1415 | R | 1600.00 |
| F | 103.0000 | DX | .0000 | .0000 | −1.3356 | −1.3340 | R | 1600.00 |
| F | 36.0000 | DX | .0000 | .0000 | −.6540 | −.8796 | R | 2000.00 |
| F | 50.0000 | DX | .0000 | .0000 | −.6006 | −.7208 | R | 2000.00 |
| F | 70.0000 | DX | .0000 | .0000 | −.7267 | −.8000 | R | 2000.00 |
| F | 85.0000 | DX | .0000 | .0000 | −.8643 | −.9066 | R | 2000.00 |
| F | 103.0000 | DX | .0000 | .0000 | −1.0639 | −1.0610 | R | 2000.00 |
| F | 36.0000 | DX | .0000 | .0000 | −.4234 | −.5673 | R | 3000.00 |
| F | 50.0000 | DX | .0000 | .0000 | −.3943 | −.4732 | R | 3000.00 |
| F | 70.0000 | DX | .0000 | .0000 | −.4791 | −.5277 | R | 3000.00 |
| F | 85.0000 | DX | .0000 | .0000 | −.5711 | −.5986 | R | 3000.00 |
| F | 103.0000 | DX | .0000 | .0000 | −.7052 | −.7017 | R | 3000.00 |
| F | 36.0000 | DX | .0000 | .0000 | −.2483 | −.3315 | R | 5000.00 |
| F | 50.0000 | DX | .0000 | .0000 | −.2338 | −.2805 | R | 5000.00 |
| F | 70.0000 | DX | .0000 | .0000 | −.2850 | −.3140 | R | 5000.00 |
| F | 85.0000 | DX | .0000 | .0000 | −.3403 | −.3564 | R | 5000.00 |
| F | 103.0000 | DX | .0000 | .0000 | −.4211 | −.4179 | R | 5000.00 |
| F | 36.0000 | DX | .0000 | .0000 | −.1221 | −.1625 | R | 10000.00 |
| F | 50.0000 | DX | .0000 | .0000 | −.1158 | −.1390 | R | 10000.00 |
| F | 70.0000 | DX | .0000 | .0000 | −.1416 | −.1560 | R | 10000.00 |
| F | 85.0000 | DX | .0000 | .0000 | −.1693 | −.1772 | R | 10000.00 |

TABLE 9-continued

| | | | | | | | | |
|---|---|---|---|---|---|---|---|---|
| F | 103.0000 | DX | .0000 | .0000 | −.2098 | −.2077 | R | 10000.00 |

TABLE 10 - (1)

(Cam data of the focus cams and zoom cams of the first lens group and the second lens group)

First lens group

| Focus cam | | Zoom cam | | |
|---|---|---|---|---|
| φf (1) | Xf (1) | φz (1) | Xz (1) | F |
| .0000 | .0000 | .0000 | .0000 | 36.0000 |
| .0000 | 8.9022 | 8.9022 | 8.9022 | 50.0000 |
| .0000 | 18.1526 | 18.1526 | 18.1526 | 70.0000 |
| .0000 | 23.2196 | 23.2196 | 23.2196 | 85.0000 |
| .0000 | 27.7610 | 27.7610 | 27.7610 | 103.0000 |

Second lens group

| Focus cam | | Zoom cam | | |
|---|---|---|---|---|
| φf (2) | Xf (2) | φz (2) | Xz (2) | F |
| .0000 | .0000 | .0000 | .0000 | 36.0000 |
| .0000 | 2.6450 | 8.9022 | 2.6450 | 50.0000 |
| .0000 | 5.8130 | 18.1526 | 5.8130 | 70.0000 |
| .0000 | 7.5150 | 23.2196 | 7.5150 | 85.0000 |
| .0000 | 8.8365 | 27.7610 | 8.8365 | 103.0000 |

TABLE 10 - (2)

(Cam data of the focus cam and zoom cam of the third lens group)

| Focus cam | | Zoom cam | | | |
|---|---|---|---|---|---|
| φf (3) | Xf (3) | φz (3) | Xz (3) | F | R |
| .0000 | .0000 | .0000 | .0000 | 36.0000 | ∞ |
| −4.0435 | 6.0329 | 4.8587 | 6.0329 | 50.0000 | ∞ |
| −8.3953 | 12.3018 | 9.7573 | 12.3018 | 70.0000 | ∞ |
| −11.3073 | 15.7357 | 11.9123 | 15.7357 | 85.0000 | ∞ |
| −14.5356 | 18.8134 | 13.2254 | 18.8134 | 103.0000 | ∞ |
| −.0978 | .1369 | −.0978 | −.1292 | 36.0000 | 10000.00 |
| −4.1400 | 6.1828 | 4.7622 | 5.9167 | 50.0000 | 10000.00 |
| −8.4935 | 12.4276 | 9.6591 | 12.1615 | 70.0000 | 10000.00 |
| −11.3991 | 15.8336 | 11.8204 | 15.5675 | 85.0000 | 10000.00 |
| −14.6016 | 18.8697 | 13.1594 | 18.6036 | 103.0000 | 10000.00 |
| −.1968 | .2763 | −.1968 | −.2607 | 36.0000 | 5000.00 |
| −4.2384 | 6.3354 | 4.6638 | 5.7984 | 50.0000 | 5000.00 |
| −8.5941 | 12.5557 | 9.5585 | 12.0186 | 70.0000 | 5000.00 |
| −11.4941 | 15.9340 | 11.7255 | 15.3970 | 85.0000 | 5000.00 |
| −14.6719 | 18.9293 | 13.0891 | 18.3922 | 103.0000 | 5000.00 |
| −.3306 | .4659 | −.3306 | −.4395 | 36.0000 | 3000.00 |
| −4.3722 | 6.5427 | 4.5300 | 5.6374 | 50.0000 | 3000.00 |
| −8.7319 | 12.7300 | 9.4206 | 11.8246 | 70.0000 | 3000.00 |
| −11.6252 | 16.0717 | 11.5944 | 15.1663 | 85.0000 | 3000.00 |
| −14.7717 | 19.0135 | 12.9893 | 18.1082 | 103.0000 | 3000.00 |
| −.5006 | .7081 | −.5006 | −.6679 | 36.0000 | 2000.00 |
| −4.5434 | 6.8074 | 4.3588 | 5.4314 | 50.0000 | 2000.00 |
| −8.9098 | 12.9529 | 9.2428 | 11.5769 | 70.0000 | 2000.00 |
| −11.7962 | 16.2492 | 11.4233 | 14.8731 | 85.0000 | 2000.00 |
| −14.9055 | 19.1255 | 12.8555 | 17.7495 | 103.0000 | 2000.00 |
| −.6305 | .8939 | −.6305 | −.8433 | 36.0000 | 1600.00 |
| −4.6749 | 7.0101 | 4.2273 | 5.2730 | 50.0000 | 1600.00 |
| −9.0476 | 13.1241 | 9.1050 | 11.3869 | 70.0000 | 1600.00 |
| −11.9299 | 16.3864 | 11.2897 | 14.6493 | 85.0000 | 1600.00 |
| −15.0132 | 19.2149 | 12.7478 | 17.4777 | 103.0000 | 1600.00 |
| −.7247 | 1.0291 | −.7247 | −.9709 | 36.0000 | 1400.00 |
| −4.7708 | 7.1575 | 4.1314 | 5.1575 | 50.0000 | 1400.00 |
| −9.1486 | 13.2487 | 9.0040 | 11.2487 | 70.0000 | 1400.00 |
| −12.0284 | 16.4868 | 11.1911 | 14.4868 | 85.0000 | 1400.00 |
| −15.0948 | 19.2821 | 12.6662 | 17.2821 | 103.0000 | 1400.00 |

TABLE 10 - (3)

(Cam data of the focus cam and zoom cam of the fourth lens group)

| Focus cam | | Zoom cam | | | |
|---|---|---|---|---|---|
| φf (4) | Xf (4) | φz (4) | Xz (4) | F | R |
| .0000 | .0000 | .0000 | .0000 | 36.0000 | ∞ |
| −5.1267 | 7.0969 | 3.7755 | 7.0969 | 50.0000 | ∞ |
| −10.1170 | 14.4714 | 8.0356 | 14.4714 | 70.0000 | ∞ |
| −13.2496 | 18.5109 | 9.9699 | 18.5109 | 85.0000 | ∞ |
| −16.5273 | 22.1314 | 11.2337 | 22.1314 | 103.0000 | ∞ |
| −.0758 | .0940 | −.0758 | −.1721 | 36.0000 | 10000.00 |
| −5.2099 | 7.2236 | 3.6923 | 6.9575 | 50.0000 | 10000.00 |
| −10.1984 | 14.5828 | 7.9542 | 14.3167 | 70.0000 | 10000.00 |
| −13.3246 | 18.6009 | 9.8949 | 18.3348 | 85.0000 | 10000.00 |
| −16.5848 | 22.1898 | 11.1763 | 21.9237 | 103.0000 | 10000.00 |
| −.1518 | .1889 | −.1518 | −.3482 | 36.0000 | 5000.00 |
| −5.2944 | 7.3525 | 3.6077 | 6.8154 | 50.0000 | 5000.00 |
| −10.2817 | 14.6964 | 7.8709 | 14.1594 | 70.0000 | 5000.00 |
| −13.4018 | 18.6932 | 9.8177 | 18.1562 | 85.0000 | 5000.00 |
| −16.6446 | 22.2505 | 11.1164 | 21.7134 | 103.0000 | 5000.00 |
| −.2533 | .3164 | −.2533 | −.5889 | 36.0000 | 3000.00 |
| −5.4092 | 7.5276 | 3.4930 | 6.6223 | 50.0000 | 3000.00 |
| −10.3955 | 14.8512 | 7.7570 | 13.9458 | 70.0000 | 3000.00 |
| −13.5079 | 18.8195 | 9.7116 | 17.9142 | 85.0000 | 3000.00 |
| −16.7282 | 22.3350 | 11.0328 | 21.4297 | 103.0000 | 3000.00 |
| −.3810 | .4776 | −.3810 | −.8984 | 36.0000 | 2000.00 |
| −5.5554 | 7.7510 | 3.3468 | 6.3750 | 50.0000 | 2000.00 |
| −10.5421 | 15.0494 | 7.6105 | 13.6734 | 70.0000 | 2000.00 |
| −13.6454 | 18.9821 | 9.5741 | 17.6061 | 85.0000 | 2000.00 |
| −16.8390 | 22.4464 | 10.9220 | 21.0704 | 103.0000 | 2000.00 |
| −.4777 | .6003 | −.4777 | −1.1368 | 36.0000 | 1600.00 |
| −5.6673 | 7.9221 | 3.2349 | 6.1850 | 50.0000 | 1600.00 |
| −10.6553 | 15.2018 | 7.4973 | 13.4646 | 70.0000 | 1600.00 |
| −13.7524 | 19.1077 | 9.4671 | 17.3706 | 85.0000 | 1600.00 |
| −16.9271 | 22.5346 | 10.8339 | 20.7974 | 103.0000 | 1600.00 |
| −.5478 | .6893 | −.5478 | −1.3107 | 36.0000 | 1400.00 |
| −5.7486 | 8.0464 | 3.1536 | 6.0464 | 50.0000 | 1400.00 |
| −10.7381 | 15.3129 | 7.4145 | 13.3129 | 70.0000 | 1400.00 |
| −13.8311 | 19.1996 | 9.3885 | 17.1996 | 85.0000 | 1400.00 |
| −16.9930 | 22.6002 | 10.7680 | 20.6002 | 103.0000 | 1400.00 |

TABLE 11

(Embodiment 3)

F = 36.0~103.0  FN = 3.5~4.6  2ω = 64.5°~23.2°

| | r | d | Abbe | n |
|---|---|---|---|---|
| 1 | 157.464 | 1.30 | 26.1 | 1.78470 |
| 2 | 55.670 | .40 | | |
| 3 | 60.850 | 7.00 | 60.7 | 1.60311 |
| 4 | −126.450 | .10 | | |
| 5 | 32.520 | 3.90 | 60.7 | 1.60311 |
| 6 | 62.803 | .85 | | |
| 7 | 74.100 | 1.00 | 45.5 | 1.79668 |
| 8 | 17.100 | 3.15 | | |
| 9 | −235.400 | 3.50 | 25.4 | 1.80518 |
| 10 | −19.920 | 1.00 | 45.5 | 1.79668 |
| 11 | −157.464 | 2.70 | | |
| 12 | −22.200 | .90 | 54.0 | 1.71300 |
| 13 | 16.650 | 3.40 | 40.9 | 1.79631 |
| 14 | −1280.015 | 12.84 | | |
| 15 | 89.000 | 4.20 | 54.0 | 1.71300 |
| 16 | −23.800 | .30 | | |
| 17 | −21.200 | 1.30 | 25.4 | 1.80518 |
| 18 | −40.083 | .10 | | |
| 19 | 31.600 | 2.50 | 56.0 | 1.56883 |
| 20 | 46.947 | 12.63 | | |
| 21 | 22.220 | 4.00 | 60.8 | 1.56384 |
| 22 | 36.900 | 1.50 | 40.9 | 1.79631 |
| 23 | 21.200 | 2.00 | | |
| 24 | 70.600 | 4.00 | 60.3 | 1.51835 |
| 25 | −31.600 | .10 | | |
| 26 | −189.871 | 5.50 | 60.8 | 1.56384 |
| 27 | −16.261 | 1.40 | 45.5 | 1.79668 |
| 28 | −68.320 | 50.18 | | |

| F | 36.0000 | 50.0000 | 70.0000 | 85.0000 | 103.0000 |
|---|---|---|---|---|---|
| D0 | .0000 | .0000 | .0000 | .0000 | .0000 |
| d6 | .8538 | 7.2418 | 13.2838 | 16.5795 | 19.7208 |

TABLE 11-continued (Embodiment 3)
F = 36.0~103.0  FN = 3.5~4.6  2ω = 64.5°~23.2°

| | | | | | |
|---|---|---|---|---|---|
| d14 | 12.8367 | 8.9466 | 5.4856 | 3.6129 | 1.7637 |
| d20 | 12.6321 | 10.1342 | 7.5531 | 6.1302 | 4.8381 |
| d28 | 50.1831 | 58.5774 | 67.2511 | 72.0323 | 76.3750 |

TABLE 12

| | F | (1) | (2) | (3) | (4) | R |
|---|---|---|---|---|---|---|
| | | | | ΔX | | |
| | 36.0000 | .0000 | .0000 | −1.1661 | −1.7492 | 1400.00 |
| 2 | 50.0000 | .0000 | .0000 | −.9704 | −1.3100 | 1400.00 |
| 3 | 70.0000 | .0000 | .0000 | −1.1060 | −1.3272 | 1400.00 |
| 4 | 85.0000 | .0000 | .0000 | −1.2985 | −1.5192 | 1400.00 |
| 5 | 103.0000 | .0000 | .0000 | −1.5769 | −1.8135 | 1400.00 |
| | | | | φ | | |
| 1 | 36.0000 | .0000 | .0000 | −1.6601 | −1.7492 | 1400.00 |
| 2 | 50.0000 | .0000 | .0000 | −1.3815 | −1.3100 | 1400.00 |
| 3 | 70.0000 | .0000 | .0000 | −1.5745 | −1.3272 | 1400.00 |
| 4 | 85.0000 | .0000 | .0000 | −1.8486 | −1.5192 | 1400.00 |
| 5 | 103.0000 | .0000 | .0000 | −2.2449 | −1.8135 | 1400.00 |

TABLE 13

| | | R | 1400.00 | 1600.00 | 2000.00 | 3000.00 | 5000.00 | 10000.00 |
|---|---|---|---|---|---|---|---|---|
| F | 36.0000 | BF | .0000 | −.0173 | −.0220 | −.0186 | | −.0113 |
| F | 50.0000 | BF | −.0001 | −.0018 | −.0035 | −.0046 | −.0039 | −.0022 |
| F | 70.0000 | BF | .0000 | .0044 | .0079 | .0086 | .0067 | .0041 |
| F | 85.0000 | BF | −.0002 | .0063 | .0109 | .0109 | .0079 | .0046 |
| F | 103.0000 | BF | .0000 | .0000 | .0000 | .0000 | .0000 | .0000 |
| Focum cam | | DF | −2.0000 | −1.7344 | −1.3706 | −.8993 | −.5328 | −.2638 |
| F | 36.0000 | DX | .0000 | .0000 | −1.1661 | −1.7492 | R | 1400.00 |
| F | 50.0000 | DX | .0000 | .0000 | −.9704 | −1.3100 | R | 1400.00 |
| F | 70.0000 | DX | .0000 | .0000 | −1.1060 | −1.3272 | R | 1400.00 |
| F | 85.0000 | DX | .0000 | .0000 | −1.2985 | −1.5192 | R | 1400.00 |
| F | 103.0000 | DX | .0000 | .0000 | −1.5769 | −1.8135 | R | 1400.00 |
| F | 36.0000 | DX | .0000 | .0000 | −1.0103 | −1.5130 | R | 1600.00 |
| F | 50.0000 | DX | .0000 | .0000 | −.8411 | −1.1348 | R | 1600.00 |
| F | 70.0000 | DX | .0000 | .0000 | −.9595 | −1.1518 | R | 1600.00 |
| F | 85.0000 | DX | .0000 | .0000 | −1.1281 | −1.3206 | R | 1600.00 |
| F | 103.0000 | DX | .0000 | .0000 | −1.3740 | −1.5797 | R | 1600.00 |
| F | 36.0000 | DX | .0000 | .0000 | −.7972 | −1.1897 | R | 2000.00 |
| F | 50.0000 | DX | .0000 | .0000 | −.6643 | −.8954 | R | 2000.00 |
| F | 70.0000 | DX | .0000 | .0000 | −.7586 | −.9112 | R | 2000.00 |
| F | 85.0000 | DX | .0000 | .0000 | −.8939 | −1.0471 | R | 2000.00 |
| F | 103.0000 | DX | .0000 | .0000 | −1.0927 | −1.2559 | R | 2000.00 |
| F | 36.0000 | DX | .0000 | .0000 | −.5219 | −.7737 | R | 3000.00 |
| F | 50.0000 | DX | .0000 | .0000 | −.4357 | −.5865 | R | 3000.00 |
| F | 70.0000 | DX | .0000 | .0000 | −.4982 | −.5987 | R | 3000.00 |
| F | 85.0000 | DX | .0000 | .0000 | −.5888 | −.6902 | R | 3000.00 |
| F | 103.0000 | DX | .0000 | .0000 | −.7228 | −.8303 | R | 3000.00 |
| F | 36.0000 | DX | .0000 | .0000 | −.3087 | −.4545 | R | 5000.00 |
| F | 50.0000 | DX | .0000 | .0000 | −.2581 | −.3470 | R | 5000.00 |
| F | 70.0000 | DX | .0000 | .0000 | −.2954 | −.3552 | R | 5000.00 |
| F | 85.0000 | DX | .0000 | .0000 | −.3500 | −.4105 | R | 5000.00 |
| F | 103.0000 | DX | .0000 | .0000 | −.4310 | −.4948 | R | 5000.00 |
| F | 36.0000 | DX | .0000 | .0000 | −.1526 | −.2234 | R | 10000.00 |
| F | 50.0000 | DX | .0000 | .0000 | −.1278 | −.1717 | R | 10000.00 |
| F | 70.0000 | DX | .0000 | .0000 | −.1463 | −.1760 | R | 10000.00 |
| F | 85.0000 | DX | .0000 | .0000 | −.1737 | −.2038 | R | 10000.00 |
| F | 103.0000 | DX | .0000 | .0000 | −.2145 | −.2460 | R | 10000.00 |

TABLE 14

| | | R | 1400.00 | 1600.00 | 2000.00 | 3000.00 | 5000.00 | 10000.00 |
|---|---|---|---|---|---|---|---|---|
| F | 36.0000 | DF | −2.0002 | −1.7152 | −1.3324 | −.8535 | −.4961 | −.2424 |
| F | 50.0000 | DF | −1.9999 | −1.7324 | −1.3667 | −.8943 | −.5287 | −.2614 |
| F | 70.0000 | DF | −2.0000 | −1.7369 | −1.3750 | −.9040 | −.5365 | −.2660 |
| F | 85.0000 | DF | −2.0000 | −1.7369 | −1.3748 | −.9034 | −.5357 | −.2655 |
| F | 103.0000 | DF | −2.0000 | −1.7344 | −1.3706 | −.8993 | −.5328 | −.2638 |
| Focus cam | | DF | −2.0000 | −1.7344 | −1.3706 | −.8993 | −.5328 | −.2638 |
| F | 36.0000 | DX | .0000 | .0000 | −1.1662 | −1.7493 | R | 1400.00 |
| F | 50.0000 | DX | .0000 | .0000 | −.9703 | −1.3099 | R | 1400.00 |
| F | 70.0000 | DX | .0000 | .0000 | −1.1060 | −1.3272 | R | 1400.00 |
| F | 85.0000 | DX | .0000 | .0000 | −1.2985 | −1.5192 | R | 1400.00 |
| F | 103.0000 | DX | .0000 | .0000 | −1.5769 | −1.8135 | R | 1400.00 |
| F | 36.0000 | DX | .0000 | .0000 | −.9990 | −1.4959 | R | 1600.00 |
| F | 50.0000 | DX | .0000 | .0000 | −.8402 | −1.1335 | R | 1600.00 |
| F | 70.0000 | DX | .0000 | .0000 | −.9609 | −1.1535 | R | 1600.00 |
| F | 85.0000 | DX | .0000 | .0000 | −1.1297 | −1.3224 | R | 1600.00 |
| F | 103.0000 | DX | .0000 | .0000 | −1.3740 | −1.5797 | R | 1600.00 |
| F | 36.0000 | DX | .0000 | .0000 | −.7749 | −1.1559 | R | 2000.00 |
| F | 50.0000 | DX | .0000 | .0000 | −.6624 | −.8929 | R | 2000.00 |
| F | 70.0000 | DX | .0000 | .0000 | −.7611 | −.9141 | R | 2000.00 |
| F | 85.0000 | DX | .0000 | .0000 | −.8966 | −1.0503 | R | 2000.00 |
| F | 103.0000 | DX | .0000 | .0000 | −1.0927 | −1.2559 | R | 2000.00 |
| F | 36.0000 | DX | .0000 | .0000 | −.4953 | −.7337 | R | 3000.00 |
| F | 50.0000 | DX | .0000 | .0000 | −.4333 | −.5832 | R | 3000.00 |
| F | 70.0000 | DX | .0000 | .0000 | −.5008 | −.6019 | R | 3000.00 |

TABLE 14-continued

| | | | | | | | |
|---|---|---|---|---|---|---|---|
| F | 85.0000 | DX | .0000 | .0000 | −.5915 | −.6933 | R | 3000.00 |
| F | 103.0000 | DX | .0000 | .0000 | −.7228 | −.8303 | R | 3000.00 |
| F | 36.0000 | DX | .0000 | .0000 | −.2874 | −.4228 | R | 5000.00 |
| F | 50.0000 | DX | .0000 | .0000 | −.2561 | −.3444 | R | 5000.00 |
| F | 70.0000 | DX | .0000 | .0000 | −.2974 | −.3576 | R | 5000.00 |
| F | 85.0000 | DX | .0000 | .0000 | −.3519 | −.4127 | R | 5000.00 |
| F | 103.0000 | DX | .0000 | .0000 | −.4310 | −.4948 | R | 5000.00 |
| F | 36.0000 | DX | .0000 | .0000 | −.1402 | −.2052 | R | 10000.00 |
| F | 50.0000 | DX | .0000 | .0000 | −.1266 | −.1701 | R | 10000.00 |
| F | 70.0000 | DX | .0000 | .0000 | −.1476 | −.1775 | R | 10000.00 |
| F | 85.0000 | DX | .0000 | .0000 | −.1749 | −.2051 | R | 10000.00 |
| F | 103.0000 | DX | .0000 | .0000 | −.2145 | −.2460 | R | 10000.00 |

TABLE 15 - (1)

(Cam data of the focus cams and zoom cams of the first lens group and the second lens group)

First lens group

| Focus cam | | Zoom cam | | |
|---|---|---|---|---|
| φ f (1) | Xf (1) | φ z (1) | Xz (1) | F |
| .0000 | .0000 | .0000 | .0000 | 36.0000 |
| .0000 | 8.3941 | 8.3941 | 8.3941 | 50.0000 |
| .0000 | 17.0677 | 17.0677 | 17.0677 | 70.0000 |
| .0000 | 21.8493 | 21.8493 | 21.8493 | 85.0000 |
| .0000 | 26.1916 | 26.1916 | 26.1916 | 103.0000 |

Second lens group

| Focus cam | | Zoom cam | | |
|---|---|---|---|---|
| φ f (2) | Xf (2) | φ z (2) | Xz (2) | F |
| .0000 | .0000 | .0000 | .0000 | 36.0000 |
| .0000 | 2.0062 | 8.3941 | 2.0062 | 50.0000 |
| .0000 | 4.6377 | 17.0677 | 4.6377 | 70.0000 |
| .0000 | 6.1236 | 21.8493 | 6.1236 | 85.0000 |
| .0000 | 7.3246 | 26.1916 | 7.3246 | 103.0000 |

TABLE 15 - (2)

(Cam data of the focus cam and zoom cam of the third lens group)

| Focus cam | | Zoom cam | | | |
|---|---|---|---|---|---|
| φ f (3) | Xf (3) | φ z (3) | Xz (3) | F | R |
| .0000 | .0000 | .0000 | .0000 | 36.0000 | ∞ |
| −4.3926 | 5.8962 | 4.0015 | 5.8962 | 50.0000 | ∞ |
| −8.7770 | 11.9887 | 8.2907 | 11.9887 | 70.0000 | ∞ |
| −11.6549 | 15.3474 | 10.1944 | 15.3474 | 85.0000 | ∞ |
| −14.8571 | 18.3975 | 11.3345 | 18.3975 | 103.0000 | ∞ |
| −.0911 | .1112 | −.0911 | −.1526 | 36.0000 | 10000.00 |
| −4.4863 | 6.0322 | 3.9078 | 5.7684 | 50.0000 | 10000.00 |
| −8.8701 | 12.1061 | 8.1976 | 11.8424 | 70.0000 | 10000.00 |
| −11.7398 | 15.4374 | 10.1094 | 15.1736 | 85.0000 | 10000.00 |
| −14.9146 | 18.4468 | 11.2770 | 18.1830 | 103.0000 | 10000.00 |
| −.1829 | .2241 | −.1829 | −.3087 | 36.0000 | 5000.00 |
| −4.5817 | 6.1709 | 3.8124 | 5.6381 | 50.0000 | 5000.00 |
| −8.9656 | 12.2261 | 8.1021 | 11.6933 | 70.0000 | 5000.00 |
| −11.8278 | 15.5302 | 10.0214 | 14.9974 | 85.0000 | 5000.00 |
| −14.9760 | 18.4993 | 11.2155 | 17.9665 | 103.0000 | 5000.00 |
| −.3065 | .3773 | −.3065 | −.5219 | 36.0000 | 3000.00 |
| −4.7114 | 6.3598 | 3.6827 | 5.4606 | 50.0000 | 3000.00 |
| −9.0967 | 12.3898 | 7.9710 | 11.4905 | 70.0000 | 3000.00 |
| −11.9499 | 15.6579 | 9.8993 | 14.7586 | 85.0000 | 3000.00 |
| −15.0639 | 18.5739 | 11.1277 | 17.6747 | 103.0000 | 3000.00 |
| −.4636 | .5733 | −.4636 | −.7972 | 36.0000 | 2000.00 |
| −4.8780 | 6.6025 | 3.5161 | 5.2320 | 50.0000 | 2000.00 |
| −9.2671 | 12.6006 | 7.8006 | 11.2301 | 70.0000 | 2000.00 |
| −12.1105 | 15.8241 | 9.7388 | 14.4535 | 85.0000 | 2000.00 |
| −15.1840 | 18.6753 | 11.0076 | 17.3048 | 103.0000 | 2000.00 |
| −.5838 | .7240 | −.5838 | −1.0103 | 36.0000 | 1600.00 |
| −5.0064 | 6.7895 | 3.3877 | 5.0552 | 50.0000 | 1600.00 |
| −9.3998 | 12.7636 | 7.6679 | 11.0293 | 70.0000 | 1600.00 |
| −12.2370 | 15.9536 | 9.6123 | 14.2193 | 85.0000 | 1600.00 |
| −15.2825 | 18.7579 | 10.9090 | 17.0235 | 103.0000 | 1600.00 |
| −.6711 | .8338 | −.6711 | −1.1661 | 36.0000 | 1400.00 |
| −5.1001 | 6.9259 | 3.2941 | 4.9259 | 50.0000 | 1400.00 |
| −9.4974 | 12.8827 | 7.5703 | 10.8827 | 70.0000 | 1400.00 |
| −12.3307 | 16.0489 | 9.5186 | 14.0489 | 85.0000 | 1400.00 |
| −15.3578 | 18.8205 | 10.8338 | 16.8206 | 103.0000 | 1400.00 |

TABLE 15 - (3)

(Cam data of the focus cam and zoom cam of the fourth lens group)

| Focus cam | | Zoom cam | | | |
|---|---|---|---|---|---|
| φ f (4) | Xf (4) | φ z (4) | Xz (4) | F | R |
| .0000 | .0000 | .0000 | .0000 | 36.0000 | ∞ |
| −6.2046 | 8.3941 | 2.1896 | 8.3941 | 50.0000 | ∞ |
| −11.7484 | 17.0677 | 5.3193 | 17.0677 | 70.0000 | ∞ |
| −15.1640 | 21.8493 | 6.6852 | 21.8493 | 85.0000 | ∞ |
| −18.8737 | 26.1916 | 7.3179 | 26.1916 | 103.0000 | ∞ |
| −0.339 | .0404 | −.0339 | −.2234 | 36.0000 | 10000.00 |
| −6.2644 | 8.4863 | 2.1297 | 8.2225 | 50.0000 | 10000.00 |
| −11.8071 | 17.1555 | 5.2606 | 16.8917 | 70.0000 | 10000.00 |
| −15.2106 | 21.9093 | 6.6387 | 21.6455 | 85.0000 | 10000.00 |
| −18.8903 | 26.2094 | 7.3012 | 25.9456 | 103.0000 | 10000.00 |
| −.0656 | .0783 | −.0656 | −.4545 | 36.0000 | 5000.00 |
| −6.3252 | 8.5799 | 2.0690 | 8.0471 | 50.0000 | 5000.00 |
| −11.8673 | 17.2453 | 5.2004 | 16.7125 | 70.0000 | 5000.00 |
| −15.2591 | 21.9716 | 6.5902 | 21.4388 | 85.0000 | 5000.00 |
| −18.9093 | 26.2296 | 7.2822 | 25.6969 | 103.0000 | 5000.00 |
| −.1050 | .1255 | −.1050 | −.7737 | 36.0000 | 3000.00 |
| −6.4074 | 8.7069 | 1.9868 | 7.8077 | 50.0000 | 3000.00 |
| −11.9498 | 17.3682 | 5.1179 | 16.4690 | 70.0000 | 3000.00 |
| −15.3267 | 22.0584 | 6.5225 | 21.1591 | 85.0000 | 3000.00 |
| −18.9385 | 26.2606 | 7.2531 | 25.3614 | 103.0000 | 3000.00 |
| −.1511 | .1809 | −.1511 | −1.1897 | 36.0000 | 2000.00 |
| −6.5122 | 8.8693 | 1.8819 | 7.4988 | 50.0000 | 2000.00 |
| −12.0568 | 17.5271 | 5.0109 | 16.1565 | 70.0000 | 2000.00 |
| −15.4164 | 22.1728 | 6.4329 | 20.8023 | 85.0000 | 2000.00 |
| −18.9815 | 26.3064 | 7.2100 | 24.9358 | 103.0000 | 2000.00 |
| −.1848 | .2214 | −.1848 | −1.5130 | 36.0000 | 1600.00 |
| −6.5923 | 8.9938 | 1.8018 | 7.2594 | 50.0000 | 1600.00 |
| −12.1400 | 17.6503 | 4.9276 | 15.9159 | 70.0000 | 1600.00 |
| −15.4874 | 22.2631 | 6.3618 | 20.5288 | 85.0000 | 1600.00 |
| −19.0193 | 26.3463 | 7.1723 | 24.6120 | 103.0000 | 1600.00 |
| −.2093 | .2508 | −.2093 | −1.7492 | 36.0000 | 1400.00 |
| −6.6504 | 9.0841 | 1.7437 | 7.0842 | 50.0000 | 1400.00 |
| −12.2012 | 17.7405 | 4.8665 | 15.7405 | 70.0000 | 1400.00 |
| −15.5403 | 22.3301 | 6.3089 | 20.3301 | 85.0000 | 1400.00 |
| −19.0494 | 26.3782 | 7.1422 | 24.3782 | 103.0000 | 1400.00 |

TABLE 16

(Embodiment 4)

F = 36.0~131.0  FN = 3.5~4.6  2ω = 65.1°~18.2°

| | r | d | Abbe | n |
|---|---|---|---|---|
| 1 | 318.856 | 1.40 | 25.5 | 1.80458 |
| 2 | 68.120 | .41 | | |
| 3 | 73.705 | 9.10 | 60.3 | 1.62041 |
| 4 | −127.718 | .10 | | |
| 5 | 40.030 | 4.70 | 57.0 | 1.62280 |
| 6 | 112.956 | 1.49 | | |
| 7 | 129.794 | 1.30 | 45.4 | 1.79668 |
| 8 | 21.179 | 3.00 | | |
| 9 | 447.353 | 5.20 | 25.5 | 1.80458 |
| 10 | −19.155 | 1.40 | 45.4 | 1.79668 |
| 11 | 731.585 | 2.00 | | |
| 12 | −26.240 | 1.50 | 54.0 | 1.71300 |
| 13 | 19.928 | 3.10 | 40.9 | 1.79631 |
| 14 | 307.158 | 18.42 | | |
| 15 | 93.587 | 4.60 | 64.1 | 1.51680 |
| 16 | −22.108 | 1.10 | | |
| 17 | −20.084 | 1.70 | 25.5 | 1.80458 |
| 18 | −32.833 | .10 | | |

TABLE 16-continued (Embodiment 4)
F = 36.0~131.0   FN = 3.5~4.6   2ω = 65.1°~18.2°

| | | | | |
|---|---|---|---|---|
| 19 | 28.661 | 4.10 | 70.2 | 1.48749 |
| 20 | 52.802 | 14.62 | | |
| 21 | 22.829 | 5.60 | 61.2 | 1.58913 |
| 22 | 21.457 | 3.70 | | |
| 23 | −121.765 | 3.00 | 64.1 | 1.51680 |
| 24 | −34.357 | .20 | | |
| 25 | 48.139 | 7.80 | 60.8 | 1.56384 |
| 26 | −17.863 | 1.40 | 45.4 | 1.79668 |
| 27 | −316.954 | 51.62 | | |

| F | 36.0000 | 50.0000 | 70.0000 | 100.0000 | 131.0000 |
|---|---|---|---|---|---|
| D0 | .0000 | .0000 | .0000 | .0000 | .0000 |
| d6 | 1.4877 | 8.4169 | 14.9086 | 21.2278 | 25.6100 |
| d14 | 18.4241 | 13.8745 | 9.7891 | 5.6888 | 2.3771 |
| d20 | 14.6176 | 12.2381 | 9.8318 | 7.6128 | 6.5423 |
| d27 | 51.6221 | 59.7705 | 68.0105 | 75.7758 | 80.3966 |

TABLE 17

| | F | (1) | (2) | (3) | (4) | R |
|---|---|---|---|---|---|---|
| | | | ΔX | | | |
| 1 | 36.0000 | .0000 | .0000 | −2.1529 | −3.2294 | 1500.00 |
| 2 | 50.0000 | .0000 | .0000 | −1.2990 | −1.7536 | 1500.00 |
| 3 | 70.0000 | .0000 | .0000 | −1.4103 | −1.6924 | 1500.00 |
| 4 | 100.0000 | .0000 | .0000 | −1.9391 | −2.1718 | 1500.00 |
| 5 | 131.0000 | .0000 | .0000 | −2.6760 | −2.8098 | 1500.00 |
| | | | φ | | | |
| 1 | 36.0000 | .0000 | .0000 | −3.0621 | −3.2294 | 1500.00 |
| 2 | 50.0000 | .0000 | .0000 | −1.8327 | −1.7536 | 1500.00 |
| 3 | 70.0000 | .0000 | .0000 | −2.0017 | −1.6924 | 1500.00 |
| 4 | 100.0000 | .0000 | .0000 | −2.6523 | −2.1718 | 1500.00 |
| 5 | 131.0000 | .0000 | .0000 | −3.4619 | −2.8098 | 1500.00 |

TABLE 18

| | | R | 1500.00 | 1700.00 | 2000.00 | 3000.00 | 5000.00 | 10000.00 |
|---|---|---|---|---|---|---|---|---|
| F | 36.0000 | BF | .0001 | −.0321 | −.0620 | −.0894 | −.0772 | −.0472 |
| F | 50.0000 | BF | −.0001 | .0131 | .0240 | .0275 | .0175 | .0078 |
| F | 70.0000 | BF | .0001 | .0273 | .0494 | .0623 | .0489 | .0279 |
| F | 100.0000 | BF | .0002 | .0548 | .0953 | .1086 | .0766 | .0401 |
| F | 131.0000 | BF | .0000 | .0000 | .0000 | .0000 | .0000 | −.0001 |
| Focus cam | | DF | −3.5000 | −3.0379 | −2.5355 | −1.6388 | −.9628 | −.4750 |
| F | 36.0000 | DX | .0000 | .0000 | −2.1529 | −3.2294 | R | 1500.00 |
| F | 50.0000 | DX | .0000 | .0000 | −1.2990 | −1.7536 | R | 1500.00 |
| F | 70.0000 | DX | .0000 | .0000 | −1.4103 | −1.6924 | R | 1500.00 |
| F | 100.0000 | DX | .0000 | .0000 | −1.9391 | −2.1718 | R | 1500.00 |
| F | 131.0000 | DX | .0000 | .0000 | −2.6760 | −2.8098 | R | 1500.00 |
| F | 36.0000 | DX | .0000 | .0000 | −1.8631 | −2.7778 | R | 1700.00 |
| F | 50.0000 | DX | .0000 | .0000 | −1.1245 | −1.5212 | R | 1700.00 |
| F | 70.0000 | DX | .0000 | .0000 | −1.2230 | −1.4681 | R | 1700.00 |
| F | 100.0000 | DX | .0000 | .0000 | −1.6865 | −1.8884 | R | 1700.00 |
| F | 131.0000 | DX | .0000 | .0000 | −2.3546 | −2.4575 | R | 1700.00 |
| F | 36.0000 | DX | .0000 | .0000 | −1.5482 | −2.2860 | R | 2000.00 |
| F | 50.0000 | DX | .0000 | .0000 | −.9358 | −1.2691 | R | 2000.00 |
| F | 70.0000 | DX | .0000 | .0000 | −1.0195 | −1.2244 | R | 2000.00 |
| F | 100.0000 | DX | .0000 | .0000 | −1.4116 | −1.5796 | R | 2000.00 |
| F | 131.0000 | DX | .0000 | .0000 | −1.9954 | −2.0683 | R | 2000.00 |
| F | 36.0000 | DX | .0000 | .0000 | −.9905 | −1.4275 | R | 3000.00 |
| F | 50.0000 | DX | .0000 | .0000 | −.6024 | −.8199 | R | 3000.00 |
| F | 70.0000 | DX | .0000 | .0000 | −.6569 | −.7904 | R | 3000.00 |
| F | 100.0000 | DX | .0000 | .0000 | −.9186 | −1.0256 | R | 3000.00 |
| F | 131.0000 | DX | .0000 | .0000 | −1.3235 | −1.3570 | R | 3000.00 |
| F | 36.0000 | DX | .0000 | .0000 | −.5766 | −.8126 | R | 5000.00 |
| F | 50.0000 | DX | .0000 | .0000 | −.3539 | −.4816 | R | 5000.00 |
| F | 70.0000 | DX | .0000 | .0000 | −.3848 | −.4640 | R | 5000.00 |
| F | 100.0000 | DX | .0000 | .0000 | −.5435 | −.6051 | R | 5000.00 |
| F | 131.0000 | DX | .0000 | .0000 | −.7916 | −.8067 | R | 5000.00 |
| F | 36.0000 | DX | .0000 | .0000 | −.2825 | −.3913 | R | 10000.00 |
| F | 50.0000 | DX | .0000 | .0000 | −.1749 | −.2376 | R | 10000.00 |
| F | 70.0000 | DX | .0000 | .0000 | −.1894 | −.2289 | R | 10000.00 |
| F | 100.0000 | DX | .0000 | .0000 | −.2696 | −.2995 | R | 10000.00 |
| F | 131.0000 | DX | .0000 | .0000 | −.3951 | −.4018 | R | 10000.00 |

TABLE 19

| | | R | 1500.00 | 1700.00 | 2000.00 | 3000.00 | 5000.00 | 10000.00 |
|---|---|---|---|---|---|---|---|---|
| F | 36.0000 | DF | −3.5005 | −2.8436 | −2.2173 | −1.2991 | −.7208 | −.3433 |
| F | 50.0000 | DF | −3.4998 | −3.0650 | −2.5849 | −1.6950 | −.9980 | −.4905 |
| F | 70.0000 | DF | −3.5001 | −3.0672 | −2.5879 | −1.7037 | −1.0133 | −.5037 |
| F | 100.0000 | DF | −3.5001 | −3.0682 | −2.5874 | −1.6961 | −1.0021 | −.4952 |
| F | 131.0000 | DF | −3.5000 | −3.0379 | −2.5355 | −1.6388 | −.9628 | −.4750 |
| Focus | cam | DF | −3.5000 | −3.0379 | −2.5355 | −1.6388 | −.9628 | −.4750 |
| F | 36.0000 | DX | .0000 | .0000 | −2.1532 | −3.2299 | R | 1500.00 |
| F | 50.0000 | DX | .0000 | .0000 | −1.2989 | −1.7535 | R | 1500.00 |
| F | 70.0000 | DX | .0000 | .0000 | −1.4103 | −1.6925 | R | 1500.00 |
| F | 100.0000 | DX | .0000 | .0000 | −1.9391 | −2.1719 | R | 1500.00 |
| F | 131.0000 | DX | .0000 | .0000 | −2.6760 | −2.8098 | R | 1500.00 |
| F | 36.0000 | DX | .0000 | .0000 | −1.7412 | −2.5873 | R | 1700.00 |
| F | 50.0000 | DX | .0000 | .0000 | −1.1347 | −1.5348 | R | 1700.00 |
| F | 70.0000 | DX | .0000 | .0000 | −1.2348 | −1.4823 | R | 1700.00 |
| F | 100.0000 | DX | .0000 | .0000 | −1.7031 | −1.9070 | R | 1700.00 |
| F | 131.0000 | DX | .0000 | .0000 | −2.3546 | −2.4575 | R | 1700.00 |
| F | 36.0000 | DX | .0000 | .0000 | −1.3494 | −1.9772 | R | 2000.00 |

TABLE 19-continued

| | | | | | | | | |
|---|---|---|---|---|---|---|---|---|
| F | 50.0000 | DX | .0000 | .0000 | −.9542 | −1.2938 | R | 2000.00 |
| F | 70.0000 | DX | .0000 | .0000 | −1.0407 | −1.2498 | R | 2000.00 |
| F | 100.0000 | DX | .0000 | .0000 | −1.4400 | −1.6115 | R | 2000.00 |
| F | 131.0000 | DX | .0000 | .0000 | −1.9954 | −2.0683 | R | 2000.00 |
| F | 36.0000 | DX | .0000 | .0000 | −.7816 | −1.1143 | R | 3000.00 |
| F | 50.0000 | DX | .0000 | .0000 | −.6231 | −.8480 | R | 3000.00 |
| F | 70.0000 | DX | .0000 | .0000 | −.6831 | −.8217 | R | 3000.00 |
| F | 100.0000 | DX | .0000 | .0000 | −.9503 | −1.0612 | R | 3000.00 |
| F | 131.0000 | DX | .0000 | .0000 | −1.3235 | −1.3570 | R | 3000.00 |
| F | 36.0000 | DX | .0000 | .0000 | −.4302 | −.6012 | R | 5000.00 |
| F | 50.0000 | DX | .0000 | .0000 | −.3668 | −.4993 | R | 5000.00 |
| F | 70.0000 | DX | .0000 | .0000 | −.4051 | −.4884 | R | 5000.00 |
| F | 100.0000 | DX | .0000 | .0000 | −.5654 | −.6296 | R | 5000.00 |
| F | 131.0000 | DX | .0000 | .0000 | −.7916 | −.8067 | R | 5000.00 |
| F | 36.0000 | DX | .0000 | .0000 | −.2037 | −.2809 | R | 10000.00 |
| F | 50.0000 | DX | .0000 | .0000 | −.1806 | −.2453 | R | 10000.00 |
| F | 70.0000 | DX | .0000 | .0000 | −.2008 | −.2427 | R | 10000.00 |
| F | 100.0000 | DX | .0000 | .0000 | −.2809 | −.3121 | R | 10000.00 |
| F | 131.0000 | DX | .0000 | .0000 | −.3951 | −.4018 | R | 10000.00 |

TABLE 20 - (1)

(Cam data of the focus cams and zoom cams of the first lens group and the second lens group)

| | Focus cam | | Zoom cam | | |
|---|---|---|---|---|---|
| | Φf(1) | Xf(1) | Φz(1) | Xz(1) | F |
| First lens group | .0000 | .0000 | .0000 | .0000 | 36.0000 |
| | .0000 | 8.1486 | 8.1486 | 8.1486 | 50.0000 |
| | .0000 | 16.3887 | 16.3887 | 16.3887 | 70.0000 |
| | .0000 | 24.1537 | 24.1537 | 24.1537 | 100.0000 |
| | .0000 | 28.7745 | 28.7745 | 28.7745 | 131.0000 |

| | Focus cam | | Zoom cam | | |
|---|---|---|---|---|---|
| | Φf(2) | Xf(2) | Φz(2) | Xz(2) | F |
| Second lens group | .0000 | .0000 | .0000 | .0000 | 36.0000 |
| | .0000 | 1.2192 | 8.1486 | 1.2193 | 50.0000 |
| | .0000 | 2.9678 | 16.3887 | 2.9678 | 70.0000 |
| | .0000 | 4.4136 | 24.1537 | 4.4136 | 100.0000 |
| | .0000 | 4.6521 | 28.7745 | 4.6521 | 131.0000 |

TABLE 20 - (2)

(Cam data of the focus cam and zoom cam of the first lens group)

| Focus cam | | Zoom cam | | | |
|---|---|---|---|---|---|
| Φf(3) | Xf(3) | Φz(3) | Xz(3) | F | R |
| .0000 | .0000 | .0000 | .0000 | 36.0000 | ∞ |
| −3.8833 | 5.7690 | 4.2653 | 5.7690 | 50.0000 | ∞ |
| −6.8900 | 11.6029 | 9.4987 | 11.6029 | 70.0000 | ∞ |
| −10.4636 | 17.1489 | 13.6902 | 17.1489 | 100.0000 | ∞ |
| −13.7046 | 20.6991 | 15.0699 | 20.6991 | 131.0000 | ∞ |
| −.1581 | .1926 | −.1581 | −.2825 | 36.0000 | 10000.00 |
| −4.0383 | 6.0692 | 4.1102 | 5.5941 | 50.0000 | 10000.00 |
| −7.0528 | 11.8885 | 9.3359 | 11.4135 | 70.0000 | 10000.00 |
| −10.6213 | 17.3544 | 13.5325 | 16.8793 | 100.0000 | 10000.00 |
| −13.7910 | 20.7791 | 14.9835 | 20.3041 | 131.0000 | 10000.00 |
| −.3128 | .3862 | −.3128 | −.5766 | 36.0000 | 5000.00 |
| −4.1961 | 6.3780 | 3.9525 | 5.4151 | 50.0000 | 5000.00 |
| −7.2218 | 12.1809 | 9.1669 | 11.2181 | 70.0000 | 5000.00 |
| −10.7871 | 17.5683 | 13.3666 | 16.6054 | 100.0000 | 5000.00 |
| −13.8901 | 20.8704 | 14.8843 | 19.9076 | 131.0000 | 5000.00 |
| −.5162 | .6483 | −.5162 | −.9905 | 36.0000 | 3000.00 |
| −4.4130 | 6.8054 | 3.7355 | 5.1667 | 50.0000 | 3000.00 |
| −7.4586 | 12.5847 | 8.9301 | 10.9460 | 70.0000 | 3000.00 |
| −11.0238 | 17.8691 | 13.1299 | 16.2303 | 100.0000 | 3000.00 |
| −14.0474 | 21.0144 | 14.7271 | 19.3756 | 131.0000 | 3000.00 |
| −.7725 | .9873 | −.7725 | −1.5482 | 36.0000 | 2000.00 |
| −4.6997 | 7.3688 | 3.4489 | 4.8333 | 50.0000 | 2000.00 |
| −7.7774 | 13.1190 | 8.6113 | 10.5834 | 70.0000 | 2000.00 |
| −11.3526 | 18.2728 | 12.8011 | 15.7373 | 100.0000 | 2000.00 |
| −14.2950 | 21.2393 | 14.4794 | 18.7038 | 131.0000 | 2000.00 |
| −.9121 | 1.1748 | −.9121 | −1.8631 | 36.0000 | 1700.00 |
| −4.8594 | 7.6824 | 3.2892 | 4.6445 | 50.0000 | 1700.00 |
| −7.9581 | 13.4178 | 8.4306 | 10.3799 | 70.0000 | 1700.00 |
| −11.5451 | 18.5003 | 12.6086 | 15.4624 | 100.0000 | 1700.00 |
| −14.4534 | 21.3824 | 14.3211 | 18.3445 | 131.0000 | 1700.00 |
| −1.0398 | 1.3470 | −1.0398 | −2.1529 | 36.0000 | 1500.00 |
| −5.0050 | 7.9700 | 3.1435 | 4.4701 | 50.0000 | 1500.00 |

TABLE 20 - (2)-continued (Cam data of the focus cam and zoom cam of the first lens group)

| Focus cam | | Zoom cam | | | |
|---|---|---|---|---|---|
| Φf(3) | Xf(3) | Φz(3) | Xz(3) | F | R |
| −8.1254 | 13.6925 | 8.2633 | 10.1926 | 70.0000 | 1500.00 |
| −11.7279 | 18.7097 | 12.4258 | 15.2098 | 100.0000 | 1500.00 |
| −14.6094 | 21.5231 | 14.1651 | 18.0232 | 131.0000 | 1500.00 |

TABLE 20 - (3)

(Cam data of the focus cam and zoom cam of the fourth lens group)

| Focus cam | | Zoom cam | | | |
|---|---|---|---|---|---|
| Φf(4) | Xf(4) | Φz(4) | Xz(4) | F | R |
| .0000 | .0000 | .0000 | .0000 | 36.0000 | ∞ |
| −5.3276 | 8.1486 | 2.8210 | 8.1486 | 50.0000 | ∞ |
| −9.1524 | 16.3887 | 7.2363 | 16.3887 | 70.0000 | ∞ |
| −13.3486 | 24.1537 | 10.8052 | 24.1537 | 100.0000 | ∞ |
| −16.7670 | 28.7745 | 12.0074 | 28.7745 | 131.0000 | ∞ |
| −.0669 | .0837 | −.0669 | −.3913 | 36.0000 | 10000.00 |
| −5.4457 | 8.3860 | 2.7029 | 7.9109 | 50.0000 | 10000.00 |
| −9.2713 | 16.6349 | 7.1174 | 16.1598 | 70.0000 | 10000.00 |
| −13.4602 | 24.3293 | 10.6935 | 23.8542 | 100.0000 | 10000.00 |
| −16.8298 | 28.8478 | 11.9447 | 28.3727 | 131.0000 | 10000.00 |
| −.1196 | .1502 | −.1196 | −.8126 | 36.0000 | 5000.00 |
| −5.5656 | 8.6297 | 2.5830 | 7.6669 | 50.0000 | 5000.00 |
| −9.3942 | 16.8875 | 6.9946 | 15.9247 | 70.0000 | 5000.00 |
| −13.5773 | 24.5115 | 10.5764 | 23.5487 | 100.0000 | 5000.00 |
| −16.9011 | 28.9306 | 11.8733 | 27.9678 | 131.0000 | 5000.00 |
| −.1678 | .2113 | −.1678 | −1.4274 | 36.0000 | 3000.00 |
| −5.7295 | 8.9674 | 2.4191 | 7.3286 | 50.0000 | 3000.00 |
| −9.5656 | 17.2371 | 6.8232 | 15.5983 | 70.0000 | 3000.00 |
| −13.7437 | 24.7669 | 10.4101 | 23.1281 | 100.0000 | 3000.00 |
| −17.0100 | 29.0562 | 11.7644 | 27.4175 | 131.0000 | 3000.00 |
| −.1978 | .2496 | −.1978 | −2.2860 | 36.0000 | 2000.00 |
| −5.9428 | 9.4150 | 2.2058 | 6.8795 | 50.0000 | 2000.00 |
| −9.7951 | 17.6998 | 6.5936 | 15.1643 | 70.0000 | 2000.00 |
| −13.9711 | 25.1097 | 10.1826 | 22.5741 | 100.0000 | 2000.00 |
| −17.1726 | 29.2417 | 11.6019 | 26.7062 | 131.0000 | 2000.00 |
| −.2062 | .2602 | −.2062 | −2.7777 | 36.0000 | 1700.00 |
| −6.0602 | 9.6653 | 2.0884 | 6.6274 | 50.0000 | 1700.00 |
| −9.9247 | 17.9586 | 6.4640 | 14.9207 | 70.0000 | 1700.00 |
| −14.1017 | 25.3032 | 10.0520 | 22.2653 | 100.0000 | 1700.00 |
| −17.2728 | 29.3549 | 11.5017 | 26.3170 | 131.0000 | 1700.00 |
| −.2144 | .2706 | −.2144 | −3.2293 | 36.0000 | 1500.00 |
| −6.1667 | 9.8949 | 1.9819 | 6.3950 | 50.0000 | 1500.00 |
| −10.0444 | 18.1963 | 6.3443 | 14.6963 | 70.0000 | 1500.00 |
| −14.2237 | 25.4819 | 9.9300 | 21.9820 | 100.0000 | 1500.00 |
| −17.3708 | 29.4647 | 11.4037 | 25.9647 | 131.0000 | 1500.00 |

TABLE 21

(Numerical values corresponding to conditions)

TABLE 21-continued

|  | $\beta_3W \cdot \beta_4W$ | $\beta_3T \cdot \beta_4T$ | $\dfrac{f_4}{f_3}$ |
|---|---|---|---|
| Embodiment 1 | −1.368 | −2.059 | 1.653 |
| Embodiment 2 | −1.554 | −2.463 | 1.669 |
| Embodiment 3 | −1.550 | −2.472 | 1.929 |
| Embodiment 4 | −1.426 | −2.316 | 1.717 |

|  | Photographing distance | $\dfrac{DX_{4W}(R)}{DX_{3W}(R)}$ | $\dfrac{DX_{4T}(R)}{DX_{3T}(R)}$ |
|---|---|---|---|
| Embodiment 1 | 5000 | 1.1360 | 0.9228 |
|  | 3000 | 1.1387 | 0.9190 |
|  | 2000 | 1.1419 | 0.9152 |
|  | 1500 | 1.1449 | 0.9168 |
|  | 1000 | 1.1500 | 0.9300 |
|  | 850 | 1.1519 | 0.9387 |
| Embodiment 2 | 10000 | 1.3309 | 0.9900 |
|  | 5000 | 1.3351 | 0.9924 |
|  | 3000 | 1.3399 | 0.9950 |
|  | 2000 | 1.3450 | 0.9973 |
|  | 1600 | 1.3480 | 0.9988 |
|  | 1400 | 1.3500 | 1.0000 |
| Embodiment 3 | 10000 | 1.4636 | 1.1469 |
|  | 5000 | 1.4711 | 1.1480 |
|  | 3000 | 1.4813 | 1.1487 |
|  | 2000 | 1.4917 | 1.1494 |
|  | 1600 | 1.4974 | 1.1497 |
|  | 1400 | 1.5000 | 1.1500 |
| Embodiment 4 | 10000 | 1.3790 | 1.0170 |
|  | 5000 | 1.3975 | 1.0191 |
|  | 3000 | 1.4257 | 1.0253 |
|  | 2000 | 1.4652 | 1.0365 |
|  | 1700 | 1.4859 | 1.0437 |
|  | 1500 | 1.5000 | 10500 |

What is claimed is:

1. A zoom lens comprising, in succession from the object side, a first lens group having a positive refractive power, a second lens group having a negative refractive power, a third lens group having a positive refractive power, and a fourth lens group having a positive refractive power,
said zoom lens being designed such that during the zooming from the wide angle end to the telephoto end, said third lens group and said fourth lens group are moved along the optic axis thereof and during the focusing on an infinity object to a short distance object, they are moved toward the image side while having the spacing therebetween relatively varied,
said zoom lens being further designed to satisfy the following condition:

$$\beta_3T \cdot \beta_4T < \beta_3W \cdot \beta_4W < -1.3$$

where $\beta_3W$ and $\beta_4W$ are the lateral magnifications of said third lens group and said fourth lens group, respectively, in the infinity in-focus state of the wide angle end, and $\beta_3T$ and $\beta_4T$ are the lateral magnifications of said third lens group and said fourth lens group, respectively, in the infinity in-focus state of the telephoto end.

2. A zoom lens according to claim 1, which is designed to satisfy the following condition:

$$1.4 < f_4/f_3 < 4$$

where $f_3$ and $f_4$ are the focal lengths of said third lens group and said fourth lens group, respectively.

3. A zoom lens according to claim 1, which is designed to satisfy the following condition:

$$-2 < \beta_3 \cdot \beta_4 < -1.35$$

where $\beta_3 \cdot \beta_4$ is the combined lateral magnification of said third lens group and said fourth lens group in the infinity in-focus state.

4. A zoom lens according to claim 1, which is designed to satisfy the following condition:

$$1.55 < f_4/f_3 < 2.5$$

where $f_3$ and $f_4$ are the focal lengths of said third lens group and said fourth lens group, respectively.

5. A zoom lens according to claim 1, wherein said third lens group and said fourth lens group are designed to satisfy the following conditions:

$$1.05 < \frac{DX_{4W}(R)}{DX_{3W}(R)} < 1.7$$

$$0.7 < \frac{DX_{4T}(R)}{DX_{3T}(R)} < 1.4$$

where
$DX_{3W}(R)$: the amount of movement of the third lens group required for the focusing to the infinity at the wide angle end to any photographing distance R;

$DX_{4W}(R)$: the amount of movement of the fourth lens group required for the focusing to the infinity at the wide angle end to any photographing distance R;

$DX_{3T}(R)$: the amount of movement of the third lens group required for the focusing to the infinity at the telephoto end to any photographing distance R; and $DX_{4T}(R)$: the amount of movement of the fourth lens group required for the focusing to the infinity at the telephoto end to any photographing distance R.

6. A zoom lens according to claim 1, wherein
said first lens group comprises, in succession from the object side, a cemented lens comprising a negative meniscus lens having its convex surface facing the object side and a biconvex positive lens, and a positive meniscus lens having its convex surface facing the object side,
said second lens group comprises a negative meniscus lens having its convex surface facing the object side and having its object side surface formed into an aspherical surface, a biconcave negative lens having its surface of sharper curvature facing the object side, and a cemented lens comprising a biconvex positive lens and a biconcave negative lens,
said third lens group comprises a biconvex positive lens, and a cemented lens comprising a biconvex positive lens and a biconcave negative lens, and
said fourth lens group comprises a positive lens having its surface of sharper curvature facing the image side, a biconvex positive lens and a negative lens having its concave surface of sharper curvature facing the object side,
said zoom lens being designed such that during the zooming from the wide angle side to the telephoto side, all of said lens groups are moved toward the object side along the optic axis and during the focusing on an infinity object to a short distance object, said third lens group and said fourth lens group are both moved toward the image side while having the spacing therebetween relatively varied.

7. A zoom lens according to claim 6, which is designed in accordance with the following numerical data:

wherein F represents focal length, FN represents F-number, r represents the radius of curvature of each lens surface, d represents the spacing between the lens surfaces, n represents the refractive index of each lens, Abbe represents Abbe number, the suffix numbers represent the order from the object side; middle stage shows the spacings between the lens groups at six positions (F=36.0, 50.0, 60.0, 70.0, 85.0, 103.0) corresponding to six magnification change states from the wide angle end to the telephoto end; lower stage shows the value of each coefficient representing the shape of the aspherical surface formed on the object side lens surface (r6), the aspherical surface is expressed by the following aspherical surface equation:

$$x = \frac{h^2/r}{1 + \sqrt{1 - kh^2/r^2}} + \sum_{i=1}^{5} c_{2i} \cdot h^{2i}$$

wherein h is the height from the optic axis, X is the distance from the tangential plane at the vertex of the aspherical surface at the height h, K is the cone constant, $C_2$, $C_4$, $C_6$, $C_8$ and $C_{10}$, respectively are the 2nd-order, 4th-order, 6th-order, 8th-order and 10th-order aspherical surface coefficients and r is the paraxial radius of curvature; and E-n in the values of the aspherical surface coefficients represents $10^{-n}$ as indicated in the following table:

| F = 36.0~103.0 | | FN = 3.6~4.6 | | 2ω = 64.7°~22.8° | |
|---|---|---|---|---|---|
| | r | d | Abbe | n | |
| 1 | 118.343 | 1.50 | 23.0 | 1.86074 | |
| 2 | 58.652 | 7.30 | 69.9 | 1.51860 | |
| 3 | −122.366 | .10 | | | |
| 4 | 33.396 | 3.80 | 55.6 | 1.69680 | |
| 5 | 52.876 | 1.77 | | | |
| 6 | 75.599 | 1.50 | 55.6 | 1.69680 | |
| 7 | 12.950 | 5.10 | | | |
| 8 | −23.991 | 1.20 | 55.6 | 1.69680 | |
| 9 | 119.072 | .20 | | | |
| 10 | 29.764 | 3.30 | 25.5 | 1.80458 | |
| 11 | −72.192 | 1.20 | 43.3 | 1.84042 | |
| 12 | 176.707 | 14.48 | | | |
| 13 | 47.033 | 3.50 | 64.1 | 1.51680 | |
| 14 | −38.870 | .10 | | | |
| 15 | 20.876 | 6.20 | 56.4 | 1.50137 | |
| 16 | −21.570 | 3.00 | 33.9 | 1.80384 | |
| 17 | 59.932 | 9.11 | | | |
| 18 | 356.270 | 4.50 | 54.0 | 1.61720 | |
| 19 | −22.902 | .10 | | | |
| 20 | 78.513 | 3.30 | 58.5 | 1.65160 | |
| 21 | −56.099 | 2.40 | | | |
| 22 | −19.489 | 1.20 | 40.9 | 1.79631 | |
| 23 | −387.662 | 41.42 | | | |
| F | 36.0230 | 50.0000 | 60.0215 | 70.0000 | 85.0000 | 103.0100 |
| D0 | .0000 | .0000 | .0000 | .0000 | .0000 | .0000 |
| d5 | 1.7742 | 8.8580 | 12.6201 | 15.7550 | 19.6173 | 23.3295 |
| d12 | 14.4840 | 10.4575 | 8.3965 | 6.7194 | 4.5965 | 2.3855 |
| d17 | 9.1067 | 8.2271 | 7.7378 | 7.5315 | 7.3166 | 7.3778 |
| d23 | 41.4165 | 47.7463 | 51.2680 | 54.0476 | 57.2155 | 59.7749 | r6
k = .1000E + 01
c2 = .0000
c4 = −.1914E − 05
c6 = −.9120E − 07
c8 = .7857E − 09
c10 = −.3257E − 11

8. A zoom lens according to claim 1, wherein said first lens group comprises, in succession from the object side, a cemented lens comprising a negative meniscus lens having its convex surface facing the object side and a biconvex positive lens, and a positive meniscus lens having its convex surface facing the object side, said second lens group comprises a negative meniscus lens having its convex surface facing the object side, a biconcave negative lens, a biconvex positive lens, and a cemented lens comprising a biconcave negative lens and a biconvex positive lens, said third lens group comprises a biconvex positive lens, a negative meniscus lens having its convex surface facing the image side, and a positive lens having its surface of sharper curvature facing the object side, and said fourth lens group comprises a meniscus lens having its convex surface facing the object side, a positive lens having its surface of sharper curvature facing the image side, a biconvex positive lens and a negative lens having its concave surface of sharper curvature facing the object side, said zoom lens being designed such that during the zooming from the wide angle side to the telephoto side, all of said lens groups are moved toward the object side along the optic axis and during the focusing on an infinity object to a short distance object, said third lens group and said fourth lens group are both moved toward the image side while having the spacing therebetween relatively varied.

9. A zoom lens according to claim 8 which is designed in accordance with the following numerical data:

| F = 36.0~~103.0 | | FN = 3.4~4.6 | | 2ω = 64.6°~22.9° | |
|---|---|---|---|---|---|
| | r | d | Abbe | n | |
| 1 | 137.408 | 1.40 | 25.5 | 1.80458 | |
| 2 | 53.415 | 7.20 | 60.7 | 1.60311 | |
| 3 | −139.017 | .10 | | | |
| 4 | 34.337 | 3.80 | 64.1 | 1.51680 | |
| 5 | 78.487 | 3.04 | | | |
| 6 | 740.488 | 1.00 | 46.5 | 1.80411 | |
| 7 | 16.353 | 3.50 | | | |
| 8 | −46.916 | 1.00 | 46.5 | 1.80411 | |
| 9 | 52.784 | .10 | | | |
| 10 | 27.752 | 4.00 | 35.5 | 1.59507 | |
| 11 | −35.267 | .70 | | | |
| 12 | −21.856 | 1.00 | 46.5 | 1.80411 | |
| 13 | 52.675 | 2.45 | 23.0 | 1.86074 | |
| 14 | −67.847 | 11.33 | | | |
| 15 | 40.454 | 4.70 | 58.5 | 1.65160 | |
| 16 | −27.938 | .70 | | | |
| 17 | −22.564 | 1.30 | 28.6 | 1.79504 | |
| 18 | −71.186 | .10 | | | |
| 19 | 60.948 | 2.50 | 64.1 | 1.51680 | |
| 20 | −374.469 | 6.78 | | | |
| 21 | 23.344 | 9.00 | 64.1 | 1.51680 | |
| 22 | 21.651 | 2.00 | | | |
| 23 | 76.755 | 4.20 | 69.9 | 1.51860 | |
| 24 | −30.615 | .10 | | | |
| 25 | 31.683 | 4.40 | 64.1 | 1.51680 | |
| 26 | −47.253 | 1.60 | | | |
| 27 | −22.423 | 1.40 | 39.8 | 1.86994 | |
| 28 | 239.363 | 40.98 | | | |
| F | 36.0000 | 50.0000 | 70.0000 | 85.0000 | 103.0000 |
| D0 | .0000 | .0000 | .0000 | .0000 | .0000 |
| d5 | 3.0370 | 9.2942 | 15.3765 | 18.7415 | 21.9615 |
| d14 | 11.3322 | 7.9442 | 4.8434 | 3.1116 | 1.3554 |
| d20 | 6.7821 | 5.7181 | 4.6125 | 4.0069 | 3.4641 |
| d28 | 40.9779 | 48.0750 | 55.4494 | 59.4886 | 63.1090 | wherein F represents focal length, FN represents F-number, r represents the radius of curvature of each lens surface, d represents the spacing between the lens surfaces, n represents the refractive index of each lens, Abbe represents Abbe number, the suffix numbers represent the order from the object side; and lower stage shows the spacings between the lens groups at five positions (F=36.0, 50.0, 70.0, 85.0, 103.0) corresponding to five magnification change states from the wide angle end to the telephoto end.

10. A zoom lens according to claim 1, wherein
said first lens group comprises, in succession from the object side, a negative meniscus lens having its convex surface facing the object side, a biconvex positive lens, and a positive meniscus lens having its convex surface facing the object side,
said second lens group comprises a negative meniscus lens having its convex surface facing the image side, a cemented lens comprising a positive lens, having its surface of sharper curvature facing the image side and a negative meniscus lens having its convex surface facing the image side, and a cemented lens comprising a biconcave negative lens and a positive lens having its surface of sharper curvature facing the object side,
said third lens group comprises a positive lens having its surface of sharper curvature facing the image side, a negative meniscus lens having its convex surface facing the image side, and a positive meniscus lens having its convex surface facing the object side, and
said fourth lens group comprises a cemented lens comprising a positive meniscus lens having its convex surface facing the object side and a negative meniscus lens having its convex surface facing the object side, a biconvex positive lens, and a cemented lens comprising a positive meniscus lens having its convex surface facing the image side and a negative meniscus lens having its convex surface facing the image side,
said zoom lens being designed such that during the zooming from the wide angle side to the telephoto side, all of said lens groups are moved toward the object side along the optic axis and during the focusing on an infinity object to a short distance object, said third lens group and said fourth lens group are both moved toward the image side while having the spacing therebetween relatively varied.

11. A zoom lens according to claim 10, which is designed in accordance with the following numerical data:

| F = 36.0~103.0 | | FN = 3.5~4.6 | 2ω = 64.5°~23.2° | |
|---|---|---|---|---|
| | r | d | Abbe | n |
| 1 | 157.464 | 1.30 | 26.1 | 1.78470 |
| 2 | 55.670 | .40 | | |
| 3 | 60.850 | 7.00 | 60.7 | 1.60311 |
| 4 | −126.450 | .10 | | |
| 5 | 32.520 | 3.90 | 60.7 | 1.60311 |
| 6 | 62.803 | .85 | | |
| 7 | 74.100 | 1.00 | 45.5 | 1.79668 |
| 8 | 17.100 | 3.15 | | |
| 9 | −235.400 | 3.50 | 25.4 | 1.80518 |
| 10 | −19.920 | 1.00 | 45.5 | 1.79668 |
| 11 | −157.464 | 2.70 | | |
| 12 | −22.200 | .90 | 54.0 | 1.71300 |
| 13 | 16.650 | 3.40 | 40.9 | 1.79631 |
| 14 | −1280.015 | 12.84 | | |
| 15 | 89.000 | 4.20 | 54.0 | 1.71300 |
| 16 | −23.800 | .30 | | |
| 17 | −21.200 | 1.30 | 25.4 | 1.80518 |
| 18 | −40.083 | .10 | | |
| 19 | 31.600 | 2.50 | 56.0 | 1.56883 |
| 20 | 46.947 | 12.63 | | |
| 21 | 22.220 | 4.00 | 60.8 | 1.56384 |
| 22 | 36.900 | 1.50 | 40.9 | 1.79631 |

-continued

| F = 36.0~103.0 | | FN = 3.5~4.6 | 2ω = 64.5°~23.2° | |
|---|---|---|---|---|
| 23 | 21.200 | 2.00 | | |
| 24 | 70.600 | 4.00 | 60.3 | 1.51835 |
| 25 | −31.600 | .10 | | |
| 26 | −189.871 | 5.50 | 60.8 | 1.56384 |
| 27 | −16.261 | 1.40 | 45.5 | 1.79668 |
| 28 | −68.320 | 50.18 | | |

| F | 36.0000 | 50.0000 | 70.0000 | 85.0000 | 103.0000 |
|---|---|---|---|---|---|
| D0 | .0000 | .0000 | .0000 | .0000 | .0000 |
| d6 | .8538 | 7.2418 | 13.2838 | 16.5795 | 19.7208 |
| d14 | 12.8367 | 8.9466 | 5.4856 | 3.6129 | 1.7637 |
| d20 | 12.6321 | 10.1342 | 7.5531 | 6.1302 | 4.8381 |
| d28 | 50.1831 | 58.5774 | 67.2511 | 72.0323 | 76.3750 | wherein F represents focal length, FN represents F-number, r represents the radius of curvature of each lens surface, d represents the spacing between the lens surfaces, n represents the refractive index of each lens, Abbe represents Abbe number, the suffix numbers represent the order from the object side; and lower stage shows the spacings between the lens groups at five positions (F=36.0, 50.0, 70.0, 85.0, 103.0) corresponding to five magnification change states from the wide angle end to the telephoto end.

12. A zoom lens according to claim 1, wherein
said first lens group comprises, in succession from the object side, a negative meniscus lens having its convex surface facing the object side, a biconvex positive lens and a positive meniscus lens having its convex surface facing the object side,
said second lens group comprises a negative meniscus lens having its convex surface facing the object side, a cemented lens comprising a positive lens having its surface of sharper curvature facing the image side and a negative lens having its surface of sharper curvature facing the object side, and a cemented lens comprising a biconcave negative lens and a positive lens having its surface of sharper curvature facing the object side,
said third lens group comprises a positive lens having its surface of sharper curvature facing the image side, a negative meniscus lens having its convex surface facing the image side, and a positive meniscus lens having its convex surface facing the object side, and
said fourth lens group comprises a positive meniscus having its convex surface facing the object side, and a positive meniscus lens having its convex surface facing the image side, and a cemented lens comprising a positive lens having its surface of sharper curvature facing the image side and a negative lens having its concave surface of sharper curvature facing the object side,
said zoom lens being designed such that during the zooming from the wide angle side to the telephoto side, all of said lens groups are moved toward the object side along the optic axis and during the focusing on an infinity object to a short distance object, said third lens group and said fourth lens group are both moved toward the image side while having the spacing therebetween relatively varied.

13. A zoom lens according to claim 12, which is designed in accordance with the following numerical data:

| | F = 36.0~131.0 | FN = 3.5~4.6 | 2ω = 65.1°~18.2° | |
|---|---|---|---|---|
| | r | d | Abbe | n |
| 1 | 318.856 | 1.40 | 25.5 | 1.80458 |
| 2 | 68.120 | .41 | | |
| 3 | 73.705 | 9.10 | 60.3 | 1.62041 |
| 4 | −127.718 | .10 | | |
| 5 | 40.030 | 4.70 | 57.0 | 1.62280 |
| 6 | 112.956 | 1.49 | | |
| 7 | 129.794 | 1.30 | 45.4 | 1.79668 |
| 8 | 21.179 | 3.00 | | |
| 9 | 447.353 | 5.20 | 25.5 | 1.80458 |
| 10 | −19.155 | 1.40 | 45.4 | 1.79668 |
| 11 | 731.585 | 2.00 | | |
| 12 | −26.240 | 1.50 | 54.0 | 1.71300 |
| 13 | 19.928 | 3.10 | 40.9 | 1.79631 |
| 14 | 307.158 | 18.42 | | |
| 15 | 93.587 | 4.60 | 64.1 | 1.51680 |
| 16 | −22.108 | 1.10 | | |
| 17 | −20.084 | 1.70 | 25.5 | 1.80458 |
| 18 | −32.833 | .10 | | |
| 19 | 28.661 | 4.10 | 70.2 | 1.48749 |
| 20 | 52.802 | 14.62 | | |
| 21 | 22.829 | 5.60 | 61.2 | 1.58913 |
| 22 | 21.457 | 3.70 | | |
| 23 | −121.765 | 3.00 | 64.1 | 1.51680 |
| 24 | −34.357 | .20 | | |
| 25 | 48.139 | 7.80 | 60.8 | 1.56384 |
| 26 | −17.863 | 1.40 | 45.4 | 1.79668 |
| 27 | −316.954 | 51.62 | | |

| F | 36.0000 | 50.0000 | 70.0000 | 100.0000 | 131.0000 |
|---|---|---|---|---|---|
| D0 | .0000 | .0000 | .0000 | .0000 | .0000 |
| d6 | 1.4877 | 8.4169 | 14.9086 | 21.2278 | 25.6100 |
| d14 | 18.4241 | 13.8745 | 9.7891 | 5.6888 | 2.3771 |
| d20 | 14.6176 | 12.2381 | 9.8318 | 7.6128 | 6.5423 |
| d27 | 51.6221 | 59.7705 | 68.0105 | 75.7758 | 80.3966 | wherein F represents focal length, FN represents F-number, r represents the radius of curvature of each lens surface, d represents the spacing between the lens surfaces, n represents the refractive index of each lens, Abbe represents Abbe number, the suffix numbers represent the order from the object side; and lower stage shows the spacings between the lens groups at five positions (F=36.0, 50.0, 70.0, 100.0, 131.0) corresponding to five magnification change states from the wide angle end to the telephoto end.

* * * * *